(12) United States Patent
Zheng et al.

(10) Patent No.: US 10,620,121 B2
(45) Date of Patent: *Apr. 14, 2020

(54) METHODS AND SYSTEMS FOR OPTOTHERMAL PARTICLE CONTROL

(71) Applicant: BOARD OF REGENTS, THE UNIVERSITY OF TEXAS SYSTEM, Austin, TX (US)

(72) Inventors: Yuebing Zheng, Austin, TX (US); Linhan Lin, Austin, TX (US); Xiaolei Peng, Austin, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/094,705

(22) PCT Filed: Apr. 19, 2017

(86) PCT No.: PCT/US2017/028379
§ 371 (c)(1),
(2) Date: Oct. 18, 2018

(87) PCT Pub. No.: WO2017/184741
PCT Pub. Date: Oct. 26, 2017

(65) Prior Publication Data
US 2019/0113453 A1    Apr. 18, 2019

Related U.S. Application Data

(60) Provisional application No. 62/324,464, filed on Apr. 19, 2016.

(51) Int. Cl.
*G01N 21/552*    (2014.01)
*B01L 3/00*    (2006.01)
(Continued)

(52) U.S. Cl.
CPC ...... *G01N 21/554* (2013.01); *B01L 3/502761* (2013.01); *G01N 15/14* (2013.01);
(Continued)

(58) Field of Classification Search
CPC .... G01N 21/658; G01N 21/01; G01N 21/553; C23C 18/1612; C23C 18/1667;
(Continued)

(56) References Cited

U.S. PATENT DOCUMENTS

| 4,425,261 A | 1/1984 | Stenius et al. |
| 6,016,226 A | 1/2000 | Arisawa et al. |

(Continued)

OTHER PUBLICATIONS

Ahmed, et al., "Rotational Manipulation of Single Cells and Organisms Using Acoustic Waves", Nat. Commun. 2016, 7.
(Continued)

*Primary Examiner* — Hoa Q Pham
(74) *Attorney, Agent, or Firm* — Meunier Carlin & Curfman LLC

(57) ABSTRACT

Disclosed herein are methods comprising illuminating a first location of a plasmonic substrate with electromagnetic radiation, wherein the electromagnetic radiation comprises a wavelength that overlaps with at least a portion of the plasmon resonance energy of the plasmonic substrate. The plasmonic substrate can be in thermal contact with a liquid sample comprising a plurality of particles, the liquid sample having a first temperature. The methods can further comprise generating a confinement region at a location in the liquid sample proximate to the first location of the plasmonic substrate, wherein at least a portion of the confinement region has a second temperature that is greater than the first temperature such that the confinement region is bound by a
(Continued)

temperature gradient. The methods can further comprise trapping at least a portion of the plurality of particles within the confinement region.

19 Claims, 23 Drawing Sheets

(51) Int. Cl.
G01N 15/14 (2006.01)
G02B 5/00 (2006.01)
G01N 15/10 (2006.01)
G02B 21/32 (2006.01)

(52) U.S. Cl.
CPC ............... *G02B 5/00* (2013.01); *G02B 5/008* (2013.01); *B01L 2400/0454* (2013.01); *G01N 2015/1006* (2013.01); *G02B 21/32* (2013.01)

(58) Field of Classification Search
CPC .............. C23C 18/182; C23C 18/1868; C23C 18/1817; G03F 7/70025
USPC .................................. 356/445–448, 335–343
See application file for complete search history.

(56) References Cited

U.S. PATENT DOCUMENTS

| | | | |
|---|---|---|---|
| 6,348,295 | B1 | 2/2002 | Griffith et al. |
| 8,431,903 | B2 | 4/2013 | Baaske et al. |
| 9,096,430 | B2 | 8/2015 | Xiao et al. |
| 10,281,398 | B2* | 5/2019 | Zheng ................. G01N 21/553 |
| 2003/0224162 | A1 | 12/2003 | Hirai et al. |
| 2005/0281944 | A1 | 12/2005 | Jang et al. |
| 2006/0057502 | A1 | 3/2006 | Okada et al. |
| 2008/0245430 | A1 | 10/2008 | Adleman et al. |
| 2009/0034053 | A1 | 2/2009 | King et al. |
| 2010/0142038 | A1 | 6/2010 | Sugiura et al. |
| 2011/0031450 | A1* | 2/2011 | Park ...................... B22F 1/0018 252/513 |
| 2011/0084218 | A1 | 4/2011 | Duhr et al. |
| 2014/0204385 | A1* | 7/2014 | Ouyang ................. G01N 21/47 356/445 |
| 2015/0036234 | A1 | 2/2015 | Ben-yakar et al. |
| 2015/0056426 | A1 | 2/2015 | Grouchko et al. |
| 2015/0111199 | A1 | 4/2015 | Hart et al. |
| 2015/0204810 | A1 | 7/2015 | Pan et al. |
| 2015/0316480 | A1 | 11/2015 | Baaske et al. |
| 2015/0380120 | A1 | 12/2015 | Nnanna et al. |
| 2017/0166760 | A1 | 6/2017 | Dietsch et al. |
| 2017/0194144 | A1 | 7/2017 | Duan et al. |
| 2018/0236486 | A1 | 8/2018 | Zheng et al. |
| 2019/0195805 | A1* | 6/2019 | Zheng ................. G01N 21/658 |
| 2019/0264327 | A1* | 8/2019 | Zheng ................ C23C 18/1865 |

OTHER PUBLICATIONS

Ahn, et al., "Heterogenous Three-Dimensional Electronics by Use of Printed Semiconductor Nanomaterials", Science 2006, 314(5806), 1754-1757.
Ahn, et al., "Photonic—plasmonic mode coupling in on-chip integrated optoplasmonic molecules", ACS Nano 6, 951-960 (2012).
Alois, et al., "Thermal non-equilibrium transport in colloids", Reports on Progress in Physics 2010, 73(12): 126601.
Anderson, JL, "Colloid Transport by Interfacial Forces", Annu. Rev. Fluid Mech. 1989, 21, 61-99.
Angmo, et al., "Roll-to-Roll Inkjet Printing and Photonic Sintering of Electrodes for ITO Free Polymer Solar Cell Modules and Facile Product Integration", Adv Energy Mater 2013, 3(2), 172-175.
Arias-González, et al., "Optical forces on small particles: Attractive and repulsive nature and plasmon-resonance conditions", J. Opt. Soc. Am. A 20, 1201-1209 (2003).
Ayala-Orozco, et al., "Au nanomatryoshkas as efficient near-infrared photothermal transducers for cancer treatment: Benchmarking against nanoshells.", ACS Nano 8, 6372-6381 (2014).
Babynina, et al., "Bending gold nanorods with light.", Nano Lett. 16, 6485-6490 (2016).
Baffou, et al., "Nanoscale Control of Optical Heating in Complex Plasmonic Systems.", ACS Nano 2010, 4(2), 709-716.
Baffou, et al., "Photoinduced Heating of Nanoparticle Arrays.", ACS Nano 2013, 7(8), 6478-6488.
Baffou, et al., "Super-Heating and Micro-Bubble Generation around Plasmonic Nanoparticles under cw Illumination", J Phys Chem C 2014, 118(9), 4890-4898.
Baffou, et al., "Thermo-plasmonics: Using metallic nanostructures as nano-sources of heat", Laser Photonics Rev. 7, 171-187 (2013).
Bagalkot, et al., "Quantum Dot-Aptamer Conjugates for Synchronous Cancer Imaging, Therapy, and Sensing of Drug Delivery Based on Bi-Fluorescence Resonance Energy Transfer", Nano Lett, 2007, 7, 3065-3070.
Banzer, et al., "Chiral optical response of planar and symmetric nanotrimers enabled by heteromaterial selection", Nat. Commun. 7, 13117 (2016).
Bao, et al., "Optical Printing of Electrodynamically Coupled Metallic Nanoparticle Arrays", J. Phys. Chem. C 2014, 118, 19315-19321.
Bao, et al., "Patterning Fluorescent Quantum Dot Nanocomposites by Reactive Inkjet Printing", Small 2015, 11(14), 1649-1654.
Baral, et al., "Comparison of Vapor Formation of Water at the Solid/Water Interface to Colloidal Solutions Using Optically Excited Gold Nanostructures", ACS Nano 2014, 8, 1439-1448.
Barnes, et al., "Surface plasmon subwavelength optics", Nature 2003, 424(6950): 824-830.
Bendix, et al., "Optical trapping of nanoparticles and quantum dots", IEEE J. Sel. Top. Quantum Electron. 20, 15-26 (2014).
Berthelot, et al., "Three-dimensional manipulation with scanning near-field optical nanotweezers", Nat Nano 2014, 9(4): 295-299.
Blattmann, et al., "Plasmonic coupling dynamics of silver nanoparticles in an optical trap", Nano Lett. 15, 7816-7821 (2015).
Bockris, et al., "On the Structure of Charged Interfaces", Proc. R. Soc. London, A 1963, 274(1356): 55-79.
Boltasseva, et al., "Low-loss plasmonic metamaterials", Science 331, 290-291 (2011).
Bosanac, et al., "Efficient optical trapping and visualization of silver nanoparticles", Nano Lett. 8, 1486-1491 (2008).
Bradley, et al., "Clickable janus particles", J. Am. Chem. Soc. 138, 11437-11440 (2016).
Braun, et al., "Optically Controlled Thermophoretic Trapping of Single Nano-Objects", ACS Nano 2013, 7(12): 11200-11208.
Braun, et al., "Single molecules trapped by dynamic inhomogeneous temperature fields", Nano Lett. 15, 5499-5505 (2015).
Braun, et al., "Trapping of DNA by Thermophoretic Depletion and Convection", Phys. Rev. Lett. 2002, 89(18): 188103.
Braun, et al., "Trapping of Single Nano-Objects in Dynamic Temperature Fields", Phys. Chem. Chem. Phys. 2014, 16, 15207-15213.
Bregulla, et al., "Thermo-osmotic flow in thin films", Phys. Rev. Lett. 116, 188303 (2016).
Brown, et al., "Gold Nanoparticles for the Improved Anticancer Drug Delivery of the Active Component of Oxaliplatin", J. Am. Chem. Soc. 2010, 132, 4678-4684.
Brownlee, "Biochemistry and molecular cell biology of diabetic complications", Nature 2001, 414(6865): 813-820.
Campion, et al., "Surface-Enhanced Raman Scattering", Chem. Soc. Rev. 1998, 27, 241-250.
Cassette, et al., "Design of new quantum dot materials for deep tissue infrared imaging", Adv Drug Deliver Rev 2013, 65(5), 719-731.
Chen, et al., "Directed self-assembly of a colloidal kagome lattice", Nature 469, 381-384 (2011).
Chen, et al., "How to Light Special Hot Spots in Multiparticle-Film Configurations", ACS Nano 2015, 10, 581-587.
Chen, et al., "Supracolloidal reaction kinetics of janus spheres", Science 331, 199-202 (2011).

(56) References Cited

OTHER PUBLICATIONS

Cheng, et al., "Light-triggered assembly of gold nanoparticles for photothermal therapy and photoacoustic imaging of tumors in vivo", Adv. Mater. 29, 1604894 (2017).
Chickaraddy, et al., "Single-Molecule Strong Coupling at Room Temperature in Plasmonic Nanocavities", Nature 2016, 535, 127-130.
Chiou, et al., "Massively parallel manipulation of single cells and microparticles using optical images", Nature 2005, 436(7049): 370-372.
Chou, et al., "DNA assembly of nanoparticle superstructures for controlled biological delivery and elimination", Nat. Nanotechnol. 9, 148-155 (2014).
Coskun, et al., "Polyol synthesis of silver nanowires: An extensive parametric study", Cryst. Growth Des. 11, 4963-4969 (2011).
Curto, et al., "Unidirectional Emission of a Quantum Dot Coupled to a Nanoantenna", Science 2010, 329(5994), 930-933.
Dahl, et al., "Composite Titanium Dioxide Nanomaterials", Composite Titanium Dioxide Nanomaterials, Chem. Rev. 2014, 114, 9853-9889.
Ding, et al., "On-chip manipulation of single microparticles, cells, and organisms using surface acoustic waves", Proc. Natl. Acad. Sci. 2012, 109(28): 11105-11109.
Ditlbacher, et al., "Silver nanowires as surface plasmon resonators", Phys. Rev. Lett. 95, 257403 (2005).
Duhr, et al., "Why molecules move along a temperature gradient", Proc. Natl. Acad. Sci. 103, 19678-19682 (2006).
Eastman, ED, "Theory of the soret effect", J. Am. Chem. Soc. 50, 283-291 (1928).
Edwards, et al., "Depletion-Mediated Potentials and Phase Behavior for Micelles, Macromolecules, Nanoparticles, and Hydrogel Particles", Langmuir 2012, 28(39): 13816-13823.
Erb, et al., "Magnetic assembly of colloidal superstructures with multipole symmetry", Nature 457, 999-1002 (2009).
Fan, et al., "Self-assembled plasmonic nanoparticle cluster", Science 328, 1135-1138 (2010).
Fang, et al., "Evolution of Light-Induced Vapor Generation at a Liquid-Immersed Metallic Nanoparticle", Nano Lett 2013, 13(4), 1736-1742.
Fazio, et al., "SERS Detection of Biomolecules at Physiological Ph via Aggregation of Gold Nanorods Mediated by Optical Forces and Plasmonic Heating", Sci. Rep. 2016, 6, 26952.
Feng, et al., "Re-entrant solidification in polymer-colloid mixtures as a consequence of competing entropic and enthalpic attractions", Nature Mater. 14, 61-65 (2015).
Friedrich, et al., "Surface Imaging Beyond the Diffraction Limit with Optically Trapped Spheres", Nat. Nanotechnol. 2015, 10, 1064-1069.
Fujii, et al., "Fabrication and Placement of a Ring Structure of Nanoparticles by a Laser-Induced Micronanobubble on a Gold Surface", Langmuir, 2011, 27(14), 8605-8610.
Galatsis, et al., "Patterning and Templating for Nanoelectronics", Adv Mater 2010, 22(6), 769-778.
Garces-Chavez, et al., "Simultaneous Micromanipulation in Multiple Planes Using a Self-Reconstructing Light Beam", Nature 2002, 419, 145-147.
Garcia-Leis, et al., "Silver Nanostars with High SERS Performance", J. Phys. Chem. C 2013, 117, 7791-7795.
Gargiulo, et al., "Connecting Metallic Nanoparticles by Optical Printing", Nano Lett. 2016, 16, 1224-1229.
Geissler, et al., "Patterning: Principles and Some New Developments", Adv. Mater. 2004, 16, 1249-1269.
Gluckstad, J, "Microfluidics: Sorting Particles with Light", Nat. Mater. 2004, 3, 9-10.
Gosse, et al., "Magnetic Tweezers: Micromanipulation and Force Measurement at the Molecular Level", Biophys. J. 2002, 82(6): 3314-3329.
Govorov, et al., "Generating heat with metal nanoparticles", Nano Today 2, 30-38 (2007).
Grier, DG, "A Revolution in Optical Manipulation", Nature 2003, 424, 810-816.
Grigorenko, et al., "Nanometric Optical Tweezers Based on Nanostructured Substrates", Nat. Photonics 2008, 2, 365-370.
Gu, et al., "Facile one-pot synthesis of bifunctional heterodimers of nanoparticles: A conjugate of quantum dot and magnetic nanoparticles", J Am Chem Soc 2004, 126(18): 5664-5665.
Gu, et al., "Tweezing and Manipulating Micro- and Nanoparticles by Optical Nonlinear Endoscopy", Light Sci Appl 2014, 3, e126.
Guck, et al., "The Optical Stretcher: A Novel Laser Tool to Micromanipulate Cells", Biophys. J. 2001, 81, 767-784.
Guffey, et al., "All-Optical Patterning of Au Nanoparticles on Surfaces Using Optical Traps", Nano Lett. 2010, 10, 4302-4308.
Guo, et al., "Controlling Cell-Cell Interactions Using Surface Acoustic Waves", Proc. Natl. Acad. Sci. 2015, 112, 43-48.
Guo, et al., "Modular assembly of superstructures from polyphenol-functionalized building blocks", Nat. Nanotechnol. 11, 1105-1111 (2016).
Halas, et al., "Plasmons in Strongly Coupled Metallic Nanostructures", Chem. Rev. 2011, 111, 3913-3961.
Hansen, et al., "Expanding the optical trapping range of gold nanoparticles", Nano Lett. 5, 1937-1942 (2005).
Hansen, et al., "Nano-Optical Conveyor Belt, Part I: Theory", Nano Lett. 2014, 14(6): 2965-2970.
Hashmi, et al., "Oscillating bubbles: a versatile tool for lab on a chip applications", Lab Chip 2012, 12, 4216-4227.
Haynes, et al., "Nanosphere Lithography: A versatile nanofabrication tool for studies of sie-dependent nanoparticle opticlas", J. Phys. Chem. B 2001, 105, 5599-5611.
Helden, et al., "Direct measurement of thermophoretic forces", Soft Matter 11, 2379-2386 (2015).
Hernandez-Santana, et al., "Nanolithography: Written with Light", Nature Nanotechnol. 2010, 5, 629-630.
Hildebrandt, et al., "Surface-Enhanced Resonance Raman Spectroscopy of Rhodamine 6G Adsorbed on Colloidal Silver", J. Phys. Chem. 1984, 88, 5935-5944.
Hoang, et al., "Ultrafast Room-Temperature Single Photon Emission from Quantum Dots Coupled to Plasmonic Nanocavities", Nano Lett 2016, 16(1), 270-275.
Hoang, et al., "Ultrafast Spontaneous Emission Source Using Plasmonic Nanoantennas", Nat. Commun. 2015, 6, 7788.
Hu, et al., "Hydrogel microrobots actuated by optically generated vapour bubbles", Lab Chip 2012, 12, 3821-3826.
Huang, et al., "Microfluidic integrated optoelectronic tweezers for single-cell preparation and analysis", Lab Chip 2013, 13, 3721-3727.
Huang, "Optoelectronic tweezers integrated with lensfree holographic microscopy for wide-field interactive cell and particle manipulation on a chip", Lab Chip 2013, 13, 2278-2284.
Huang, et al., "Reversal of the optical force in a plasmonic trap", Opt. Lett. 33, 3001-3003 (2008).
Hulteen, et al., "Nanosphere LithographyL Size-Tunable Silver Nanoparticle and Surface Cluster Arrays", J. Phys. Chem. B 1999, 103, 3854-3863.
Huo, et al., "Nanolithography: Written with Light", Nanotechnol. 2010, 5, 637-640.
Huo, et al., "Polymer pen lithography", Science 2008, 321, 1658-1660.
Ilic, et al., "Exploiting Optical Asymmetry for Controlled Guiding of Particles with Light", ACS Photonics 2016, 3, 197-202.
Iracki, et al., "Charged Micelle Depletion Attraction and Interfacial Colloidal Phase Behavior", Langmuir 2010, 26(24): 18710-18717.
Ito, et al., "Pushing the limits of lithography", Nature 2000, 406, 1027-1031.
Jamshidi, et al., "NanoPen: Dynamic, Low-Power, and Light-Actuated Patterning of Nanoparticles", Nano Lett. 2009, 9, 2921-2925.
Jensen, et al., "Optical trapping and two-photon excitation of colloidal quantum dots using bowtie apertures", ACS Photonics, 2016, 3(3), 423-427.
Jin, et al., "Photoinduced Conversion of Silver Nanospheres to Nanoprisms", Science 2001, 294, 1901-1903.

(56) References Cited

OTHER PUBLICATIONS

Jones, et al., "DNA-nanoparticle superlattices formed from anisotropic building blocks", Nature Mater. 9, 913-917 (2010).
Juan, et al., "Plasmon nano-optical tweezers", Nat. Photonics 2011, 5(6): 349-356.
Juan, et al., "Self-induced back-action optical trapping of dielectric nanoparticles", Nat. Phys. 5, 915-919 (2009).
Kang, et al., "Low-power nano-optical vortex trapping via plasmonic diabolo nanaantennas", Nature Comm., 2011, 2, 1-6.
Kim, et al., "Full-colour quantum dot displays fabricated by transfer printing", Nat Photon 2011, 5(3), 176-182.
Kim, et al., "High-Resolution Patterns of Quantum Dots Formed by Electrohydrodynamic Jet Printing for Light-Emitting Diodes", Nano Lett 2015, 15(2), 969-973.
Kim, et al., "Multilayer Transfer Printing for Pixelated, Multicolor Quantum Dot Light-Emitting Diodes", ACS Nano 2016, 10(5), 4920-4925.
Kim, et al., "Transmutable nanoparticles with reconfigurable surface ligands", Science 351, 579-582 (2016).
Kimura, et al., "Photoinduced fluorescence enhancement in CdSe/ZnS quantum dot submonolayers sandwiched between insulating layers: Influence of dot proximity", J Phys Chem B 2004, 108(35), 13258-13264.
Klajn, et al., "Light-Controlled Self-Assembly of Reversible and Irreversible Nanoparticle Suprastructures", Proc. Natl. Acad. Sci. 2007, 104, 10305-10309.
Kneipp, et al., "Single Molecule Detection Using Surface-Enhanced Raman Scattering (SERS)", Phys. Rev. Lett. 1997, 78, 1667-1670.
Konstantatos, et al., "Ultrasensitive solution-cast quantum dot photodetectors", Nature 2006, 442(7099), 180-183.
Kraft, et al., "Surface roughness directed self-assembly of patchy particles into colloidal micelles", Proc. Natl. Acad. Sci. 109, 10787-10792 (2012).
Kramer, et al., "Plasmonic properties of silicon nanocrystals doped with boron and phosphorus", Nano Lett. 15, 5597-5603 (2015).
Kreysing, et al., "The Optical Cell Rotator", Opt. Express 2008, 16, 16984-16992.
Kundu, et al., "Light-Controlled Self-Assembly of Non-Photoresponsive Nanoparticles", Nat. Chem 2015, 7, 646-652.
Kyrsting, et al., "Heat Profiling of Three-Dimensionally Optically Trapped Gold Nanoparticles Using Vesicle Cargo Release", Nano Lett. 2011, 11, 888-892.
Lan, et al., "Charge-extraction strategies for colloidal quantum dot photovoltaics", Nat Mater 2014, 13(3), 233-240.
Lan, et al., "Ordering, positioning and uniformity of quantum dot arrays", Nano Today 2012, 7(2), 94-123.
Lee, et al., "Fano Resonance and Spectrally Modified Photoluminescence Enhancement in Monolayer Mos2 Integrated with Plasmonic Nanoantenna Array", Nano Lett. 2015, 15, 3646-3653.
Lee, et al., "InAs/GaAs Quantum-Dot Lasers Monolithically Grown on Si, Ge, and Ge-on-Si Substrates", IEEE J Sel Topics Quantum Electon 2013, 19(4).
Lehmuskero, et al., "Laser trapping of colloidal metal nanoparticles", ACS Nano 9, 3453-3469 (2015).
Leunissen, et al., "Ionic colloidal crystals of oppositely charged particles", Nature 437, 235-240 (2005).
Li, et al., "Absorption spectroscopy of single optically trapped gold nanorods", Nano Lett. 15, 7731-7735 (2015).
Li, et al., "Dimers of Silver Nanospheres: Facile Synthesis and Their Use as Hot Spots for Surface-Enhanced Raman Scattering", Nano Lett. 2009, 9, 485-490.
Li, et al., "Large-Scale Synthesis of Nearly Monodisperse CdSe/CdS Core/Shell Nanocrystals Using Air-Stable Reagents via Successive Ion Layer Adsorption and Reaction", J Am Chem Soc 2003, 125: 12567-12575.
Li, et al., "Ph-Programmable Self-Assembly of Plasmonic Nanoparticles: Hydrophobic Interaction Versus Electrostatic Repulsion", Nanoscale 2015, 7, 956-964.
Li, et al., "Reversible Plasmonic Circular Dichroism of Au Nanorod and DNA Assemblies", J. Am. Chem. Soc. 2012, 134, 3322-3325.

Lim, et al., "Highly Uniform and Reproducible Surface-Enhanced Raman Scattering from DNA-Tailorable Nanoparticles with 1-nm Interior Gap", Nat. Nanotechnol. 2011, 6, 452-460.
Lin, et al., "Bubble-Pen Lithography", Nano Lett 2016, 16(1), 701-708.
Lin, et al., "Light-directed reversible assembly of plasmonic nanoparticles using plasmon-enhanced thermophoresis", ACS Nano 10, 9659-9668 (2016).
Lin et al. "Optimizing plasmonic nanoantennas via coordinated multiple coupling," Scientific Reports, 2015, 14788.
Liu, et al., "Diamond family of nanoparticle superlattices", Science 351, 582-586 (2016).
Liu, et al., "Formation and dissolution of microbubbles on highly-ordered plasmonic nanopillar arrays", Scientific Reports, 2015, 5, 18515.
Liu, et al., "Nanoantenna-enhanced gas sensing in a single tailored nanofocus", Nat. Mater. 2011, 10, 631-636.
Liu, et al., "Thermoresponsive Assembly of Charged Gold Nanoparticles and Their Reversible Tuning of Plasmon Coupling", Chem. Int. Ed. 2012, 51, 6373-6377.
Lohse, "Surface nanobubbles and nanodroplets", Rev Mod Phys 2015, 87(3), 981-1035.
Lu, et al., "Synthesis and Self-Assembly of Au©SiO2 Core-Shell Colloids", Nano Lett. 2002, 2, 785-788.
Macfarlane, et al., "Nanoparticle superlattice engineering with DNA", Science 334, 204-208 (2011).
Manoharan, VN, "Colloidal matter: Packing, geometry, and entropy", Science 349, (2015).
Manz, et al., "Spatial organization and signal transduction at intercellular junctions", Nat. Rev. Mol. Cell Biol. 2010, 11(5): 342-352.
Markman, et al., "Photon-Counting Security Tagging and Verification Using Optically Encoded QR Codes", IEEE Photonics J 2014, 6(1).
Mashford, et al., "High-efficiency quantum-dot light-emitting devices with enhanced charge injection", Nat Photon 2013, 7(5), 407-412.
Mchale, et al., "Bubble nucleation characteristics in pool boiling of a wetting liquid on smooth and rough surfaces", Int J Multiphas Flow 2010, 36(4), 249-260.
Mclellan, et al., "The SERS Activity of a Supported Ag Nanocube Strongly Depends on Its Orientation Relative to Laser Polarization", Nano Lett. 2007, 7, 1013-1017.
Medintz, et al., "Quantum dot bioconjugates for imaging, labelling and sensing", Nat Mater 2005, 4(6), 435-446.
Medintz, "Self-assembled nanoscale biosensors based on quantum dot FRET donors", Nat Mater 2003, 2(9), 630-638.
Messina, et al., "Manipulation and Raman Spectroscopy with Optically Trapped Metal Nanoparticles Obtained by Pulsed Laser Ablation in Liquids", J. Phys. Chem. C 2011, 115, 5115-5122.
Min, et al., "Focused plasmonic trapping of metallic particles", Nat Commun 2013, 4, 2891.
Ndukaife, et al., "Long-range and rapid transport of individual nano-objects by a hybrid electrothermoplasmonic nanotweezer", Nat Nano 2016, 11(1): 53-59.
Nedev, et al., "Optical Force Stamping Lithography", Nano Lett. 2011, 11, 5066-5070.
Neumann, et al., "Solar Vapor Generation Enabled by Nanoparticles", ACS Nano 2013, 7(1), 42-49.
Nie, et al., "Probing Single Molecules and Single Nanoparticles by Surface-Enhanced Raman Scattering", Science 1997, 275, 1102-1106.
O'Brien, et al., "Programming colloidal crystal habit with anisotropic nanoparticle building blocks and DNA bonds", J. Am. Chem. Soc. 138 14562-14565 (2016).
Ohlinger, et al., "Optothermal escape of plasmonically coupled silver nanoparticles from a three-dimensional optical trap", Nano Lett. 11, 1770-1774 (2011).
Ozel, et al., "Coaxial Lithography", Nat. Nanotechnol. 2015, 10, 319-324.
Pang, et al., "Optical Trapping of Individual Human Immunodeficiency Viruses in Culture Fluid Reveals Heterogeneity with Single-Molecule Resolution", Nat. Nanotechnol. 2014, 9, 624-630.

(56) References Cited

OTHER PUBLICATIONS

Patra, et al., "Plasmofluidic Single-Molecule Surface-Enhanced Raman Scattering from Dynamic Assembly of Plasmonic Nanoparticles", Nat. Commun. 2014, 5, 4357.
Patra, et al., "Single-Molecule Surface-Enhanced Raman Scattering Sensitivity of Ag-Core Au-Shell Nanoparticles: Revealed by Bi-Analyte Method", J. Phys. Chem. Lett. 2013, 4, 1167-1171.
Pauzauskie, et al., "Optical trapping and integration of semiconductor nanowire assemblies in water", Nat. Mater. 2006, 5(2): 97-101.
International Preliminary Report on Patentability dated Jun. 28, 2018 in related PCT application PCT/US16/066291.
International Preliminary Report on Patentability dated Nov. 1, 2018 in related PCT application PCT/US17/28379.
PCT Search Report & Written Opinion dated Mar. 2, 2017 in related PCT application PCT/US16/066291.
PCT Search Report & Written Opinion dated Jul. 14, 2017 in PCT/US2017/028379.
Pelton, et al., "Optical trapping and alignment of single gold nanorods by using plasmon resonances", Opt. Lett. 31, 2075-2077 (2006).
Perry, et al., "Real-space studies of the structure and dynamics of self-assembled colloidal clusters", Faraday Discuss. 159, 211-234 (2012).
Perry, et al., "Two-Dimensional Clusters of Colloidal Spheres: Ground States, Excited States, and Structural Rearrangements", Phys. Rev. Lett. 114, 228301 (2015).
Piazza, et al., "Thermophoresis in colloidal suspensions", J. Phys.: Condens. Matter 20, 153102 (2008).
Pietryga, et al., "Spectroscopic and Device Aspects of Nanocrystal Quantum Dots", Chem Rev 2016, 116(18), 10513-10622.
Pignolet, et al., "Electrodeposition of latex particles in the presence of surfactant: Investigation of deposit morphology", J Colloid Interface Sci 2010, 349(1): 41-48.
Pinchuk, et al., "Size-dependent Hamaker constants for silver and gold nanoparticles", roc. SPIE 9549, Physical Chemistry of Interfaces and Nanomaterials XIV, 95491J, 2015, 95491J-95491J-95497.
Piner, et al., "Dip-Pen" Nanolithography, Science 1999, 283, 661-663.
Prieve, et al., "Simplified predictions of Hamaker constants from Lifshitz theory", J Colloid Interface Sci 1988, 125(1): 1-13.
Prikulis, et al., "Optical spectroscopy of single trapped metal nanoparticles in solution", Nano Lett. 4, 115-118 (2004).
Putnam, et al., "Temperature Dependence of Thermodiffusion in Aqueous Suspensions of Charged Nanoparticles", Langmuir 2007, 23, 9221-9228.
Rabani, et al., "Drying-mediated self-assembly of nanoparticles", Nature 2003, 426, 271-274.
Rajeeva, et al., "Regioselective Localization and Tracking of Biomolecules on Single Gold Nanoparticles", Adv Sci 2015, 2(11).
Raut, et al., "Multiscale ommatidial arrays with broadband and omnidirectional antireflection and antifogging properties by sacrificial layer mediated nanoimprinting", ACS Nano 2015, 9, 1305-1314.
Regmi, et al., "All-dielectric silicon nanogap antennas to enhance the fluorescence of single molecules", Nano Lett. 16, 5143-5151 (2016).
Reichl, et al., "Why charged molecules move across a temperature gradient: The role of electric fields", Phys. Rev. Lett. 112, 198101 (2014).
Righini, et al., "Parallel and selective trapping in a patterned plasmonic landscape", Nat Phys 2007, 3(7): 477-480.
Roelants, et al., "Parameters affecting aqueous micelles of CTAC, TTAC, and DTAC probed by fluorescence quenching", Langmuir 1987, 3(2): 209-214.
Roxworthy, et al., "Application of Plasmonic Bowtie Nanoantenna Arrays for Optical Trapping, Stacking, and Sorting", Nano Lett. 2012, 12, 796-801.
Roy, et al., "Self-Assembly of Mesoscopic Materials to Form Controlled and Continuous Patterns by Thermo-Optically Manipulated Laser Induced Microbubbles", Langmuir, 2013m 29(47), 14733-14742.
Ruijgrok, et al., "Brownian fluctuations and heating of an optically aligned gold nanorod", Phys. Rev. Lett. 107, 037401 (2011).
Rycenga, et al., "Controlling the synthesis and assembly of silver nanostructures for plasmonic applications", Chem. Rev. 2011, 111, 3669-3712.
Salaita, et al., "Nat. Applications of dip-pen nanolithography", Nanotechnol. 2007, 2, 145-155.
Sánchez-Iglesias, et al., "Hydrophobic interactions modulate self-assembly of nanoparticles", ACS Nano 6, 11059-11065 (2012).
Scarabelli, et al., "Monodisperse Gold Nanotriangles: Size Control, Large-Scale Self-Assembly, and Performance in Surface-Enhanced Raman Scattering", ACS Nano 2014, 8, 5833-5842.
Selhuber-Unkel, t al., "Quantitative optical trapping of single gold nanorods", Nano Lett. 8, 2998-3003 (2008).
Serra, et al., "Curvature-Driven, One-Step Assembly of Reconfigurable Smectic Liquid Crystal "Compound Eye" Lenses", Adv. Opt. Mater. 2015, 3, 1287-1292.
Shams Mousavi, et al., "Band-Edge Bilayer Plasmonic Nanostructure for Surface Enhanced Raman Spectroscopy", ACS Photonics 2015, 2, 1546-1551.
Shao, et al., "Gold nanorod rotary motors driven by resonant light scattering", ACS Nano 9, 12542-12551 (2015).
Shcherbatyuk, et al., "Anomalous photo-induced spectral changes in CdSe/ZnS quantum dots", J Appl Phys 2011, 110(5), 053518.
Si, et al., "Reversible Self-Assembly of Carboxylated Peptide-Functionalized Gold Nanoparticles Driven by Metal-Ion Coordination", ChemPhysChem 2008, 9, 1578-1584.
Srivastava, et al., "Light-controlled self-assembly of semiconductor nanoparticles into twisted ribbons", Science 327, 1355-1359 (2010).
Stamplecoskie, et al., "Optimal Size of Silver Nanoparticles for Surface-Enhanced Raman Spectroscopy", J. Phys. Chem. C 2011, 115, 1403-1409.
Stetciura, et al., "Composite SERS-Based Satellites Navigated by Optical Tweezers for Single Cell Analysis", Analyst 2015, 140, 4981-4986.
Stiles, et al., "Surface-Enhanced Raman Spectroscopy", Annu. Rev. Anal. Chem. 2008, 1, 601-626.
Streuli, et al., "Control of mammary epithelial differentiation: basement membrane induces tissue-specific gene expression in the absence of cell-cell interaction and morphological polarity", J. Cell Biol 115, 1383-1395 (1991).
Su, et al., "Reversible Voltage-Induced Assembly of Au Nanoparticles at Liquid|Liquid Interfaces", J. Am. Chem. Soc. 2004, 126, 915-919.
Sun, et al., "A haptic digital tool to assist the design, planning and manufacture of micro- and nanostructures", Proc Inst Mech Eng E J Process Mech Eng 2015, 229(4), 290-298.
Svedberg, et al., "Creating Hot Nanoparticle Pairs for Surface-Enhanced Raman Spectroscopy through Optical Manipulation", Nano Lett. 2006, 6, 2639-2641.
Taladriz-Blanco, et al., "Reversible Assembly of Metal Nanoparticles Induced by Penicillamine", Dynamic Formation of Sers Hot Spots. J. Mater. Chem. 2011, 21, 16880-16887.
Tanaka, et al., "Nanostructured potential of optical trapping using a plasmonic nanoblock pair", Nano Lett. 13, 2146-2150 (2013).
Tao, et al., "Tunable plasmonic lattices of silver nanocrystals", Nat. Nanotechnol. 2007, 2, 435-440.
Thamdrup, et al., "Light-Induced Local Heating for Thermophoretic Manipulation of DNA in Polymer Micro- and Nanochannels", Nano Lett. 10, 826-832 (2010).
Tong, et al., "Alignment, rotation, and spinning of single plasmonic nanoparticles and nanowires using polarization dependent optical forces", Nano Lett. 10, 268-273 (2010).
Tong, et al., "Optical Aggregation of Metal Nanoparticles in a Microfluidic Channel for Surface-Enhanced Raman Scattering Analysis", Lab Chip 2009, 9, 193-195.
Tong, et al., "Plasmon hybridization reveals the interaction between individual colloidal gold nanoparticles confined in an optical potential well", Nano Lett. 11, 4505-4508 (2011).

(56) References Cited

OTHER PUBLICATIONS

Tulpar, et al., "Decay Lengths of Double-Layer Forces in Solutions of Partly Associated Ions", Langmuir 2001, 17(26): 8451-8454.
Urban, et al., "Laser Printing Single Gold Nanoparticles", Nano Lett. 2010, 10, 4794-4798.
Vigolo, et al., "Thermophoresis and thermoelectricity in surfactant solutions", Langmuir 26, 7792-7801 (2010).
Wang, et al., "A general strategy for nanocrystal synthesis", Nature 2005, 437, 121-124.
Wang, et al., "Colloids with valence and specific directional bonding", Nature 491, 51-55 (2012).
Wang, et al., "Microfluidic Sorting of Mammalian Cells by Optical Force Switching", Nat. Biotechnol. 2005, 23, 83-87.
Wang, et al., "Nanosphere Arrays with Controlled Sub-10-Nm Gaps as Surface-Enhanced Raman Spectroscopy Substrates", J. Am. Chem. Soc. 2005, 127, 14992-14993.
Wang, et al., "Plasmonic trapping with a gold nanopillar", ChemPhysChem 2012, 13, 2639-2648.
Wang, et al., "Resonant light scattering from metal nanoparticles: Practical analysis beyond Rayleigh approximation", Appl Phys Lett, 2003, 83, 162-164.
Weinert, et al., "An Optical Conveyor for Molecules", Nano Lett. 2009, 9, 4264-4267.
Weinert, et al., "Observation of Slip Flow in Thermophoresis", Phys. Rev. Lett. 2008, 101, 168301.
Wiley, et al., "Synthesis of Silver Nanostructures with Controlled Shapes and Properties", Acc. Chem. Res. 2007, 40, 1067-1076.
Willets, et al., "Localized surface plasmon resonance spectroscopy and sensing", Annual Review of Physical Chemistry, vol. 58, 2007, pp. 267-297.
Wilson, et al., "Scalable nano-particle assembly by efficient light-induced concentration and fusion", Opt. Express 2008, 16(22), 17276-17281.
Wood, et al., "Single cell trapping and DNA damage analysis using microwell arrays", Proc. Natl. Acad. Sci. 2010, 107, 10008-10013.
Wu, et al., "Bioinspired fabrication of high-quality 3D artificial compound eyes by voxel-modulation femtosecond laser writing for distortion-free wide-field-of-view imaging", Adv. Opt. Mater. 2014, 2, 751-758.
Wu, Mc, "Optoelectronic tweezers", Nat. Photonics 2011, 5(6): 322-324.
Würger, A, "Hydrodynamic boundary effects on thermophoresis of confined colloids", Phys. Rev. Lett. 116, 138302 (2016).
Würger, A, "Thermal non-equilibrium transport in colloids", Rep. Prog. Phys. 73, 126601 (2010).
Würger, A, "Thermophoresis in Colloidal Suspensions Driven by Marangoni Forces", Phys. Rev. Lett. 2007, 98(13): 138301.
Würger, A, "Transport in Charged Colloids Driven by Thermoelectricity", Phys. Rev. Lett. 2008, 101, 108302.
Xia, et al., "One-dimensional nanostructures: synthesis, characterization, and applications", Adv. Mater. 2003, 15, 353-389.
Xia, et al., "Template-assisted self-assembly of spherical colloids into complex and controllable structures", Adv. Funct. Mater. 2003, 13, 907-918.
Xie, et al., "Nanoscale and Single-Dot Patterning of Colloidal Quantum Dots", Nano Lett 2015, 15(11), 7481-7487.
Xie, et al., "Optoacoustic Tweezers: A Programmable, Localized Cell Concentrator Based on Opto-Thermally Generated, Acoustically Activated, Surface Bubbles", Lab Chip 2013, 13, 1772-1779.
Yan, et al., "Colloidal superstructures programmed into magnetic janus particles", Adv. Mater. 27, 874-879 (2015).
Yan, et al., "Controlling the position and orientation of single silver nanowires on a surface using structured optical fields", ACS Nano 6, 8144-8155 (2012).
Yan, et al., "Fabrication of a Material Assembly of Silver Nanoparticles Using the Phase Gradients of Optical Tweezers", Phys. Rev. Lett. 114, 143901 (2015).
Yan, et al., "Reconfiguring active particles by electrostatic imbalance", Nature Mater. 15, 1095-1099 (2016).
Yan, et al., "Thermal conductivity of monolayer molybdenum disulfide obtained from tempearture-dependent raman spectroscopy", ACS Nano 2014, 8, 986-993.
Yan, et al., "Why single-beam optical tweezers trap gold nanowires in three dimensions", ACS Nano 7, 8794-8800 (2013).
Yang, et al., "Breakthroughs in Photonics 2014: Advances in Plasmonic Nanolasers", IEEE Photonics J 2015, 7(3).
Ye, et al., "Plasmonic Nanoclusters: Near Field Properties of the Fano Resonance Interrogated with SERS", Nano Lett. 2012, 12, 1660-1667.
Yeom, et al., "Chiral templating of self-assembling nanostructures by circularly polarized light", Nature Mater. 14, 66-72 (2015).
Yin, et al., "The chemistry of functional nanomaterials", Chem Soc Rev 2013, 42(7), 2484-2487.
Yoshikawa, et al., "Reversible Assembly of Gold Nanoparticles Confined in an Optical Microcage", Phys. Rev. E 2004, 70, 061406.
Yu, et al., "Experimental determination of the extinction coefficient of CdTe, CdSe and CdS nanocrystals", Chem Mater 2003, 15: 2854-2860.
Yu, et al., "Experimental Determination of the Extinction Coefficient of CdTe, CdSe, and CdS nanocrystals", Chem Mater 2004, 16, 560.
Yu, et al., "Formation of high-quality CdS and other II-VI semiconductor nanocrystals in noncoordinating solvents: Tunable reactivity of monomers", Angew Chem Int Edit 2002, 41(13), 2368-2371.
Yu, et al., "Forming biocompatible and non-aggregated nanocrystals in water using amphiphilic polymers", J Am Chem Soc 2007, 129: 2871-2879.
Zerrouki, et al., "Chiral colloidal clusters", Nature 455, 380-382 (2008).
Zhang, et al., "Directed self-assembly pathways of active colloidal clusters", Angew. Chem. Int. Ed. 55, 5166-5169 (2016).
Zhang, et al., "Living Cell Multilifetime Encoding Based on Lifetime-Tunable Lattice-Strained Quantum Dots", ACS Appl Mater Inter 2016, 8(21), 13187-13191.
Zhang, et al., "Toward design rules of directional janus colloidal assembly", Annu. Rev. Phys. Chem. 66, 581-600 (2015).
Zhang, et al., "Trapping and sensing 10 nm metal nanoparticles using plasmonic dipole antennas", Nano Lett. 10, 1006-1011 (2010).
Zhao, et al., "Theory and experiment on particle trapping and manipulation via optothermally generated bubbles", Lab Chip 2014, 14, 384-391.
Zheng, et al., "Nano-Optical Conveyor Belt, Part II: Demonstration of Handoff Between Near-Field Optical Traps.", Nano Lett. 14, 2971-2976 (2014).
Zhong, "Trapping Red Blood Cells in Living Animals Using Optical Tweezers", Nat. Commun. 2013, 4, 1768.

\* cited by examiner 0.96 μm 540 nm

METHODS AND SYSTEMS FOR OPTOTHERMAL PARTICLE CONTROL

CROSS-REFERENCE TO RELATED APPLICATIONS

This application is a 371 U.S. National Stage of International Application No. PCT/US2017/028379, filed Apr. 19, 2017, which claims the benefit of U.S. Provisional Application No. 62/324,464, filed Apr. 19, 2016, each of which are hereby incorporated herein by reference in their entireties.

BACKGROUND

The manipulation of biological cells and nanoparticles has important applications in life sciences and nanoscience such as intercellular communication, cell differentiation, single-cell sensing and analysis, early disease diagnosis, immunological interaction, and colloidal nanotechnology. Optical tweezers use light to manipulate particles and can offer high-resolution trapping of single particles in three-dimensional (3D) configuration (Grier D G. Nature 2003, 424, 810-816; Gluckstad J. Nature Mater. 2004, 3, 9-10; Pauzauskie P J et al. Nature Mater. 2006, 5, 97-101). However, the use of optical tweezers can be limited by the requirements of a tightly focused high-power laser beam and the prominent refractive-index contrast between the trapped objects and the liquid media. Optoelectronic tweezers use projected light patterns to form virtual electrodes on a photosensitive substrate and conductive electrolytes as liquid media, therefore using both electric bias and low optical power for arbitrary manipulation of particles and cells (Chiou P Y et al. Nature 2005, 436, 370-372). With the capability of concentrating light into the nanoscale, metallic nanostructures have been exploited in plasmonic tweezers to enhance the optical trapping (Righini M et al. Nature Phys. 2007, 3, 477-480; Juan M L et al. Nature Photon. 2011, 5, 349-356; Berthelot J et al. Nature Nanotechnol. 2014, 9, 295-299; Grigorenko A N et al. Nature Photon. 2008, 2, 365-370). Despite their low-power trapping of nanoparticles, plasmonic tweezers have limitations in long-range transport and arbitrary manipulation of the target objects (Ndukaife J C et al. Nature Nanotechnol. 2016, 11, 53-59; Zheng Y et al. Nano Lett. 2014, 14, 2971-2976). Recently developed electrothermoplasmonic tweezers can transport nanoparticles over a long distance and trap them at the plasmonic structures (Ndukaife J C et al. Nature Nanotechnol. 2016, 11, 53-59). Despite tremendous successes in these various light-based tweezers, low-power and versatile all-optical manipulation of general nanoparticles and cells remains elusive. The methods and systems discussed herein addresses these and other needs.

SUMMARY

Disclosed herein are methods comprising illuminating a first location of a plasmonic substrate with electromagnetic radiation, wherein the electromagnetic radiation comprises a wavelength that overlaps with at least a portion of the plasmon resonance energy of the plasmonic substrate. In some examples, the power density of the electromagnetic radiation can be 1 mW/μm$^2$ or less (e.g., 0.5 mW/μm$^2$ or less, 0.05 mW/μm$^2$ or less).

The electromagnetic radiation can, for example, be provided by a light source. In some examples, the light source is an artificial light source. In some examples, the light source is a laser.

In some examples, the light source is configured to illuminate a mirror, the mirror being configured to reflect the electromagnetic radiation from the light source to illuminate the first location of the plasmonic substrate. In some examples, the mirror can comprise a plurality of mirrors, such as an array of micromirrors (e.g., a digital micromirror device).

The plasmonic substrate can, in some examples, comprise a plurality of plasmonic particles. In some examples, the plurality of plasmonic particles can comprise a plurality of metal particles. The plurality of metal particles can, for example, comprise a metal selected from the group consisting of Au, Ag, Pt, Pd, Cu, Al, and combinations thereof. In some examples, the plurality of plasmonic particles can comprise a plurality of gold particles. The plurality of plasmonic particles can have an average particle size of from 10 nm to 500 nm. In some examples, the plurality of plasmonic particles are substantially spherical.

In some examples, each plasmonic particle within the plurality of plasmonic particles on the substrate is separated from its neighboring plasmonic particles by an average distance of from 3 nm to 1500 nm. The density of the plurality of plasmonic particles on the plasmonic substrate can, for example, be $10^{11}$ particles/cm$^2$ or less.

The methods can further comprise, for example, making the plasmonic substrate by depositing the plurality of plasmonic particles on a substrate. Depositing the plurality of plasmonic particles can comprise, for example, printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. In some examples, the film of the plasmonic metal has a thickness of from 2 nm to 100 nm. Thermally annealing the film can, for example, comprise heating the film at a temperature of from 400° C. to 600° C. (e.g., 550° C.). In some examples, the film can be thermally annealed for from 1 to 12 hours (e.g., 2 hours).

The plasmonic substrate can be, for example, in thermal contact with a liquid sample comprising a plurality of particles, the liquid sample having a first temperature. The liquid sample can further comprise, for example, an aqueous solvent. The first temperature can be, for example, from 273 K to 343 K. The concentration of the plurality of particles in the liquid sample can, for example, be from 1 particle/mm$^3$ to $10^{10}$ particles/mm$^3$. The plurality of particles in the liquid sample can have, for example, an average particle size of from 4 nm to 20 μm.

In some examples, the plurality of particles in the liquid sample can comprise a plurality of polymer particles (e.g., polystyrene particles), a plurality of metal particles, a plurality of semiconductor particles, a plurality of biological cells, or a combination thereof. In some examples, the plurality of particles in the liquid sample can comprise a plurality of polymer capped metal particles, such as a plurality of plasmonic particles, a plurality of quantum dots, or combinations thereof. In some examples, the plurality of particles in the liquid sample can comprise a plurality of polystyrene particles having an average particle size of from 10 nm to 10 μm. In some examples, the plurality of particles in the liquid sample can comprise a plurality of biological cells such as a plurality of yeast cells, a plurality of *Escherichia coli* cells, or a combination thereof. In some examples, the plurality of particles can comprise, a plurality of polystyrene spheres a plurality of biological cells (e.g., *E. coli*, yeast), or a combination thereof.

The methods can further comprise, for example, generating a confinement region at a location in the liquid sample proximate to the first location of the plasmonic substrate, wherein at least a portion of the confinement region has a second temperature that is greater than the first temperature such that the conferment region is bound by a temperature gradient. The second temperature can be, for example, from 276 K to 363 K. In some examples, the second temperature is greater than the first temperature by from 3 K to 20 K.

The methods can further comprise, for example, trapping at least a portion of the plurality of particles within the confinement region. The confinement region can, for example, have a diameter of from 500 nm to 100 μm. The portion of the plurality of particles trapped within the confinement region can be trapped, for example, convection, a thermophoretic force, an optical force, or combinations thereof. In some examples, convection can comprise natural convection, Maragoni convection, or combinations thereof. In some examples, the portion of the plurality of particles are not damaged during the trapping. In some examples, the portion of the plurality of particles trapped is one particle. The portion of the plurality of particles can be trapped, for example, at a trapping speed of from 200 nm/s to 50 μm/s.

The methods can further comprise, for example, illuminating a second location of the plasmonic substrate thereby: generating a second confinement region at a location in the liquid sample proximate to the second location of the plasmonic substrate, wherein at least a portion of the second confinement region has a third temperature that is greater than the first temperature such that the confinement region is bound by a temperature gradient; and translocating the trapped portion of the plurality of particles from the first confinement region to the second confinement region, trapping at least a second portion of the plurality of particles within the second confinement region, or a combination thereof. As used herein, "a second location" and "the second location" are meant to include any number of locations in any arrangement on the plasmonic substrate. Thus, for example "a second location" includes one or more second locations. In some embodiments, the second location can comprise a plurality of locations. In some embodiments, the second location can comprise a plurality of locations arranged in an ordered array. In some examples, the plasmonic substrate, the light source, the mirror, or a combination thereof can be translocated to illuminate the second location.

Also disclosed herein are patterned sample made using the methods described herein. Also disclosed herein are methods of use of patterned sample made using the methods described herein, for example using the patterned samples for single-particle sensing, single-cell analysis, tissue engineering, functional optical devices, intercellular communication, cell differentiation, immunological interaction, disease diagnosis, or combinations thereof.

Also disclosed herein are systems for performing the methods described herein. The systems 100 can comprise a plasmonic substrate 102 in thermal contact with a liquid sample 104 comprising a plurality of particles 106; and a light source 108 configured to illuminate the plasmonic substrate 102 at a first location 110. In some examples, the system 100 can include a single light source 108. In other examples, more than one light source 108 can be included in the system 100. In some examples, the systems 100 can further comprise a means for translocating the plasmonic substrate 102 and/or the light source 108. The system 110 can, in some examples, further comprise a mirror 111, wherein the system 110 can be aligned such that the light source 108 is configured to illuminate the mirror 111 and the mirror 111 is configured to reflect the electromagnetic radiation from the light source 108 to illuminate the first location 110 of the plasmonic substrate 102. In some examples, the systems 100 can further comprise a means for translocating the mirror 111. The system 110 can, in some examples, further comprise an instrument 112 configured to capture an electromagnetic signal from the plasmonic substrate 102. In some examples, the system 110 can further comprise a first lens 114. In some examples, the system 110 can further comprise a second lens 116. In some examples, the system 110 can be configured such that the light source 108 is below the first lens 114 and the plasmonic substrate 102 is above the first lens 114. In some examples, the system 110 is aligned such that the light source 108 is below the first lens 114, the plasmonic substrate 102 is above the first lens 114, the second lens 116 is above the plasmonic substrate 102, and the instrument 112 is above the second lens 116.

In some example, the systems 110 can further comprise a computing device 118 configured to receive and process electromagnetic signals from the instrument 112. In certain examples, system memory 122 comprises computer-executable instructions stored thereon that, when executed by the processor 120, cause the processor 120 to receive an electromagnetic signal from the instrument 112, process the electromagnetic signal to obtain a characteristic of the plasmonic substrate 102; and output the characteristic of the plasmonic substrate 102.

The instrument can comprise, for example, a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE FIGURES

The patent or application file contains at least one drawing executed in color. Copies of this patent or patent application publication with color drawing(s) will be provided by the Office upon request and payment of the necessary fee The accompanying figures, which are incorporated in and constitute a part of this specification, illustrate several aspects of the disclosure, and together with the description, serve to explain the principles of the disclosure.

DETAILED DESCRIPTION

Figure 1:
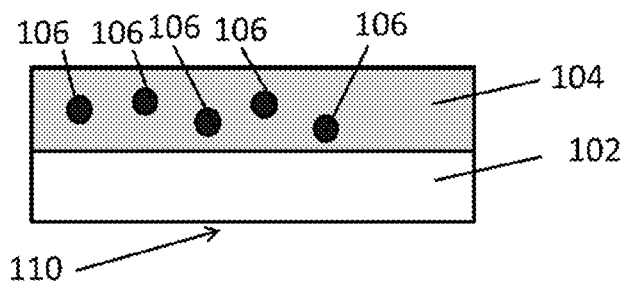
FIG. 1 is a schematic of an exemplary system as disclosed herein.
Figure 1:
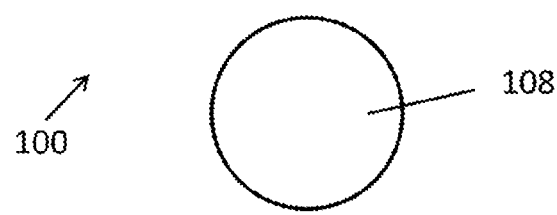

The systems and methods described herein may be understood more readily by reference to the following detailed description of specific aspects of the disclosed subject matter and the Examples included therein.

Before the present systems and methods are disclosed and described, it is to be understood that the aspects described below are not limited to specific synthetic methods or specific reagents, as such may, of course, vary. It is also to be understood that the terminology used herein is for the purpose of describing particular aspects only and is not intended to be limiting.

Also, throughout this specification, various publications are referenced. The disclosures of these publications in their entireties are hereby incorporated by reference into this application in order to more fully describe the state of the art to which the disclosed matter pertains. The references disclosed are also individually and specifically incorporated by reference herein for the material contained in them that is discussed in the sentence in which the reference is relied upon.

In this specification and in the claims that follow, reference will be made to a number of terms, which shall be defined to have the following meanings.

Throughout the description and claims of this specification the word "comprise" and other forms of the word, such as "comprising" and "comprises," means including but not limited to, and is not intended to exclude, for example, other additives, components, integers, or steps.

As used in the description and the appended claims, the singular forms "a," "an," and "the" include plural referents unless the context clearly dictates otherwise. Thus, for example, reference to "a composition" includes mixtures of two or more such compositions, reference to "an agent" includes mixtures of two or more such agents, reference to "the component" includes mixtures of two or more such components, and the like.

"Optional" or "optionally" means that the subsequently described event or circumstance can or cannot occur, and that the description includes instances where the event or circumstance occurs and instances where it does not.

Ranges can be expressed herein as from "about" one particular value, and/or to "about" another particular value. By "about" is meant within 5% of the value, e.g., within 4, 3, 2, or 1% of the value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

It is understood that throughout this specification the identifiers "first" and "second" are used solely to aid in distinguishing the various components and steps of the disclosed subject matter. The identifiers "first" and "second" are not intended to imply any particular order, amount, preference, or importance to the components or steps modified by these terms.

Disclosed herein are systems and methods, for example, for dynamically controlling colloidal particles and/or biological cells using optothermally controlled confinement regions. In some examples, the methods and systems can comprise locally exposing a substrate to an optical signal according to a desired pattern to thereby confine the colloidal particles and/or biological cells within said pattern.

Disclosed herein are methods comprising illuminating a first location of a plasmonic substrate with electromagnetic radiation, wherein the electromagnetic radiation comprises a wavelength that overlaps with at least a portion of the plasmon resonance energy of the plasmonic substrate. As used herein, "a first location" and "the first location" are meant to include any number of locations in any arrangement on the plasmonic substrate. Thus, for example "a first location" includes one or more first locations. In some embodiments, the first location can comprise a plurality of locations. In some embodiments, the first locations can comprise a plurality of locations arranged in an ordered array.

In some examples, the power density of the electromagnetic radiation can be 1 mW/µm² or less (e.g., 0.9 mW/µm² or less, 0.8 mW/µm² or less, 0.7 mW/µm² or less, 0.6 mW/µm² or less, 0.5 mW/µm² or less, 0.4 mW/µm² or less, 0.3 mW/µm² or less, 0.2 mW/µm² or less, 0.1 mW/µm² or less, 0.09 mW/µm² or less, 0.08 mW/µm² or less, 0.07 mW/µm² or less, 0.06 mW/µm² or less, 0.05 mW/µm² or less, 0.04 mW/µm² or less, 0.03 mW/µm² or less, 0.02 mW/µm² or less, 0.01 mW/µm² or less, 0.009 mW/µm² or less, 0.008 mW/µm² or less, 0.007 mW/µm² or less, or 0.006 mW/µm² or less). In some examples, the power density of the electromagnetic radiation can be 0.005 mW/µm² or more (e.g., 0.006 mW/µm² or more, 0.007 mW/µm² or more, 0.008 mW/µm² or more, 0.009 mW/µm² or more, 0.01 mW/μm² or more, 0.02 mW/μm² or more, 0.03 mW/μm² or more, 0.04 mW/μm² or more, 0.05 mW/μm² or more, 0.06 mW/μm² or more, 0.07 mW/μm² or more, 0.08 mW/μm² or more, 0.09 mW/μm² or more, 0.1 mW/μm² or more, 0.2 mW/μm² or more, 0.3 mW/μm² or more, 0.4 mW/μm² or more, 0.5 mW/μm² or more, 0.6 mW/μm² or more, 0.7 mW/μm² or more, 0.8 mW/μm² or more, or 0.9 mW/μm² or more). The power density of the electromagnetic radiation can range from any of the minimum values described above to any of the maximum values described above. For example, the power density of the electromagnetic radiation can range from 0.005 mW/μm² to 1 mW/μm² (e.g., from 0.005 mW/μm² to 0.5 mW/μm², from 0.5 mW/μm² to 1 mW/μm², from 0.005 mW/μm² to 0.01 mW/μm², from 0.01 mW/μm² to 0.05 mW/μm², from 0.05 mW/μm² to 0.1 mW/μm², from 0.1 mW/μm² to 0.5 mW/μm², or from 0.01 mW/μm² to 0.9 mW/μm²).

The electromagnetic radiation can, for example, be provided by a light source. The light source can be any type of light source. Examples of suitable light sources include natural light sources (e.g., sunlight) and artificial light sources (e.g., incandescent light bulbs, light emitting diodes, gas discharge lamps, arc lamps, lasers, etc.). In some examples, the light source is a laser.

In some examples, the light source is configured to illuminate a mirror, the mirror being configured to reflect the electromagnetic radiation from the light source to illuminate the first location of the plasmonic substrate. In some examples, the mirror can comprise a plurality of mirrors, such as an array of micromirrors (e.g., a digital micromirror device).

The plasmonic substrate can, in some examples, comprise a plurality of plasmonic particles. In some examples, the plurality of plasmonic particles can comprise a plurality of metal particles. The plurality of metal particles can, for example, comprise a metal selected from the group consisting of Au, Ag, Pd, Cu, Cr, Al, and combinations thereof. In some examples, the plurality of plasmonic particles can comprise a plurality of gold particles.

The plurality of plasmonic particles can have an average particle size. "Average particle size," "mean particle size," and "median particle size" are used interchangeably herein, and generally refer to the statistical mean particle size of the particles in a population of particles. For example, the average particle size for a plurality of particles with a substantially spherical shape can comprise the average diameter of the plurality of particles. For a particle with a substantially spherical shape, the diameter of a particle can refer, for example, to the hydrodynamic diameter. As used herein, the hydrodynamic diameter of a particle can refer to the largest linear distance between two points on the surface of the particle. For an anisotropic particle, the average particle size can refer to, for example, the average maximum dimension of the particle (e.g., the length of a rod shaped particle, the diagonal of a cube shape particle, the bisector of a triangular shaped particle, etc.) For an anisotropic particle, the average particle size can refer to, for example, the hydrodynamic size of the particle. Mean particle size can be measured using methods known in the art, such as evaluation by scanning electron microscopy, transmission electron microscopy, and/or dynamic light scattering.

The plurality of plasmonic particles have, for example, an average particle size of 10 nm or more (e.g., 15 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, 100 nm or more, 110 nm or more, 120 nm or more, 130 nm or more, 140 nm or more, 150 nm or more, 160 nm or more, 170 nm or more, 180 nm or more, 190 nm or more, 200 nm or more, 210 nm or more, 220 nm or more, 230 nm or more, 240 nm or more, 250 nm or more, 275 nm or more, 300 nm or more, 325 nm or more, 350 nm or more, 375 nm or more, 400 nm or more, 425 nm or more, 450 nm or more, or 475 nm or more).

In some examples, the plurality of plasmonic particles can have an average particle size of 500 nm or less (e.g., 475 nm or less, 450 nm or less, 425 nm or less, 400 nm or less, 375 nm or less, 350 nm or less, 325 nm or less, 300 nm or less, 290 nm or less, 280 nm or less, 270 nm or less, 260 nm or less, 250 nm or less, 240 nm or less, 230 nm or less, 220 nm or less, 210 nm or less, 200 nm or less, 190 nm or less, 180 nm or less, 170 nm or less, 160 nm or less, 150 nm or less, 140 nm or less, 130 nm or less, 120 nm or less, 110 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, or 15 nm or less).

The average particle size of the plurality of plasmonic particles can range from any of the minimum values described above to any of the maximum values described above. For example, the plurality of plasmonic particles can have an average particle size of from 10 nm to 500 nm (e.g., from 10 nm to 250 nm, from 250 nm to 500 nm, from 10 nm to 100 nm, from 100 nm to 200 nm, from 200 nm to 300 nm, from 300 nm to 400 nm, from 400 nm to 500 nm, or from 10 nm to 300 nm).

In some examples, the plurality of plasmonic particles can be substantially monodisperse. "Monodisperse" and "homogeneous size distribution," as used herein, and generally describe a population of particles where all of the particles are the same or nearly the same size. As used herein, a monodisperse distribution refers to particle distributions in which 80% of the distribution (e.g., 85% of the distribution, 90% of the distribution, or 95% of the distribution) lies within 25% of the median particle size (e.g., within 20% of the median particle size, within 15% of the median particle size, within 10% of the median particle size, or within 5% of the median particle size).

The plurality of plasmonic particles can comprise particles of any shape (e.g., a sphere, a rod, a quadrilateral, an ellipse, a triangle, a polygon, etc.). In some examples, the plurality of plasmonic particles can have an isotropic shape. In some examples, the plurality of plasmonic particles can have an anisotropic shape. In some examples, the plurality of plasmonic particles are substantially spherical.

In some examples, each plasmonic particle within the plurality of plasmonic particles on the substrate is separated from its neighboring plasmonic particles by an average distance of 2 nm or more (e.g., 3 nm or more, 4 nm or more, 5 nm or more, 6 nm or more, 7 nm or more, 8 nm or more, 9 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 55 nm or more, 60 nm or more, 65 nm or more, 70 nm or more, 75 nm or more, 80 nm or more, 85 nm or more, 90 nm or more, 95 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 750 nm or more, 800 nm or more, 850 nm or more, 900 nm or more, 950 nm or more, 1000 nm or more, 1100 nm or more, 1200 nm or more, 1300 nm or more, or 1400 nm or more).

In some examples, each plasmonic particle within the plurality of plasmonic particles on the substrate is separated from its neighboring plasmonic particles by an average distance of 1500 nm or less (e.g., 1400 nm or less, 1300 nm or less, 1200 nm or less, 1100 nm or less, 1000 nm or less, 950 nm or less, 900 nm or less, 850 nm or less, 800 nm or less, 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 95 nm or less, 90 nm or less, 85 nm or less, 80 nm or less, 75 nm or less, 70 nm or less, 65 nm or less, 60 nm or less, 55 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9 nm or less, 8 nm or less, 7 nm or less, 6 nm or less, 5 nm or less, 4 nm or less, or 3 nm or less).

The average distance that each plasmonic particle within the plurality of plasmonic particles on the substrate is separated from its neighboring plasmonic particles can range from any of the minimum values described above to any of the maximum values described above. For example, each plasmonic particle within the plurality of plasmonic particles on the substrate is separated from its neighboring plasmonic particles by an average distance of from 3 nm to 1500 nm (e.g., from 3 nm to 750 nm, from 750 nm to 1500 nm, from 3 nm to 500 nm, from 500 nm to 1000 nm, from 1000 nm to 1500 nm, or from 5 nm to 1000 nm).

The density of the plurality of plasmonic particles on the plasmonic substrate can, for example, be $10^7$ particles/$cm^2$ or more (e.g., $2.5 \times 10^7$ particles/$cm^2$ or more, $5 \times 10^7$ particles/$cm^2$ or more, $7.5 \times 10^7$ particles/$cm^2$ or more, $1 \times 10^8$ particles/$cm^2$ or more, $2.5 \times 10^8$ particles/$cm^2$ or more, $5 \times 10^8$ particles/$cm^2$ or more, $7.5 \times 10^8$ particles/$cm^2$ or more, $1 \times 10^9$ particles/$cm^2$ or more, $2.5 \times 10^9$ particles/$cm^2$ or more, $5 \times 10^9$ particles/$cm^2$ or more, $7.5 \times 10^9$ particles/$cm^2$ or more, $1 \times 10^{10}$ particles/$cm^2$ or more, $2.5 \times 10^{10}$ particles/$cm^2$ or more, $5 \times 10^{10}$ particles/$cm^2$ or more, or $7.5 \times 10^{10}$ particles/$cm^2$ or more). In some examples, the density of the plurality of plasmonic particles on the plasmonic substrate can be $10^{11}$ particles/$cm^2$ or less (e.g., $7.5 \times 10^{10}$ particles/$cm^2$ or less, $5 \times 10^{10}$ particles/$cm^2$ or less, $2.5 \times 10^{10}$ particles/$cm^2$ or less, $1 \times 10^{10}$ particles/$cm^2$ or less, $7.5 \times 10^9$ particles/$cm^2$ or less, $5 \times 10^9$ particles/$cm^2$ or less, $2.5 \times 10^9$ particles/$cm^2$ or less, $1 \times 10^9$ particles/$cm^2$ or less, $7.5 \times 10^8$ particles/$cm^2$ or less, $5 \times 10^8$ particles/$cm^2$ or less, $2.5 \times 10^8$ particles/$cm^2$ or less, $1 \times 10^8$ particles/$cm^2$ or less, $7.5 \times 10^7$ particles/$cm^2$ or less, $5 \times 10^7$ particles/$cm^2$ or less, or $2.5 \times 10^7$ particles/$cm^2$ or less). The density of the plasmonic particles on the plasmonic substrate can range from any of the minimum values described above to any of the maximum values described above. For example, the density of the plurality of plasmonic particles on the plasmonic substrate can be from $10^7$ particles/$cm^2$ to $10^{11}$ particles/$cm^2$ (e.g., from $1 \times 10^7$ particles/$cm^2$ to $1 \times 10^9$ particles/$cm^2$, from $1 \times 10^9$ particles/$cm^2$ to $1 \times 10^{11}$ particles/$cm^2$, from $1 \times 10^7$ particles/$cm^2$ to $1 \times 10^8$ particles/$cm^2$, from $1 \times 10^8$ particles/$cm^2$ to $1 \times 10^9$ particles/$cm^2$, from $1 \times 10^9$ particles/$cm^2$ to $1 \times 10^{10}$ particles/$cm^2$, from $1 \times 10^{10}$ particles/$cm^2$ to $1 \times 10^{11}$ particles/$cm^2$, or from $2.5 \times 10^7$ particles/$cm^2$ to $7.5 \times 10^{10}$ particles/$cm^2$).

The size, shape, and/or composition of the plurality of plasmonic particles; the separation between each particle within the plurality of plasmonic particles; the density of the plasmonic particles on the substrate; or combinations thereof can be selected in view of a variety of factors. In some examples, the size, shape, and/or composition of the plurality of plasmonic particles can be selected to maximize the electromagnetic field enhancement. For example, the size, shape, and/or composition of the plurality of plasmonic particles; the separation between each particle within the plurality of plasmonic particles; the density of the plasmonic particles on the substrate; or combinations thereof can be selected such that the intensity of an incident electromagnetic field is enhanced by a factor of 5 or more by the plurality of plasmonic particles (e.g., 10 or more, 20 or more, 30 or more, 40 or more, 50 or more, 60 or more 70 or more, 80 or more, 90 or more, or 100 or more). In some examples, the size, shape, and/or composition of the plurality of plasmonic particles; the separation between each particle within the plurality of plasmonic particles; the density of the plasmonic particles on the substrate; or combinations thereof can be selected such that the plasmon resonance energy of the plasmonic substrate overlaps with at least a portion of the electromagnetic radiation used to illuminate the plasmonic substrate.

The methods can further comprise, for example, making the plasmonic substrate by depositing the plurality of plasmonic particles on a substrate. Depositing the plurality of plasmonic particles can comprise, for example, printing, lithographic deposition, electron beam deposition, thermal deposition, spin coating, drop-casting, zone casting, dip coating, blade coating, spraying, vacuum filtration, or combinations thereof.

The methods can further comprise, for example, making the plasmonic substrate by thermally annealing a film of a plasmonic metal deposited on a substrate, thereby forming the plurality of plasmonic particles on the substrate. In some examples, the methods can further comprise depositing the film of the plasmonic metal on the substrate. The film of plasmonic metal can be deposited on the substrate, for example, by thin film processing techniques, such as sputtering, pulsed layer deposition, molecular beam epitaxy, evaporation, atomic layer deposition, or combinations thereof. In some examples, the film of the plasmonic metal can have a thickness of 2 nm or more (e.g., 2.5 nm or more, 3 nm or more, 3.5 nm or more, 4 nm or more, 4.5 nm or more, 5 nm or more, 5.5 nm or more, 6 nm or more, 6.5 nm or more, 7 nm or more, 7.5 nm or more, 8 nm or more, 8.5 nm or more, 9 nm or more, 9.5 nm or more, 10 nm or more, 11 nm or more, 12 nm or more, 13 nm or more, 14 nm or more, 15 nm or more, 16 nm or more, 17 nm or more, 18 nm or more, 19 nm or more, 20 nm or more, 25 nm or more, 30 nm or more, 35 nm or more, 40 nm or more, 45 nm or more, 50 nm or more, 60 nm or more, 70 nm or more, 80 nm or more, or 90 nm or more). In some examples, the film of the plasmonic metal can have a thickness of 100 nm or less (e.g., 90 nm or less, 80 nm or less, 70 nm or less, 60 nm or less, 50 nm or less, 45 nm or less, 40 nm or less, 35 nm or less, 30 nm or less, 25 nm or less, 20 nm or less, 19 nm or less, 18 nm or less, 17 nm or less, 16 nm or less, 15 nm or less, 14 nm or less, 13 nm or less, 12 nm or less, 11 nm or less, 10 nm or less, 9.5 nm or less, 9 nm or less, 8.5 nm or less, 8 nm or less, 7.5 nm or less, 7 nm or less, 6.5 nm or less, 6 nm or less, 5.5 nm or less, 5 nm or less, 4.5 nm or less, 4 nm or less, 3.5 nm or less, 3 nm or less, or 2.5 nm or less). The thickness of the film of the plasmonic metal can range from any of the minimum values described above to any of the maximum values described above. For example, the film of the plasmonic metal can have a thickness of from 2 nm to 100 nm (e.g., from 2 nm to 50 nm, from 50 nm to 100 nm, from 2 nm to 25 nm, from 25 nm to 50 nm, from 50 nm to 75 nm, from 75 nm to 100 nm, or from 5 nm to 90 nm).

Thermally annealing the film can, for example, comprise heating the film at a temperature of 400° C. or more (e.g., 410° C. or more, 420° C. or more, 430° C. or more, 440° C. or more, 450° C. or more, 460° C. or more, 470° C. or more, 480° C. or more, 490° C. or more, 500° C. or more, 510° C. or more, 520° C. or more, 530° C. or more, 540° C. or more, 550° C. or more, 560° C. or more, 570° C. or more, 580° C. or more, or 590° C. or more). In some examples, thermally annealing the film can comprise heating the film at a temperature of 600° C. or less (e.g., 590° C. or less, 580° C. or less, 570° C. or less, 560° C. or less, 550° C. or less, 540° C. or less, 530° C. or less, 520° C. or less, 510° C. or less, 500° C. or less, 490° C. or less, 480° C. or less, 470° C. or less, 460° C. or less, 450° C. or less, 440° C. or less, 430° C. or less, 420° C. or less, or 410° C. or less). The temperature at which the film is heated during thermal annealing can range from any of the minimum values described above to any of the maximum values described above. For example, thermally annealing the film can comprise heating the film at a temperature of from 400° C. to 600° C. (e.g., from 400° C. to 500° C., from 500° C. to 600° C., from 400° C. to 450° C., from 450° C. to 500° C., from 500° C. to 550° C., from 550° C. to 600° C., from 450° C. to 550° C., or from 520° C. to 580° C.). In some examples, thermally annealing the film can comprise heating the film at a temperature of 550° C.

In some examples, the film can be thermally annealed for 1 hour or more (e.g., 1.5 hours or more, 2 hours or more, 2.5 hours or more, 3 hours or more, 3.5 hours or more, 4 hours or more, 4.5 hours or more, 5 hours or more, 5.5 hours or more, 6 hours or more, 6.5 hours or more, 7 hours or more, 7.5 hours or more, 8 hours or more, 8.5 hours or more, 9 hours or more, 9.5 hours or more, 10 hours or more, 10.5 hours or more, 11 hours or more, or 11.5 hours or more). In some examples, the film can be thermally annealed for 12 hours or less (e.g., 11.5 hours or less, 11 hours or less, 10.5 hours or less, 10 hours or less, 9.5 hours or less, 9 hours or less, 8.5 hours or less, 8 hours or less, 7.5 hours or less, 7 hours or less, 6.5 hours or less, 6 hours or less, 5.5 hours or less, 5 hours or less, 4.5 hours or less, 4 hours or less, 3.5 hours or less, 3 hours or less, 2.5 hours or less, 2 hours or less, or 1.5 hours or less). The time for which the film can be thermally annealed can range from any of the minimum values described above to any of the maximum values described above. For example, the film can be thermally annealed for from 1 hour to 12 hours (e.g., from 1 hour to 6 hours, from 6 hours to 12 hours, from 1 hour to 4 hours, from 4 hours to 8 hours, from 8 hours to 12 hours, from 1 hour to 10 hours, or from 1 hour to 3 hours). In some examples, the film can be thermally annealed for 2 hours.

The plasmonic substrate can be, for example, in thermal contact with a liquid sample comprising a plurality of particles, the liquid sample having a first temperature. The liquid sample can further comprise, for example, an aqueous solvent. The first temperature can be, for example, 273 K or more (e.g., 275 K or more, 280 K or more, 285 K or more, 290 K or more, 295 K or more, 300 K or more, 305 K or more, 310 K or more, 315 K or more, 320 K or more, 325 K or more, 330 K or more, 335 K or more, or 340 K or more). In some examples, the first temperature can be 343 K or less (e.g., 340 K or less, 335 K or less, 330 K or less, 325 K or less, 320 K or less, 315 K or less, 310 K or less, 305 K or less, 300 K or less, 295 K or less, 290 K or less, 285 K or less, 280 K or less, or 275 K or less). The first temperature can range from any of the minimum values described above to any of the maximum values described above. For example, the first temperature can be from 273 K to 343 K (e.g., from 273 K to 305 K, from 305 K to 343 K, from 273 K to 285 K, from 285 K to 300 K, from 300 K to 315 K, from 315 K to 330 K, from 330 K to 434 K, or from 275 K to 340 K).

The concentration of the plurality of particles in the liquid sample can be, for example, 1 particle/mm$^3$ or more (e.g., 2.5 particles/mm$^3$ or more, 5 particles/mm$^3$ or more, 7.5 particles/mm$^3$ or more, $1\times10^1$ particles/mm$^3$ or more, $2.5\times10^1$ particles/mm$^3$ or more, $5\times10^1$ particles/mm$^3$ or more, $7.5\times10^1$ particles/mm$^3$ or more, $1\times10^2$ particles/mm$^3$ or more, $2.5\times10^2$ particles/mm$^3$ or more, $5\times10^2$ particles/mm$^3$ or more, $7.5\times10^2$ particles/mm$^3$ or more, $1\times10^3$ particles/mm$^3$ or more, $2.5\times10^3$ particles/mm$^3$ or more, $5\times10^3$ particles/mm$^3$ or more, $7.5\times10^3$ particles/mm$^3$ or more, $1\times10^4$ particles/mm$^3$ or more, $2.5\times10^4$ particles/mm$^3$ or more, $5\times10^4$ particles/mm$^3$ or more, $7.5\times10^4$ particles/mm$^3$ or more, $1\times10^5$ particles/mm$^3$ or more, $2.5\times10^5$ particles/mm$^3$ or more, $5\times10^5$ particles/mm$^3$ or more, $7.5\times10^5$ particles/mm$^3$ or more, $1\times10^6$ particles/mm$^3$ or more, $2.5\times10^6$ particles/mm$^3$ or more, $5\times10^6$ particles/mm$^3$ or more, $7.5\times10^6$ particles/mm$^3$ or more, $1\times10^7$ particles/mm$^3$ or more, $2.5\times10^7$ particles/mm$^3$ or more, $5\times10^7$ particles/mm$^3$ or more, $7.5\times10^7$ particles/mm$^3$ or more, $1\times10^8$ particles/mm$^3$ or more, $2.5\times10^8$ particles/mm$^3$ or more, $5\times10^8$ particles/mm$^3$ or more, $7.5\times10^8$ particles/mm$^3$ or more, $1\times10^9$ particles/mm$^3$ or more, $2.5\times10^9$ particles/mm$^3$ or more, $5\times10^9$ particles/mm$^3$ or more, or $7.5\times10^9$ particles/mm$^3$ or more).

In some examples, the concentration of the plurality of particles can be $10^{10}$ particles/mm$^3$ or less (e.g., $7.5\times10^9$ particles/mm$^3$ or less, $5\times10^9$ particles/mm$^3$ or less, $2.5\times10^9$ particles/mm$^3$ or less, $1\times10^9$ particles/mm$^3$ or less, $7.5\times10^8$ particles/mm$^3$ or less, $5\times10^8$ particles/mm$^3$ or less, $2.5\times10^8$ particles/mm$^3$ or less, $1\times10^8$ particles/mm$^3$ or less, $7.5\times10^7$ particles/mm$^3$ or less, $5\times10^7$ particles/mm$^3$ or less, $2.5\times10^7$ particles/mm$^3$ or less, $1\times10^7$ particles/mm$^3$ or less, $7.5\times10^6$ particles/mm$^3$ or less, $5\times10^6$ particles/mm$^3$ or less, $2.5\times10^6$ particles/mm$^3$ or less, $1\times10^6$ particles/mm$^3$ or less, $7.5\times10^5$ particles/mm$^3$ or less, $5\times10^5$ particles/mm$^3$ or less, $2.5\times10^5$ particles/mm$^3$ or less, $1\times10^5$ particles/mm$^3$ or less, $7.5\times10^4$ particles/mm$^3$ or less, $5\times10^4$ particles/mm$^3$ or less, $2.5\times10^4$ particles/mm$^3$ or less, $1\times10^4$ particles/mm$^3$ or less, $7.5\times10^3$ particles/mm$^3$ or less, $5\times10^3$ particles/mm$^3$ or less, $2.5\times10^3$ particles/mm$^3$ or less, $1\times10^3$ particles/mm$^3$ or less, $7.5\times10^2$ particles/mm$^3$ or less, $5\times10^2$ particles/mm$^3$ or less, $2.5\times10^2$ particles/mm$^3$ or less, $1\times10^2$ particles/mm$^3$ or less, $7.5\times10^1$ particles/mm$^3$ or less, $5\times10^1$ particles/mm$^3$ or less, $2.5\times10^1$ particles/mm$^3$ or less, $1\times10^1$ particles/mm$^3$ or less, 7.5 particles/mm$^3$ or less, 5 particles/mm$^3$ or less, or 2.5 particles/mm$^3$ or less).

The concentration of the plurality of particles in the liquid sample can range from any of the minimum values described above to any of the maximum values described above. For example, the concentration of the plurality of particles in the liquid sample can be from 1 particle/mm$^3$ to $10^{10}$ particles/mm$^3$ (e.g., from 1 particle/mm$^3$ to $10^5$ particles/mm$^3$, from $10^5$ particles/mm$^3$ to $10^{10}$ particles/mm$^3$, from 1 particle/mm$^3$ to $10^2$ particles/mm$^3$, from $10^2$ particles/mm$^3$ to $10^4$ particles/mm$^3$, from $10^4$ particles/mm$^3$ to $10^8$ particles/mm$^3$, from $10^8$ particles/mm$^3$ to $10^{10}$ particles/mm$^3$, or from $10^1$ particles/mm$^3$ to $10^9$ particles/mm$^3$).

The plurality of particles in the liquid sample can have, for example, an average particle size of 4 nm or more (e.g., 5 nm or more, 10 nm or more, 15 nm or more, 20 nm or more, 25 nm or more, 30 nm or more, 35 nm or more, 40 nm or more, 45 nm or more, 50 nm or more, 75 nm or more, 100 nm or more, 125 nm or more, 150 nm or more, 175 nm or more, 200 nm or more, 225 nm or more, 250 nm or more, 275 nm or more, 300 nm or more, 325 nm or more, 350 nm or more, 375 nm or more, 400 nm or more, 425 nm or more, 450 nm or more, 475 nm or more, 500 nm or more, 550 nm or more, 600 nm or more, 650 nm or more, 700 nm or more, 750 nm or more, 800 nm or more, 850 nm or more, 900 nm or more, 950 nm or more, 1 µm or more, 2 µm or more, 3 µm or more, 4 µm or more, 5 µm or more, 6 µm or more, 7 µm or more, 8 µm or more, 9 µm or more, 10 µm or more, 11 µm or more, 12 µm or more, 13 µm or more, 14 µm or more, 15 µm or more, 16 µm or more, 17 µm or more, 18 µm or more, or 19 µm or more).

In some examples, the plurality of particles in the liquid sample can have an average particle diameter of 20 µm or less (e.g., 19 µm or less, 18 µm or less, 17 µm or less, 16 µm or less, 15 µm or less, 14 µm or less, 13 µm or less, 12 µm or less, 11 µm or less, 10 µm or less, 9 µm or less, 8 µm or less, 7 µm or less, 6 µm or less, 5 µm or less, 4 µm or less, 3 µm or less, 2 µm or less, 1 µm or less, 950 nm or less, 900 nm or less, 850 nm or less, 800 nm or less, 750 nm or less, 700 nm or less, 650 nm or less, 600 nm or less, 550 nm or less, 500 nm or less, 475 nm or less, 450 nm or less, 425 nm or less, 400 nm or less, 375 nm or less, 350 nm or less, 325 nm or less, 300 nm or less, 275 nm or less, 250 nm or less, 225 nm or less, 200 nm or less, 175 nm or less, 150 nm or less, 125 nm or less, 100 nm or less, 75 nm or less, 50 nm or less, 45 nm or less, 40 nm or less, 35 nm or less, 30 nm or less, 25 nm or less, 20 nm or less, 15 nm or less, 10 nm or less, or 5 nm or less).

The average particle size of the plurality of particles in the liquid sample can range from any of the minimum values described above to any of the maximum values described above. For example the plurality of particles in the liquid sample can have an average particle size of from 4 nm to 20 µm (e.g., from 4 nm to 10 µm, from 10 µm to 20 µm, from 4 nm to 1 µm, from 1 µm to 10 µm, from 10 µm to 20 µm, or from 50 nm to 15 µm).

In some examples, the plurality of particles in the liquid sample can comprise a plurality of polymer particles (e.g., polystyrene particles), a plurality of metal particles, a plurality of semiconductor particles, a plurality of biological cells, or a combination thereof. In some examples, the plurality of particles in the liquid sample can comprise a plurality of polymer capped metal particles, such as a plurality of plasmonic particles, a plurality of quantum dots, or combinations thereof. In some examples, the plurality of particles in the liquid sample can comprise a plurality of polystyrene particles having an average particle size of from 10 nm to 10 µm. In some examples, the plurality of particles in the liquid sample can comprise a plurality of biological cells such as a plurality of fungal cells, a plurality of bacterial cells, or a combination thereof. Examples of fungal cells include, but are not limited to yeast cells, *Blastomyces dermatitidis* cells, *Coccidioides immitits* cells, *Cryptococcus neoformans* cells, *Histoplasma capsulatum* cells, and combinations thereof. Examples of bacterial cells include, but are not limited to, *bacillus* bacteria, *Brucella melitensis, Campylocavter jejuni, clostridium* bacteria (e.g., *Clostridium botulinum, Clostridium perfringens*), *Corynebacterium bovis, Enterobacter aerogenes, Escherichia coli, Klebsiella pneumoniae, Klebsiella oxytoca, Listeria monocytogenes, Mycobacterium tuberculosis, Mycoplasma* spp., *Pasteurella* spp., *Proteus* spp., *Pseudomonas aeruginosa, salmonella typhosa, Salmonella Enteritidis, Salmonella typhimurium, Serratia marcescens, Shigella, Staphylococcus aureus, Staphylococcus epidermidis, Streptococcus agalactiae, Streptococcus pyogenes, Streptococcus uberis, Trueperella pyogenes, Vibrio cholerea, Vibrio parahaemolyticus, Vibria vulnificus, Yersinia enterocolitica*, and combinations thereof.

In some examples, the plurality of particles can comprise, a plurality of polystyrene spheres, a plurality of biological cells (e.g., *E. coli*, yeast) or a combination thereof.

The methods can further comprise, for example, generating a confinement region at a location in the liquid sample proximate to the first location of the plasmonic substrate, wherein at least a portion of the confinement region has a second temperature that is greater than the first temperature such that the confinement region is bound by a temperature gradient. For example, the confinement region is located within at least a portion of the three-dimensional area within the liquid sample defined by the temperature gradient (e.g., the boundary of the confinement region can defined by the temperature gradient). The confinement region can comprise a three dimensional area within the liquid sample where the balance of forces acting on the portion of the plurality of particles substantially localizes the portion of the plurality of particles. The second temperature can be, for example, of 273 K or more (e.g., 275 K or more, 280 K or more, 285 K or more, 290 K or more, 295 K or more, 300 K or more, 305 K or more, 310 K or more, 315 K or more, 320 K or more, 325 K or more, 330 K or more, 335 K or more, 340 K or more, 345 K or more, 350 K or more, 355 K or more, or 360 K or more). In some examples, the second temperature can be 363 K or less (e.g., 360 K or less, 355 K or less, 350 K or less, 345 K or less, 340 K or less, 335 K or less, 330 K or less, 325 K or less, 320 K or less, 315 K or less, 310 K or less, 305 K or less, 300 K or less, 295 K or less, 290 K or less, 285 K or less, 280 K or less, or 275 K or less). The second temperature can range from any of the minimum values described above to any of the maximum values described above. For example, the second temperature can be from 273 K to 363 K (e.g., from 273 K to 315 K, from 315 K to 363 K, from 273 K to 290 K, from 290 K to 310 K, from 310 K to 330 K, from 330 K to 350 K, from 350 K to 363 K, or from 275 to 360 K).

In some examples, the second temperature can be greater than the first temperature by 3 K or more (e.g., 4 K or more, 5 K or more, 6 K or more, 7 K or more, 8 K or more, 9 K or more, 10 K or more, 11 K or more, 12 K or more, 13 K or more, 14 K or more, 15 K or more, 16 K or more, 17 K or more, 18 K or more, or 19 K or more). In some examples, the second temperature can be greater than the first temperature by 20 K or less (e.g., 19 K or less, 18 K or less, 17 K or less, 16 K or less, 15 K or less, 14 K or less, 13 K or less, 12 K or less, 11 K or less, 10 K or less, 9 K or less, 8 K or less, 7 K or less, 6 K or less, 5 K or less, or 4 K or less). The amount that the second temperature is greater than the first temperature by can range from any of the minimum values described above to any of the maximum values described above. For example, the second temperature can be greater than the first temperature by from 3 K to 20 K (e.g., from 3 K to 12 K, from 12 K to 20 K, from 3 K to 6 K, from 6 K to 9 K, from 9 K to 12 K, from 12 K to 15 K, from 15 K to 18 K, from 18 K to 20 K, or from 5 K to 18 K).

In some examples, the confinement region is generated by plasmon-enhanced photothermal effects. The confinement region can, for example, have a diameter of 500 nm or more (e.g., 550 nm or more, 600 nm or more, 650 nm or more, 700 nm or more, 750 nm or more, 800 nm or more, 850 nm or more, 900 nm or more, 950 nm or more, 1 µm or more, 2 µm or more, 3 µm or more, 4 µm or more, 5 µm or more, 6 µm or more, 7 µm or more, 8 µm or more, 9 µm or more, 10 µm or more, 15 µm or more, 20 µm or more, 25 µm or more, 30 µm or more, 35 µm or more, 40 µm or more, 45 µm or more, 50 µm or more, 60 µm or more, 70 µm or more, 80 µm or more, or 90 µm or more). In some examples, the confinement region can have a diameter of 100 µm or less (e.g., 90 µm or less, 80 µm or less, 70 µm or less, 60 µm or less, 50 µm or less, 45 µm or less, 40 µm or less, 35 µm or less, 30 µm or less, 25 µm or less, 20 µm or less, 15 µm or less, 10 µm or less, 9 µm or less, 8 µm or less, 7 µm or less, 6 µm or less, 5 µm or less, 4 µm or less, 3 µm or less, 2 µm or less, 1 µm or less, 950 nm or less, 900 nm or less, 850 nm or less, 800 nm or less, 750 nm or less, 700 nm or less, 650 nm or less, 600 nm or less, or 550 nm or less). The diameter of the confinement region can range from any of the minimum values described above to any of the maximum values described above. For example, the confinement region can have a diameter of from 500 nm to 100 µm (e.g., from 500 nm to 50 µm, from 50 µm to 100 µm, from 500 nm to 20 µm, from 20 µm to 40 µm, from 40 µm to 60 µm, from 60 µm to 80 µm, from 80 µm to 100 µm, or from 600 nm to 90 µm). The diameter of the confinement region can, for example, be controlled by the power density of the electromagnetic radiation used to illuminate the plasmonic substrate. The diameter of the confinement region can be selected in view of a number of factors. In some examples, the diameter of the confinement region can be selected relative to the average particle size of the plurality of particles in the liquid sample.

The methods can further comprise, for example, trapping at least a portion of the plurality of particles within the confinement region. The portion of the plurality of particles trapped within the confinement region can be trapped, for example, convection, a thermophoretic force, an optical force, or combinations thereof. In some examples, convection can comprise natural convection, Maragoni convection, or combinations thereof. In some examples, the portion of the plurality of particles are not damaged during the trapping. In some examples, the portion of the plurality of particles trapped is one particle. In other words, also disclosed herein are methods for single-particle trapping. The portion of the plurality of particles can be trapped, for example, at a trapping speed of 200 nm/s or more (e.g., 300 nm/s or more, 400 nm/s or more, 500 nm/s or more, 600 nm/s or more, 700 nm/s or more, 800 nm/s or more, 900 nm/s or more, 1 µm/s or more, 2 µm/s or more, 3 µm/s or more, 4 µm/s or more, 5 µm/s or more, 6 µm/s or more, 7 µm/s or more, 8 µm/s or more, 9 µm/s or more, 10 µm/s or more, 15 µm/s or more, 20 µm/s or more, 25 µm/s or more, 30 µm/s or more, 35 µm/s or more, 40 µm/s or more, or 45 µm/s or more). In some examples, the portion of the plurality of particles can be trapped at a trapping speed of 50 µm/s or less (e.g., 45 µm/s or less, 40 µm/s or less, 35 µm/s or less, 30 µm/s or less, 25 µm/s or less, 20 µm/s or less, 15 µm/s or less, 10 µm/s or less, 9 µm/s or less, 8 µm/s or less, 7 µm/s or less, 6 µm/s or less, 5 µm/s or less, 4 µm/s or less, 3 µm/s or less, 2 µm/s or less, 1 µm/s or less, 900 nm/s or less, 800 nm/s or less, 700 nm/s or less, 600 nm/s or less, 500 nm/s or less, 400 nm/s or less, or 300 nm/s or less). The trapping speed at which the portion of the plurality of particles is trapped can range from any of the minimum values described above to any of the maximum values described above. For example, the portion of the plurality of particles can be trapped at a trapping speed of from 200 nm/s to 50 µm/s (e.g., from 200 nm/s to 25 µm/s, from 25 µm/s to 50 µm/s, from 200 nm/s to 10 µm/s, from 10 µm/s to 20 µm/s, from 20 µm/s to 30 µm/s, from 30 µm/s to 40 µm/s, from 40 µm/s to 50 µm/s, or from 300 nm/s to 45 µm/s).

The methods can further comprise, for example, illuminating a second location of the plasmonic substrate thereby: generating a second confinement region at a location in the liquid sample proximate to the second location of the plasmonic substrate, wherein at least a portion of the second confinement region has a third temperature that is greater than the first temperature such that the second confinement region is bound by a temperature gradient; and translocating the trapped portion of the plurality of particles from the first confinement region to the second confinement region, trapping at least a second portion of the plurality of particles within the second confinement region, or a combination thereof. As used herein, "a second location" and "the second location" are meant to include any number of locations in any arrangement on the plasmonic substrate. Thus, for example "a second location" includes one or more second locations. In some embodiments, the second location can comprise a plurality of locations. In some embodiments, the second location can comprise a plurality of locations arranged in an ordered array. In some examples, the plasmonic substrate, the light source, the mirror, or a combination thereof can be translocated to illuminate the second location. As used herein translocating refers to any type of movement about any axis (e.g., rotation, translation, etc.) In other words, as used herein, translocation refers to a change in position and/or orientation.

Also disclosed herein are patterned sample made using the methods described herein. Also disclosed herein are methods of use of patterned sample made using the methods described herein, for example using the patterned samples for single-particle sensing, single-cell analysis, tissue engineering, functional optical devices, intercellular communication, cell differentiation, immunological interaction, disease diagnosis, or combinations thereof.

Also disclosed herein are systems for performing the methods described herein. Referring now to FIG. 1, the systems 100 can comprise a plasmonic substrate 102 in thermal contact with a liquid sample 104 comprising a plurality of particles 106; and a light source 108 configured to illuminate the plasmonic substrate 102 at a first location 110. In some examples, the system 100 can include a single light source 108. In other examples, more than one light source 108 can be included in the system 100.

In some examples, the systems 100 can further comprise a means for translocating the plasmonic substrate 102 and/or the light source 108.

Figure 2:
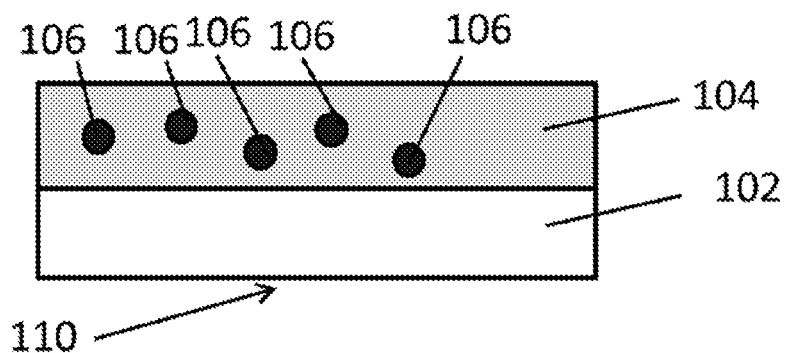
FIG. 2 is a schematic of an exemplary system as disclosed herein.
Figure 2:
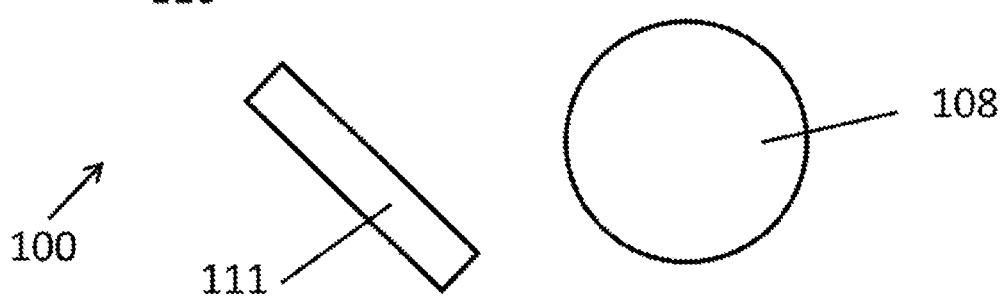

Referring now to FIG. 2, the system 110 can, in some examples, further comprise a mirror 111, wherein the system 110 can be aligned such that the light source 108 is configured to illuminate the mirror 111 and the mirror 111 is configured to reflect the electromagnetic radiation from the light source 108 to illuminate the first location 110 of the plasmonic substrate 102. In some examples, the systems 100 can further comprise a means for translocating the mirror 111.

Figure 3:
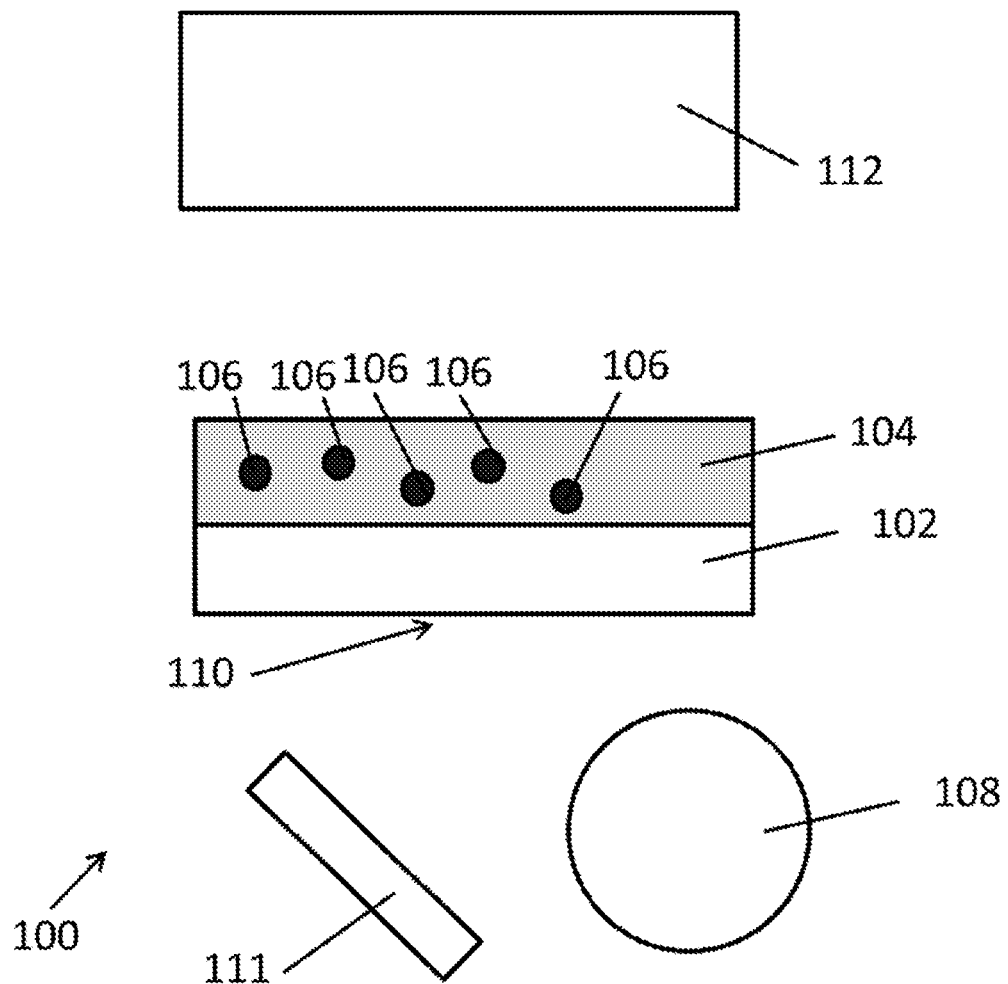
FIG. 3 is a schematic of an exemplary system as disclosed herein.

Referring now to FIG. 3, the system 110 can, in some examples, further comprise an instrument 112 configured to capture an electromagnetic signal from the plasmonic substrate 102.

In some examples, the system 110 can further comprise a first lens 114. In some examples, the system 110 can further comprise a second lens 116. The lenses may independently be any type of lens, such as a simple lens, a compound lens, a spherical lens, a toric lens, a biconvex lens, a plano-convex lens, a plano-concave lens, a negative meniscus lens, a positive meniscus lens, a biconcave lens, a converging lens, a diverging lens, a cylindrical lens, a Fresnel lens, a lenticular lens, or a gradient index lens.

Figure 4:
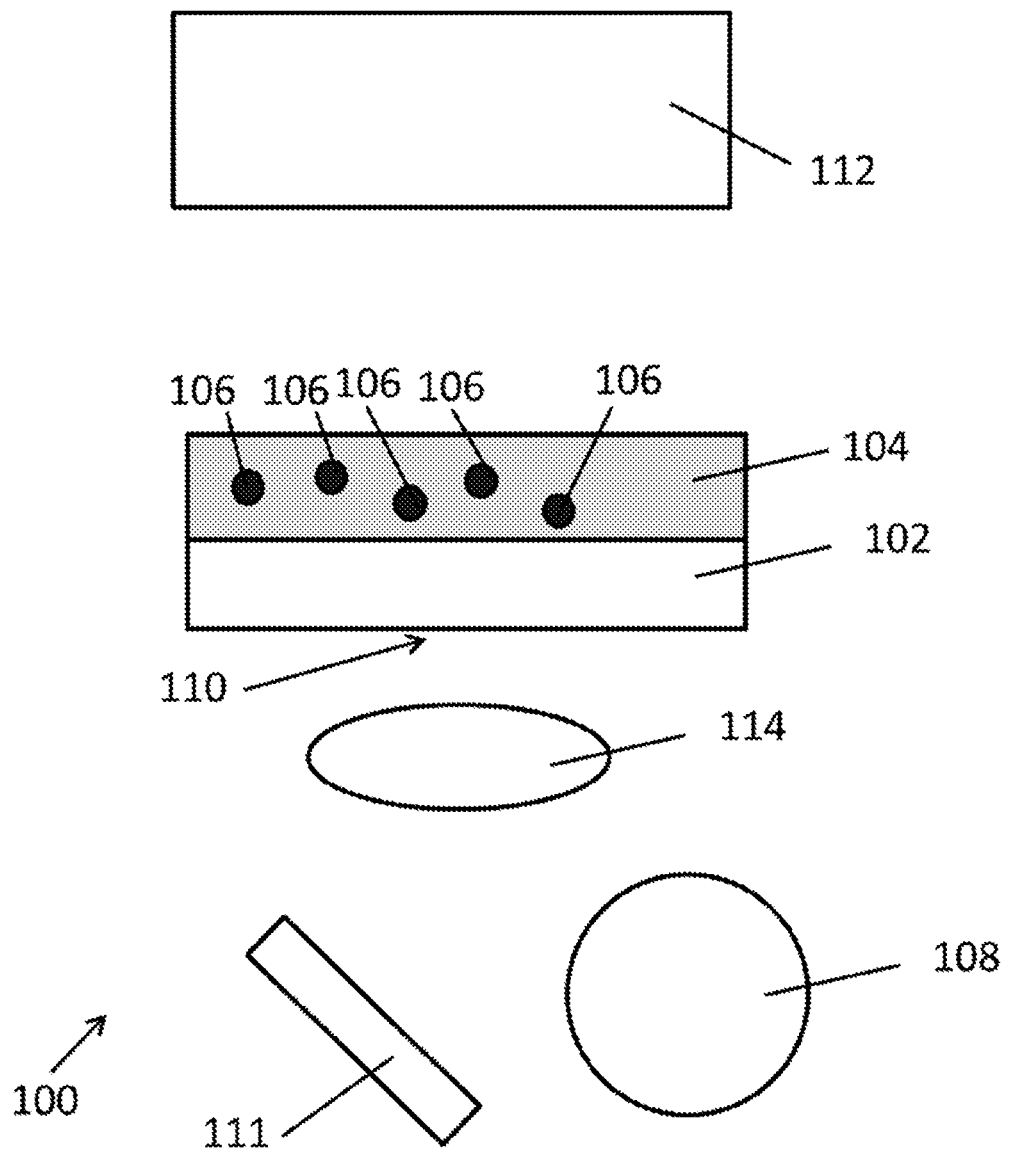
FIG. 4 is a schematic of an exemplary system as disclosed herein.

Referring now to FIG. 4, in some examples, the system 110 can be configured such that the light source 108 is below the first lens 114 and the plasmonic substrate 102 is above the first lens 114.

Figure 5:
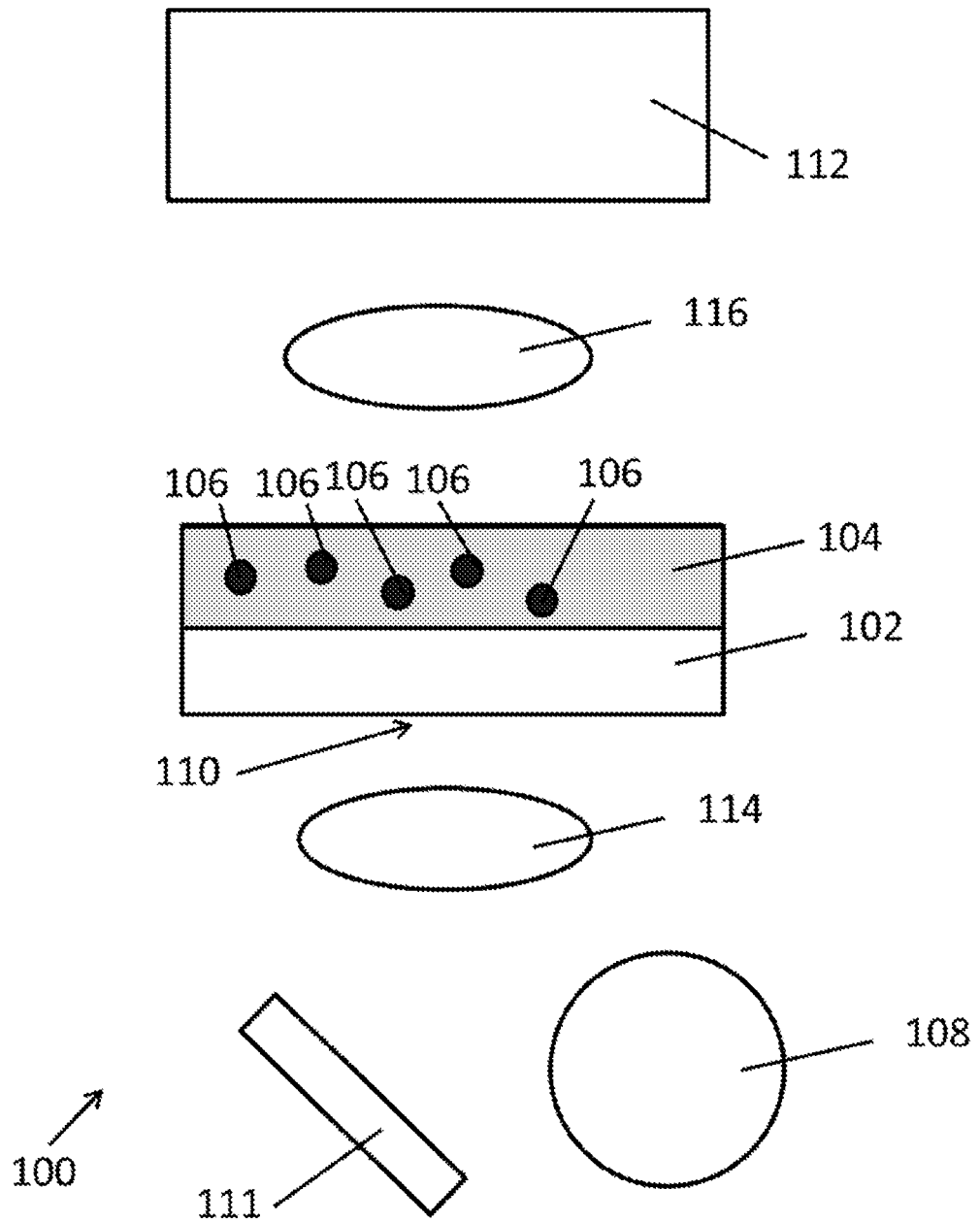
FIG. 5 is a schematic of an exemplary system as disclosed herein.

Referring now to FIG. 5, in some examples, the system 110 is aligned such that the light source 108 is below the first lens 114, the plasmonic substrate 102 is above the first lens 114, the second lens 116 is above the plasmonic substrate 102, and the instrument 112 is above the second lens 116.

Figure 6:
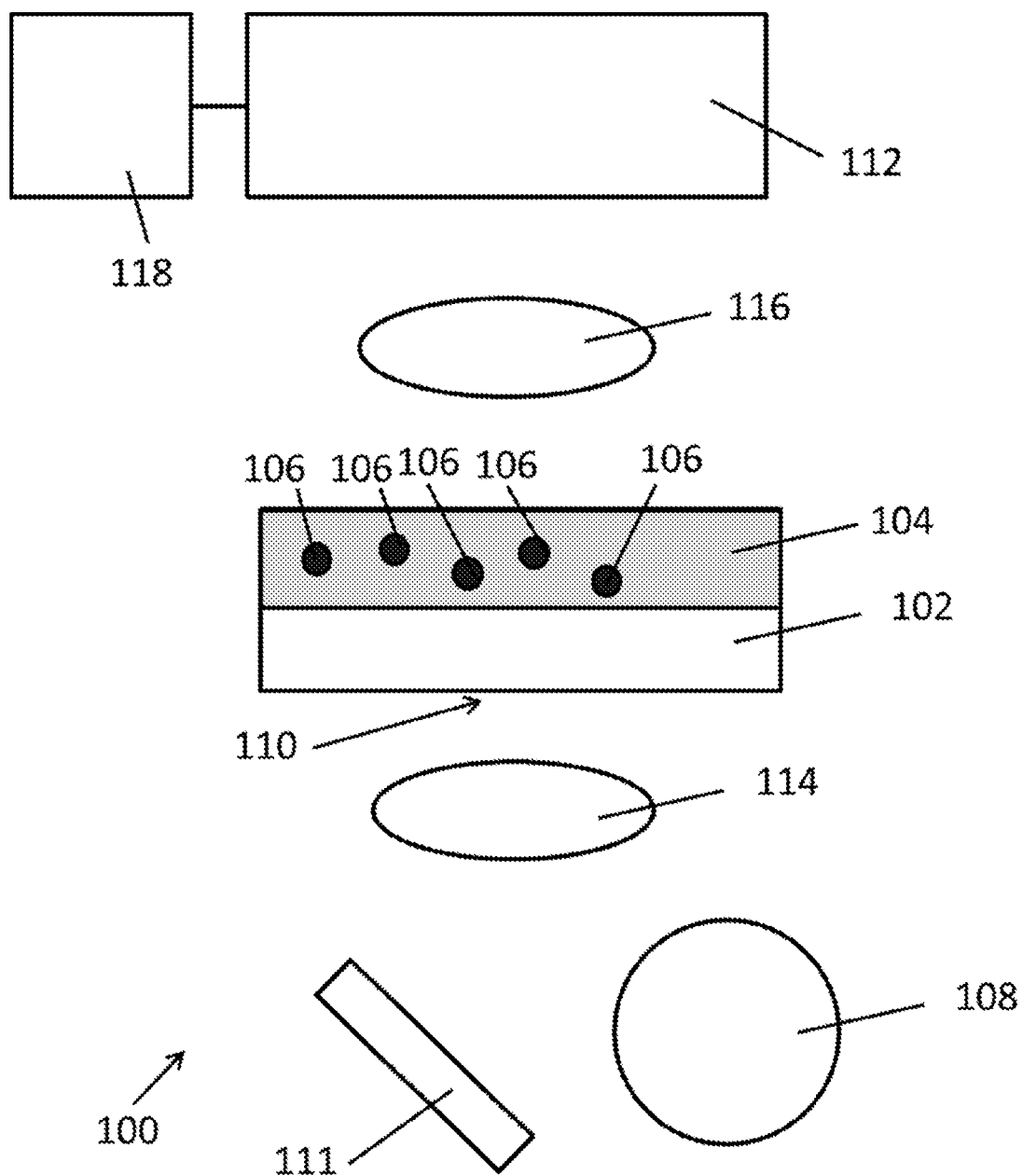
FIG. 6 is a schematic of an exemplary system as disclosed herein.

In some examples, the systems 110 can further comprise a computing device 118 configured to receive and process electromagnetic signals from the instrument 112, for example as shown in FIG. 6.

Figure 7:
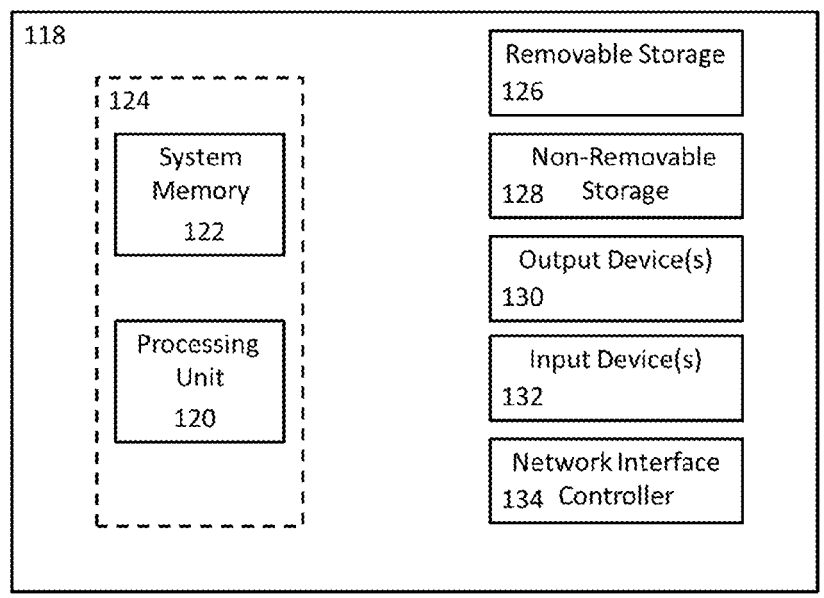
FIG. 7 is a schematic of an exemplary computing device.

FIG. 7 illustrates an example computing device 118 upon which examples disclosed herein may be implemented. The computing device 118 can include a bus or other communication mechanism for communicating information among various components of the computing device 118. In its most basic configuration, computing device 118 typically includes at least one processing unit 120 (a processor) and system memory 122. Depending on the exact configuration and type of computing device, system memory 122 may be volatile (such as random access memory (RAM)), non-volatile (such as read-only memory (ROM), flash memory, etc.), or some combination of the two. This most basic configuration is illustrated in FIG. 7 by a dashed line 124. The processing unit 120 may be a standard programmable processor that performs arithmetic and logic operations necessary for operation of the computing device 118.

The computing device 118 can have additional features/functionality. For example, computing device 118 may include additional storage such as removable storage 126 and non-removable storage 128 including, but not limited to, magnetic or optical disks or tapes. The computing device 118 can also contain network connection(s) 134 that allow the device to communicate with other devices. The computing device 118 can also have input device(s) 132 such as a keyboard, mouse, touch screen, antenna or other systems configured to communicate with the camera in the system described above, etc. Output device(s) 130 such as a display, speakers, printer, etc. may also be included. The additional devices can be connected to the bus in order to facilitate communication of data among the components of the computing device 118.

The processing unit 120 can be configured to execute program code encoded in tangible, computer-readable media. Computer-readable media refers to any media that is capable of providing data that causes the computing device 118 (i.e., a machine) to operate in a particular fashion. Various computer-readable media can be utilized to provide instructions to the processing unit 120 for execution. Common forms of computer-readable media include, for example, magnetic media, optical media, physical media, memory chips or cartridges, a carrier wave, or any other medium from which a computer can read. Example computer-readable media can include, but is not limited to, volatile media, non-volatile media and transmission media. Volatile and non-volatile media can be implemented in any method or technology for storage of information such as computer readable instructions, data structures, program modules or other data and common forms are discussed in detail below. Transmission media can include coaxial cables, copper wires and/or fiber optic cables, as well as acoustic or light waves, such as those generated during radio-wave and infra-red data communication. Example tangible, computer-readable recording media include, but are not limited to, an integrated circuit (e.g., field-programmable gate array or application-specific IC), a hard disk, an optical disk, a magneto-optical disk, a floppy disk, a magnetic tape, a holographic storage medium, a solid-state device, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices.

In an example implementation, the processing unit 120 can execute program code stored in the system memory 122. For example, the bus can carry data to the system memory 122, from which the processing unit 120 receives and executes instructions. The data received by the system memory 122 can optionally be stored on the removable storage 126 or the non-removable storage 128 before or after execution by the processing unit 120.

The computing device 118 typically includes a variety of computer-readable media. Computer-readable media can be any available media that can be accessed by device 118 and includes both volatile and non-volatile media, removable and non-removable media. Computer storage media include volatile and non-volatile, and removable and non-removable media implemented in any method or technology for storage of information such as computer readable instructions, data structures, program modules or other data. System memory 122, removable storage 126, and non-removable storage 128 are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 118. Any such computer storage media can be part of computing device 118.

It should be understood that the various techniques described herein can be implemented in connection with hardware or software or, where appropriate, with a combination thereof. Thus, the methods, systems, and associated signal processing of the presently disclosed subject matter, or certain aspects or portions thereof, can take the form of program code (i.e., instructions) embodied in tangible media, such as floppy diskettes, CD-ROMs, hard drives, or any other machine-readable storage medium wherein, when the program code is loaded into and executed by a machine, such as a computing device, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs can implement or utilize the processes described in connection with the presently disclosed subject matter, e.g., through the use of an application programming interface (API), reusable controls, or the like. Such programs can be implemented in a high level procedural or object-oriented programming language to communicate with a computer system. However, the program(s) can be implemented in assembly or machine language, if desired. In any case, the language can be a compiled or interpreted language and it may be combined with hardware implementations.

In certain examples, system memory 122 comprises computer-executable instructions stored thereon that, when executed by the processor 120, cause the processor 120 to receive an electromagnetic signal from the instrument 112, process the electromagnetic signal to obtain a characteristic of the plasmonic substrate 102; and output the characteristic of the plasmonic substrate 102.

The analysis of signals captured by the instrument can be carried out in whole or in part on one or more computing device. For example, the system may comprise one or more additional computing device.

The instrument can comprise, for example, a camera, an optical microscope, an electron microscope, a spectrometer, or combinations thereof. Examples of spectrometers include, but are not limited to, Raman spectrometers, UV-vis absorption spectrometers, IR absorption spectrometers, fluorescence spectrometers, and combinations thereof.

In some examples, the electromagnetic signal received by the processor from the instrument can comprise an image, a spectrum (e.g., Raman, UV-vis, IR, fluorescence), a micrograph, or combinations thereof. The characteristic of the plasmonic substrate can comprise, for example, the presence, location, size, shape, and/or quantity of a portion of the plurality of particles trapped within the confinement region; the presence, location, composition, size, shape, and/or quantity of plasmonic particles comprising the plasmonic substrate; or combinations thereof. In some examples, the characteristic of the plasmonic substrate can be monitored over time, for example, to identify the effect of trapping the portion of the plurality of particles within the confinement region.

A number of embodiments of the invention have been described. Nevertheless, it will be understood that various modifications may be made without departing from the spirit and scope of the invention. Accordingly, other embodiments are within the scope of the following claims.

The examples below are intended to further illustrate certain aspects of the systems and methods described herein, and are not intended to limit the scope of the claims.

EXAMPLES

The following examples are set forth below to illustrate the methods and results according to the disclosed subject matter. These examples are not intended to be inclusive of all aspects of the subject matter disclosed herein, but rather to illustrate representative methods and results. These examples are not intended to exclude equivalents and variations of the present invention which are apparent to one skilled in the art.

Efforts have been made to ensure accuracy with respect to numbers (e.g., amounts, temperature, etc.) but some errors and deviations should be accounted for. Unless indicated otherwise, parts are parts by weight, temperature is in ° C. or is at ambient temperature, and pressure is at or near atmospheric. There are numerous variations and combinations of measurement conditions, e.g., component concentrations, temperatures, pressures and other measurement ranges and conditions that can be used to optimize the described process.

Example 1

Optical manipulation of biological cells and nanoparticles can provide opportunities for applications in life sciences, early disease diagnosis, and nanomanufacturing. Scientific and technological advances have led to a few types of light-based tweezers, such as optical tweezers (Grier D G. *Nature* 2003, 424, 810-816; Gluckstad J. *Nature Mater.* 2004, 3, 9-10), optoplasmonic tweezers (Righini M et al. *Nature Phys.* 2007, 3, 477-480; Juan M L et al. *Nature Photon.* 2011, 5, 349-356; Berthelot J et al. *Nature Nanotechnol.* 2014, 9, 295-299; Grigorenko A N et al. *Nature Photon.* 2008, 2, 365-370), optoelectronic tweezers (Chiou P Y et al. *Nature* 2005, 436, 370-372), and electrothermoplasmonic tweezers (Ndukaife J C et al. *Nature Nanotechnol.* 2016, 11, 53-59), which exploit direct or indirect optical force and energy for the manipulation. However, low-power and versatile all-optical manipulation of general nanoparticles and cells remains elusive.

Thermophoresis can be an effective strategy for transporting suspended particles in fluids (Weinert F M and Braun D. *Phys. Rev. Lett.* 2008, 101, 168301; Würger A. *Phys. Rev. Lett.* 2008, 101, 108302). Thermophoresis can selectively drive suspended objects into warm or cold regimes at a moderate temperature gradient, thereby providing a noninvasive approach towards trapping and concentrating biomolecules (Thamdrup L H et al. *Nano Lett.* 2010, 10, 826-832; Würger A. *Rep. Prog. Phys.* 2010, 73, 126601; Braun D and Libchaber A. *Phys. Rev. Lett.* 2002, 89, 188103; Duhr S and Braun D. *Proc. Natl. Acad. Sci.* 2006, 103, 19678-19682). However, the use of thermophoresis in trapping and manipulating individual biological cells and nanoparticles in an arbitrary manner has not been achieved (Braun M and Cichos F. *ACS Nano* 2013, 7, 11200-11208). Herein, interactions between the cell membrane and waters molecules in the electric double layer are exploited to harness light-induced thermophoresis for versatile manipulation of yeast cells and *Escherichia coli* cells using low-power light and the associated temperature gradient, leading to the development of optothermal tweezers (OTTs).

Herein, light-directed versatile thermophoretic manipulation of biological cells at an optical power of 100~1000 times lower than optical tweezers is achieved. By harnessing the permittivity gradient in the electric double layer of the charged surface of the cell membrane, the low-power trapping of suspended particles and/or biological cells within a light-controlled temperature gradient field was achieved. Furthermore, dynamic control of the optothermal potentials was achieved using a digital micromirror device (DMD), which allowed for arbitrary spatial arrangements of cells at a resolution of ~100 nm and precise rotation of both single and assemblies of cells. These results indicate that these optothermal tweezers can represent a type of light-based tweezers for the versatile manipulation of particles and cells. These optothermal tweezers can be operated at a low power with a moderate temperature gradient (~1 K/µm) and rise (up to ~7 K), and are applicable to general particles and cells. These optothermal tweezers can be used in applications in cellular biology, nanomedicine, tissue engineering, colloidal science, and nanomaterials.

Figure 8:
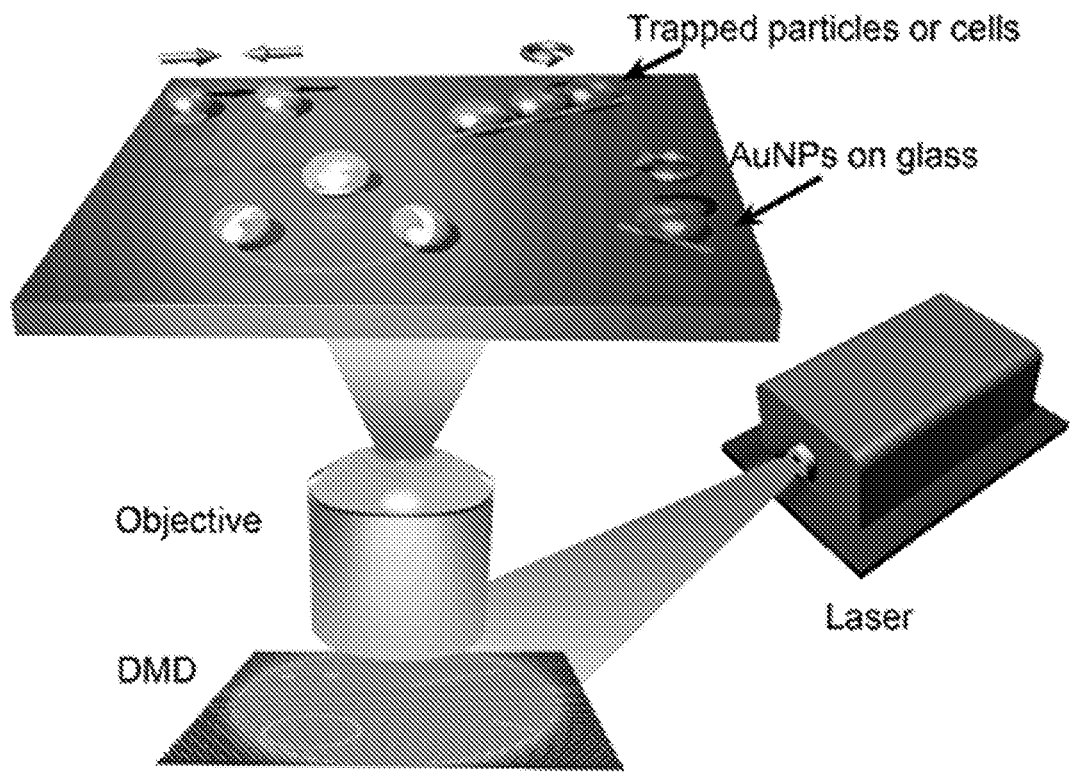
FIG. 8 is a schematic of an optical setup of the optothermal tweezers (OTTs). An incident laser is directed to the digital micromirror device (DMD) and the resultant optical images are focused on the plasmonic substrate for excitation of the localized surface plasmon resonances (LSPRs). The plasmon-enhanced optothermal potentials defined by the digital micromirror device-controlled optical images are employed to trap and arbitrarily manipulate colloidal particles or biological cells.

The optothermal tweezers comprise a plasmonic substrate comprised of gold nanoparticles (AuNPs) on a glass slide, a chamber that contains suspensions of particles and/or biological cells in a fluid (e.g., water), and an optical imaging and control system based on a digital micromirror device (DMD) (FIG. 8). A single laser beam was directed onto a computer-controlled digital micromirror device and the optical images reflected off of the digital micromirror device are focused on the plasmonic substrate to define the optical landscape. The laser beam used had a wavelength that overlapped with the localized surface plasmon resonances (LSPRs) of the plasmonic substrate.

Figure 9:
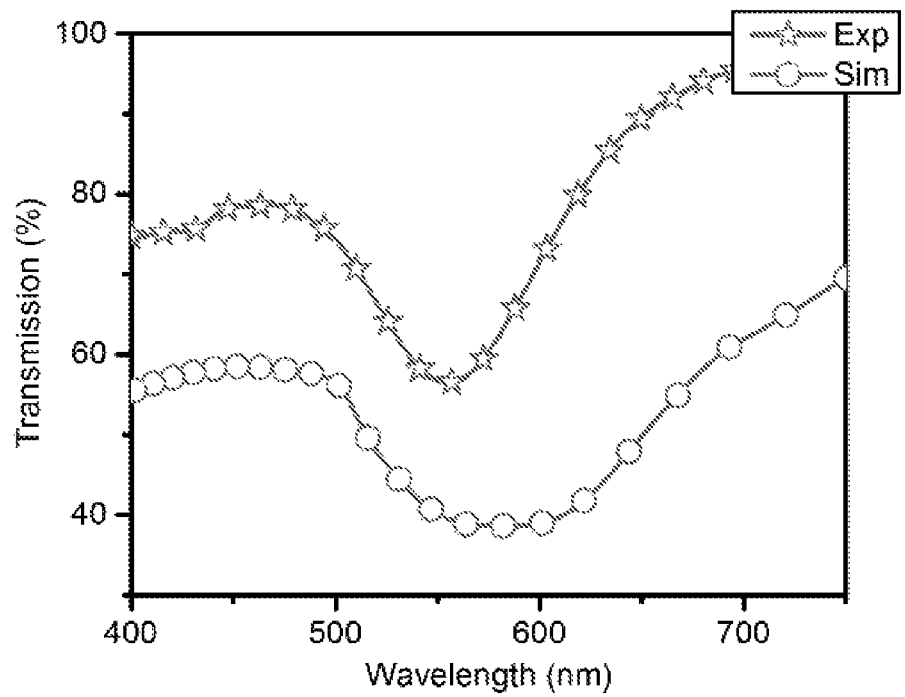
FIG. 9 is the experimental and simulated transmission spectra of the plasmonic substrate.

The plasmonic substrate was fabricated by depositing a 4 nm gold thin film on a glass slide with thermal deposition (Denton thermal evaporator, base pressure: $1\times10^{-5}$ Torr) followed by thermal annealing at 550° C. for 2 hours. The experimental and simulated transmission spectra of the plasmonic substrate is displayed in FIG. 9. The experimental transmission spectrum of the plasmonic substrate was taken using an Ocean Optics spectrometer (HR4000CG-UV-NIR). The transmission dips at a wavelength of ~550 nm, revealing the localized surface plasmon resonance (LSPR) of the plasmonic substrate (FIG. 9). The simulated transmission spectrum shown in FIG. 9 was simulated using a finite-difference time-domain (FDTD) simulation (Lumerical FDTD), which used a scanning electron microscopy (SEM) image of the plasmonic substrate as a model for the plasmonic substrate. The scanning electron microscopy image of the plasmonic structure was taken using the Hitachi S5500 SEM/STEM system. A refractive index of 1.52 was set for the glass substrate. The optical constants of gold were taken from Johnson and Christy (Johnson P and Christy R. *Phys. Rev. B* 1972, 6, 4370-4379). A mesh size of 1 nm was applied to define the plasmonic structure. The electric field intensity was simulated at an excitation wavelength of 532 nm. The peak wavelength of the simulated transmission spectrum of the plasmonic substrate is redshifted compared to the experimental transmission spectrum, which can be due to differences in the actual article sizes and those determined using the SEM characterization process. Specifically, a 2 nm gold film was sputtered onto the samples for SEM characterization, which can enlarge the gold particle size and reduce the gap between the neighboring particles, thereby shifting the localized surface plasmon resonances to longer wavelengths.

Figure 10:
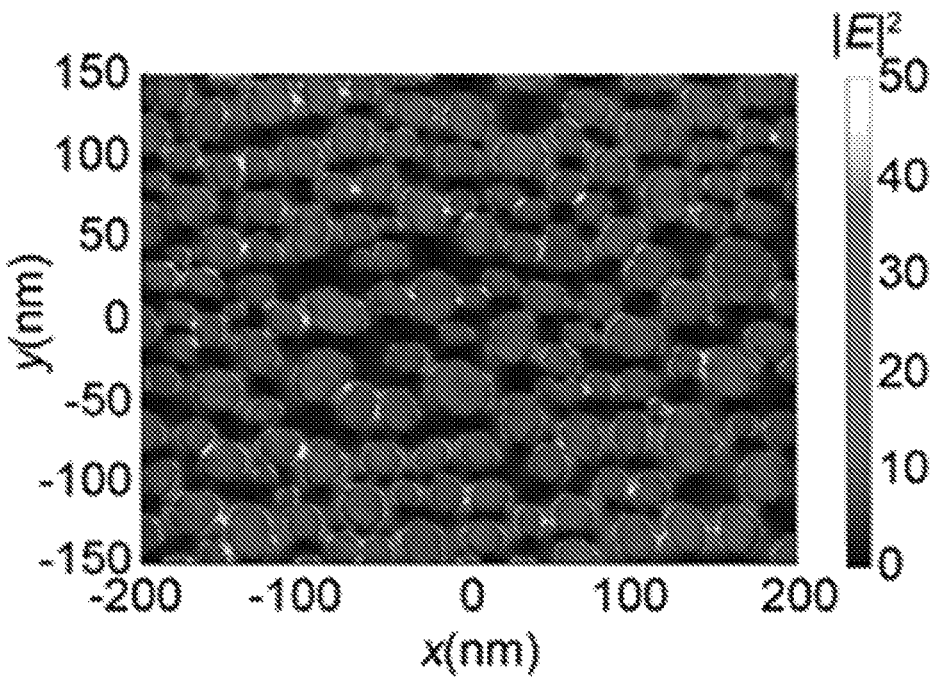
FIG. 10 shows a scanning electron micrograph of the plasmonic substrate overlaid with the simulated electric field to show the network of high-density electromagnetic "hot spots".

The localized surface plasmon resonance of the plasmonic substrate (e.g., ~550 nm) matches well with the 532 nm laser used in the optothermal tweezer setup (FIG. 8). A scanning electron microscopy image of the plasmonic substrate is overlaid with the simulated electric field in (FIG. 10) to show the network of high-density electromagnetic "hot spots" generated by illuminating the plasmonic substrate with the laser in the optothermal tweezer setup. The electromagnetic field distributions were calculated using FDTD methods (Lumerical FDTD), as described above. The overlap between the localized surface plasmon resonance of the plasmonic substrate and the laser wavelength can enhance the optothermal effect via the high-density electromagnetic "hot spots" (FIG. 10) at the low-power irradiation of the laser. The digital micromirror device-defined optical landscape on the plasmonic substrate controls the optothermal potential at the substrate-liquid interface for the particle trapping.

Figure 11:
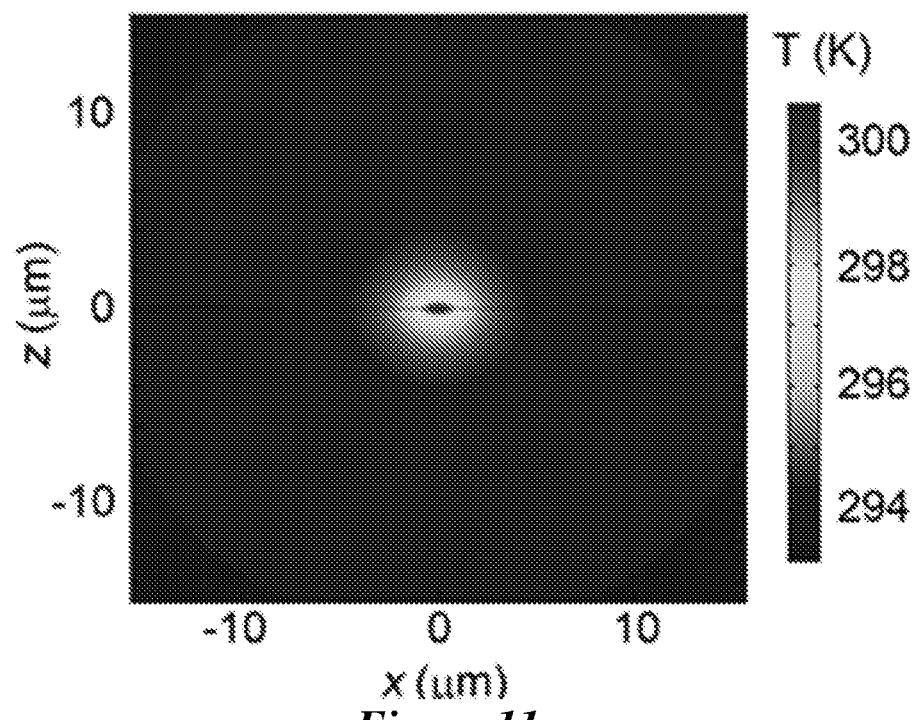
FIG. 11 shows a cross-sectional view of the simulated temperature distribution at the substrate-liquid interface when a laser beam with a diameter of 2 µm and a power of 0.2 mW irradiates on the plasmonic substrate from underneath. The horizontal line at z=0 indicates the substrate-liquid interface.

The size of the gold nanoparticles of the plasmonic substrate were optimized to match the surface plasmon resonance wavelength with the incident laser wavelength to improve the absorption efficiency. The absorbed optical power is described by $Q=N\sigma_{abs}I$, where $\sigma_{abs}$ is the absorption cross section of the gold nanoparticles, N is the number of particles under illumination, and I is the irradiance of the incident laser. The absorbed optical power is converted to heat according to the Joule effect. A steady-state temperature profile is attained when the heat diffusion between the gold nanoparticles and the surrounding environment achieves balance. By experimentally measuring the absorbed optical power of the gold nanoparticles, the temperature distribution around the laser beam was simulated, as shown in FIG. 11.

The maximum temperature gradients of $\nabla T_z=-8.49\times10^6$ K/m and $\nabla T_r=-3.58\times10^6$ K/m were created under a low-power light irradiation, with temperature rise of ~7 K at the trapping site. The temperature distribution around the trapping site was simulated using computational fluid dynamic simulations (CFD) using the finite element method (COMSOL v4.4). In the simulation, Navier-Stokes equation was coupled to continuous equation and energy equation in heat transfer and solved under boundary conditions. An axisymmetric model consisted of glass substrate and fluid domain was established. Both the geometry of the glass substrate and the fluid domain were 500 μm×500 μm. The laser heating was modeled as a Gaussian heat source at the glass-fluid interface. The laser power was 0.2 mW, opto-thermal conversion coefficient was 0.3, and the diameter of laser beam was 2 μm. The rest of boundaries were set as constant room temperature (293 K) and wall.

Figure 12:
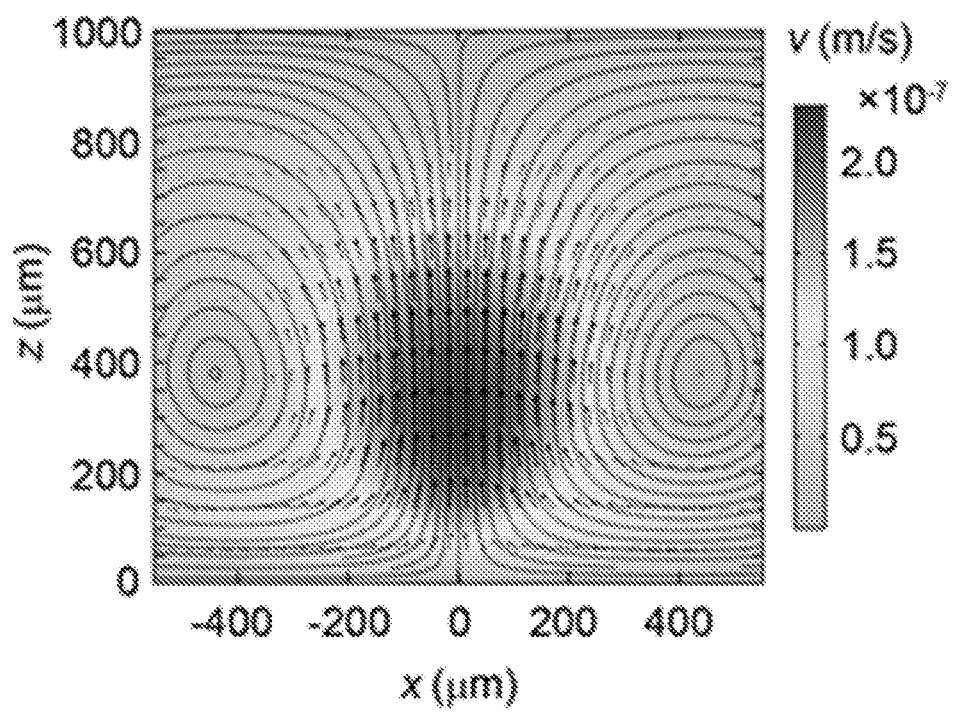
FIG. 12 shows the convective flow velocity distribution in the 1 mm chamber. An incident laser beam with a diameter of 2 µm and a power of 0.2 mW is focused at the substrate-liquid interface from the substrate side.
Figure 13:
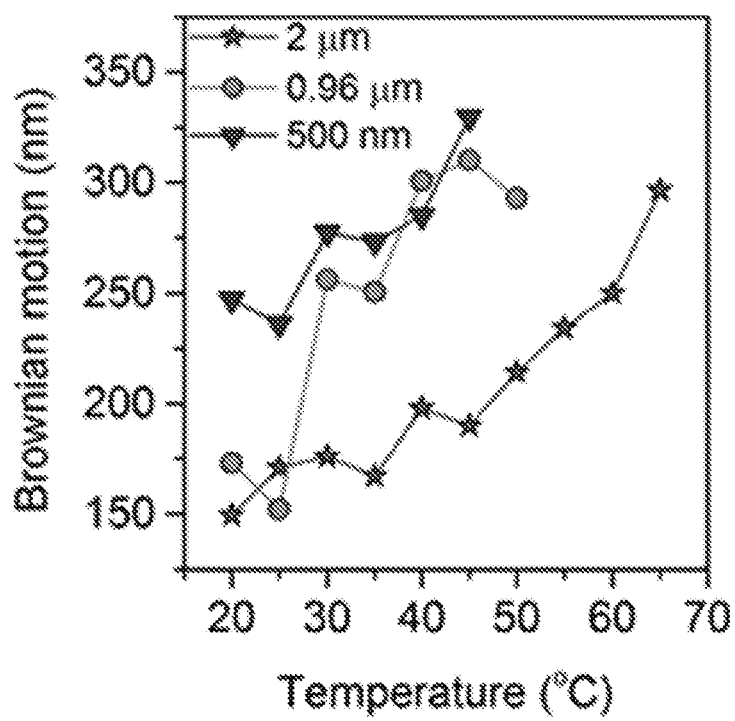
FIG. 13 shows the Brownian motion of single polystyrene (PS) beads with various sizes as a function of the working temperature. An incident laser beam with a diameter of 2 µm and a power of 0.2 mW is focused at the substrate-liquid interface from the substrate side.

The optical heating of the substrate could also induce the thermal convection of the fluid. To exclude thermal convection as the driving force for the thermophoretic tweezers, the convective flow distribution was simulated at a laser spot with the same optical power used for cell trapping (FIG. 12). The convective flow distribution around the trapping site was simulated using computational fluid dynamic (CFD) simulations using finite element method (COMSOL v4.4), as described elsewhere herein. The in-plane velocity of the convective flow above the substrate is lower than 150 nm/s. To evaluate whether this convective flow can lead to stable trapping, the Brownian motion of polystyrene (PS) beads with different sizes was measured as a function of environmental temperature (FIG. 13).

Figure 14:
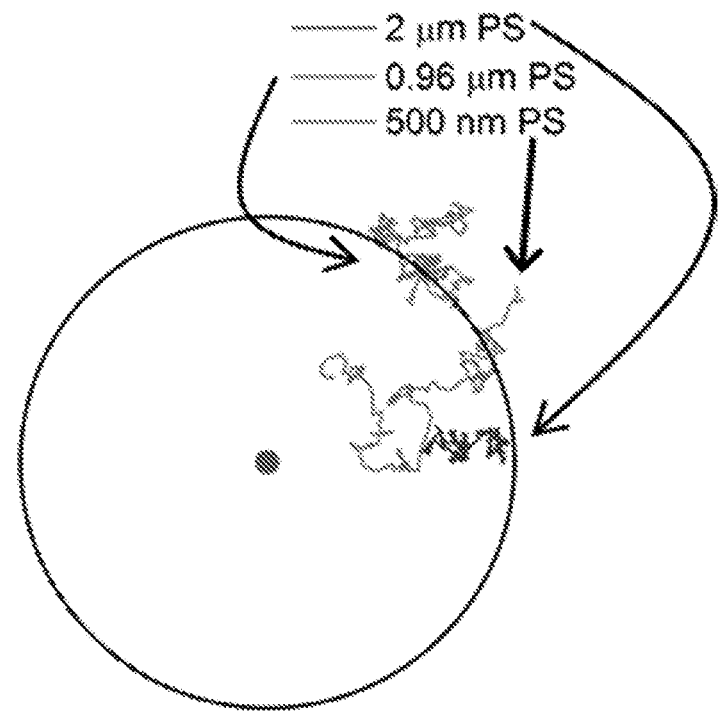
FIG. 14 shows the measured trajectories of polystyrene beads with sizes of 2 µm, 0.96 µm and 500 nm when the particles were placed 20 µm away from the laser beam for 30 s. The disk at the center represents the location of the laser beam and the black ring has a radius of 20 µm. An incident laser beam with a diameter of 2 µm and a power of 0.2 mW is focused at the substrate-liquid interface from the substrate side.

The Brownian motion was measured by recording the trajectory of a single PS bead trapped by an optothermal potential with a CCD at an exposure time of 120 ms. The particle location was determined by the contrast difference in the image. Each particle site was recorded to demonstrate the single particle trajectory. The offset between the laser spot center and the particle location was summarized to calculate the positional probability distribution of the particle, i.e., the Brownian motion shown in FIG. 13. FIG. 13 shows that the convective flow cannot overcome the Brownian motion at the low-power light illumination used in these trapping experiments. The minor role of convective flow in trapping is further verified by placing a polystyrene bead 20 μm away from the laser spot, where the temperature gradient is weak and thermophoresis can be ignored. Without the thermophoresis, the convective flow alone cannot deliver the particle to the laser spot, as shown in FIG. 14. At a higher optical power of 0.4 mW, a 2 μm polystyrene bead can be delivered to the laser spot at a low velocity of ~400 nm/s, indicating a convective drag force of 6.7 fN on the particle. The small drag force is insufficient for particle trapping.

Figure 15:
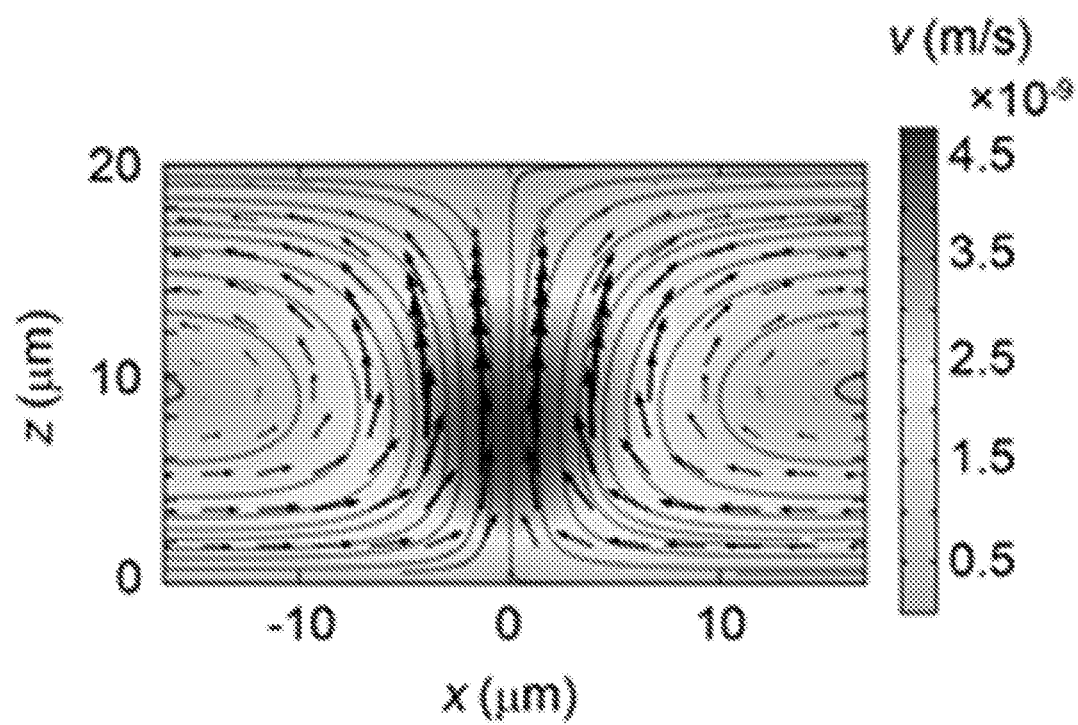
FIG. 15 shows the convective flow velocity distribution in the 20 µm chamber. An incident laser beam with a diameter of 2 µm and a power of 0.2 mW is focused at the substrate-liquid interface from the substrate side.
Figure 16:
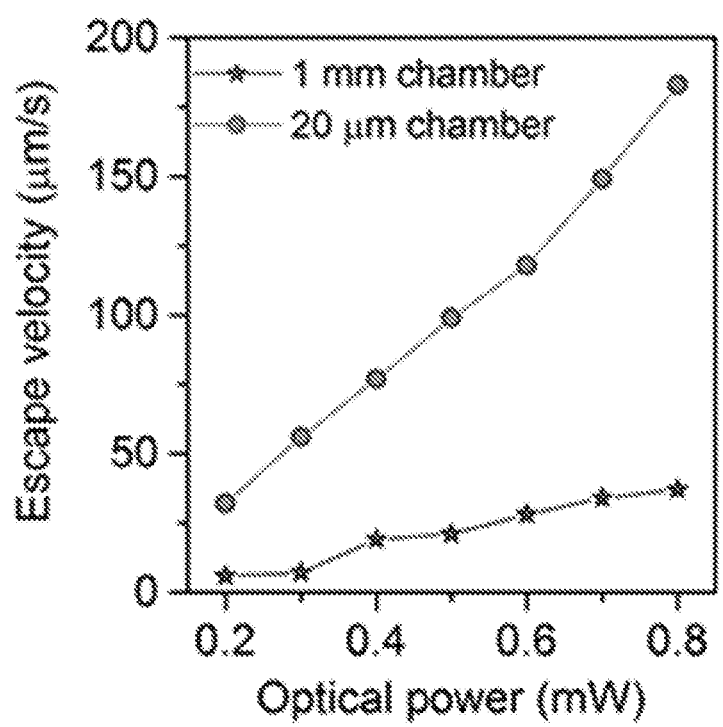
FIG. 16 shows the measured escape velocities of the trapped polystyrene beads with a diameter of 0.96 µm in the liquid chambers with the thickness of 1 mm and 20 µm, respectively.

In addition, the chamber thickness was reduced to suppress the thermal convective flow, and the simulated convective flow distribution in the chamber of 20 μm in thickness are shown in FIG. 15. The maximum convective flow velocities are two orders of magnitude lower than the values shown in the 1 mm chamber. Trapping experiments were performed in the ultra-thin chambers where trapping was still achieved, and, in fact, an enhanced trapping stability was observed in the thin chamber. FIG. 16 shows the escape velocities of trapped 0.96 μm polystyrene beads measured in both 20 μm and 1 mm chambers. The escape velocity in the thin chamber is more than 5 times larger than that in the thick one, revealing that the suppression of thermal convection reduces the gap between the trapped particle and the substrate and thus leads to the stronger hydrodynamic boundary effect in the thermophoretic tweezers.

The escape velocity of the trapped particles was measured with a motorized sample stage with precise velocity control. A single particle was trapped with a laser beam irradiated on the substrate. A certain value of moving velocity of the sample stage was set to introduce a drag force on the trapped particle. The escape velocity was defined as the critical velocity when the trapping force of the particle was balanced by the drag force.

Figure 17:
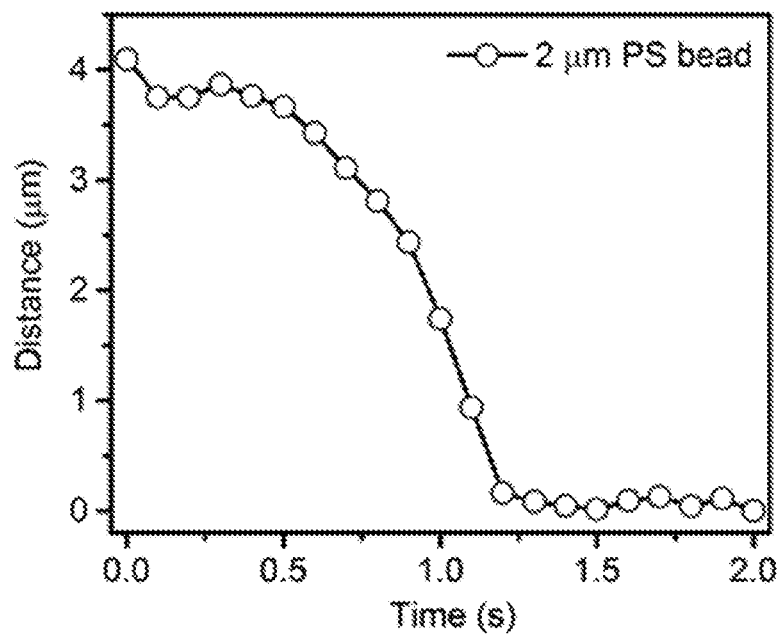
FIG. 17 shows the particle-beam distance as a function of time when a 2 µm PS bead approaches a 2 µm laser beam at an optical power of 0.2 mW. The distance is measured between the center of the bead and the center of the laser beam.

The trajectory of a 2 μm polystyrene particle when it approached the laser beam during the trapping process was recorded, and plotted the beam-particle distance as a function of time in FIG. 17. A significant increase of the migration velocity of the particle is observed when the particle approaches the heating source. Thermal convection can be excluded as the driving force of the trapping because the in-plane convective flow is not sensitive to the temperature gradient and the increase of the migration velocity is not expected if thermal convection is the main reason for the trapping. These observations of the increased migration velocity of the particle when it approaches the heating laser (FIG. 17) and similar trapping behavior of the polystyrene beads in the mixture of $H_2O$ and $D_2O$ further verify that the thermal convection is not the driving force of the trapping. In contrast, in thermophoresis, the diffusion velocity of the particles is highly dependent on the temperature gradient and should increase dramatically when the particle approaches the laser beam.

Figure 18:
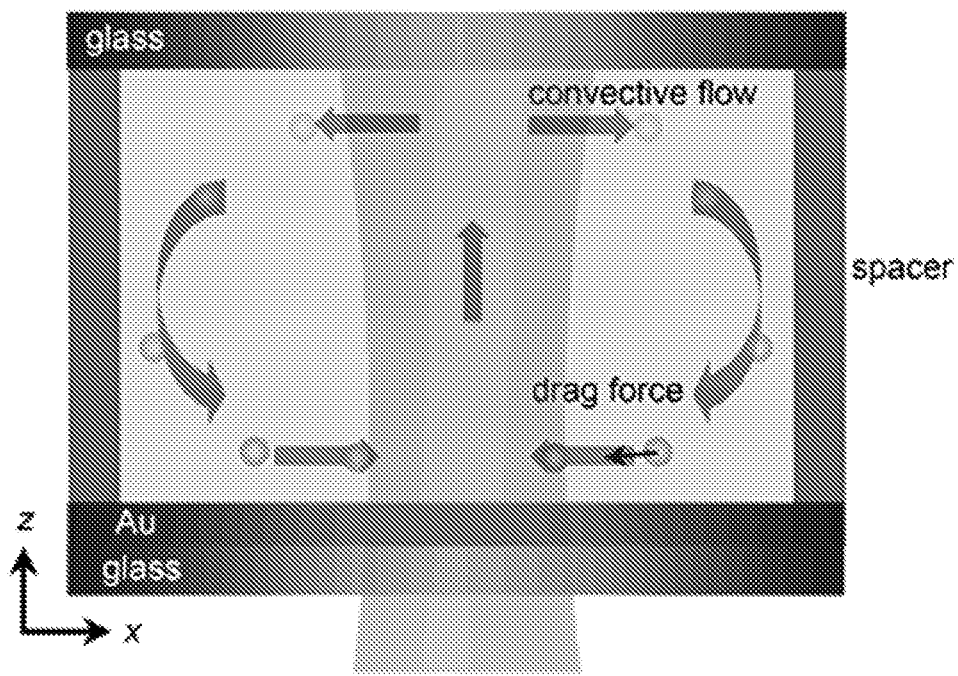
FIG. 18 is a schematic of the long-range transport of the suspended particles by convective flow.
Figure 19:
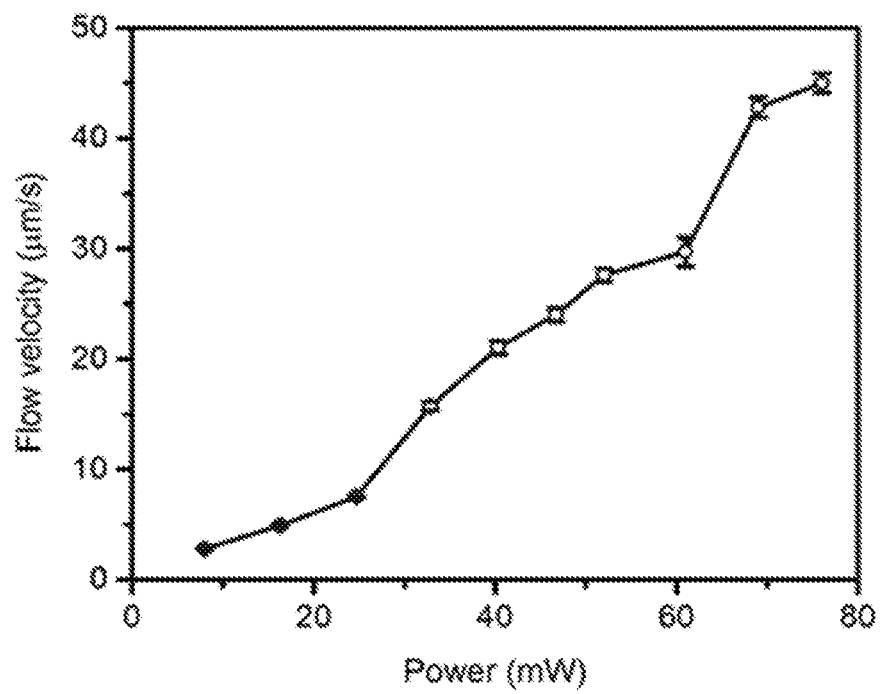
FIG. 19 shows the convective flow velocity as a function of the laser power.

Though convection effect is weak in the thermophoretic trapping, if needed, the convection flow velocity can be significantly improved by increasing the optical power to deliver the faraway objects towards the trapping sites. When the plasmonic substrate is illuminated by a laser beam at the plasmon resonance wavelength, the high-density gold nanoparticles are heated collectively, which leads to the temperature rise. The local temperature gradient field can induce convective flow in the liquid to deliver the suspended particles and/or cells towards the illuminated area (e.g., the trapping site) near the substrate-liquid interface (FIG. 18). The suspended particles can be delivered to the illuminated area by the convective flow with a convective drag force $F_D$ that follows the Stokes' law:

$$F_d = 6\pi\eta R v \qquad (1)$$

where η is the viscosity of the solvent, R is the radius of the suspended particle and v is the relative velocity between the particle and the fluid. The working distance of the convective flow is controlled by the thickness of the fluidic layer, which is 500 μm in FIG. 18. The flow velocity of fluid is determined by the temperature field. The convective flow velocity was measured as a function of the incident power by illuminating the plasmonic substrate with a laser beam 30 μm in diameter and measuring the convective velocity at a location that is 50 μm away from the center of the laser beam in the vicinity of the plasmonic substrate. The convective flow velocity as a function of the incident power is displayed in FIG. 19. A high transport speed of ~45 μm/s is obtained at a laser power of 76 mW. The results shown in FIG. 19 indicate that increasing the laser power can enhance the long-range transport velocity of the particles, revealing the possibility to quickly deliver the particles over a long range with the convective flow at an improved optical power.

Figure 20:
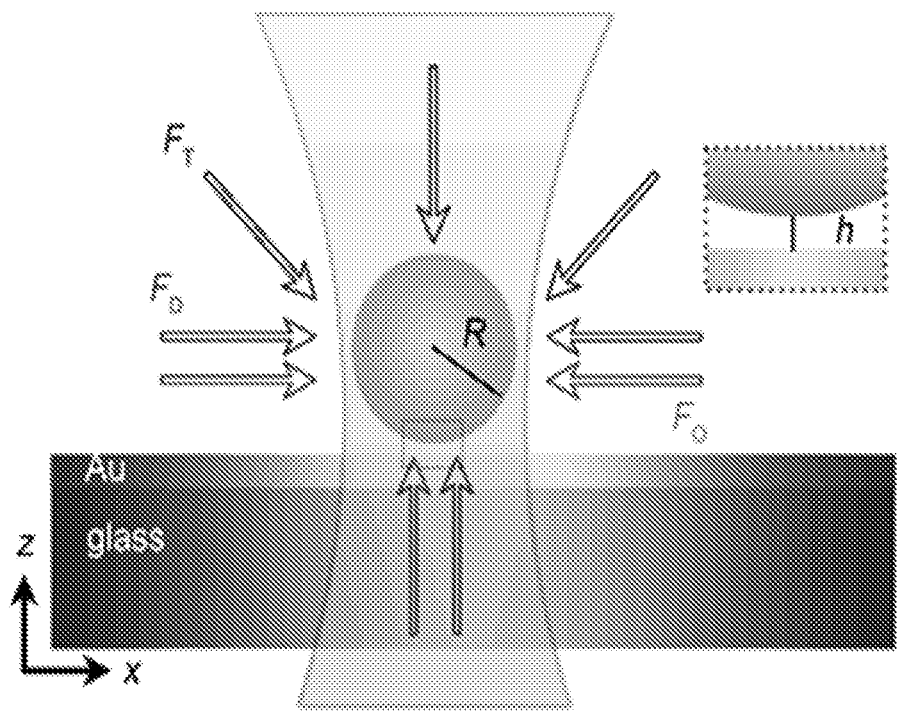
FIG. 20 shows the force analysis on the 540 nm PS bead at the illuminated area. $F_T$, $F_D$ and $F_O$ indicate the thermophoretic force, convective drag force and optical force, respectively. R and h are the particle radius and particle-substrate distance, respectively.

When the particles enter the laser beam or optical landscape defined on the plasmonic substrate, trapping of the particles and/or cells in the fluid above the plasmonic substrate occurs where there is a balance among thermophoretic force $F_T$, convective drag force $F_D$ and optical force $F_O$ (FIG. 20). $F_D$ and $F_O$ cannot trap the particles because both are directed upward. To balance $F_D$ and $F_O$ for the stable trapping of particles in the optothermal tweezers, $F_T$ that drives the suspended particles from the cold to hot regimes acts as a downward force.

Figure 21:
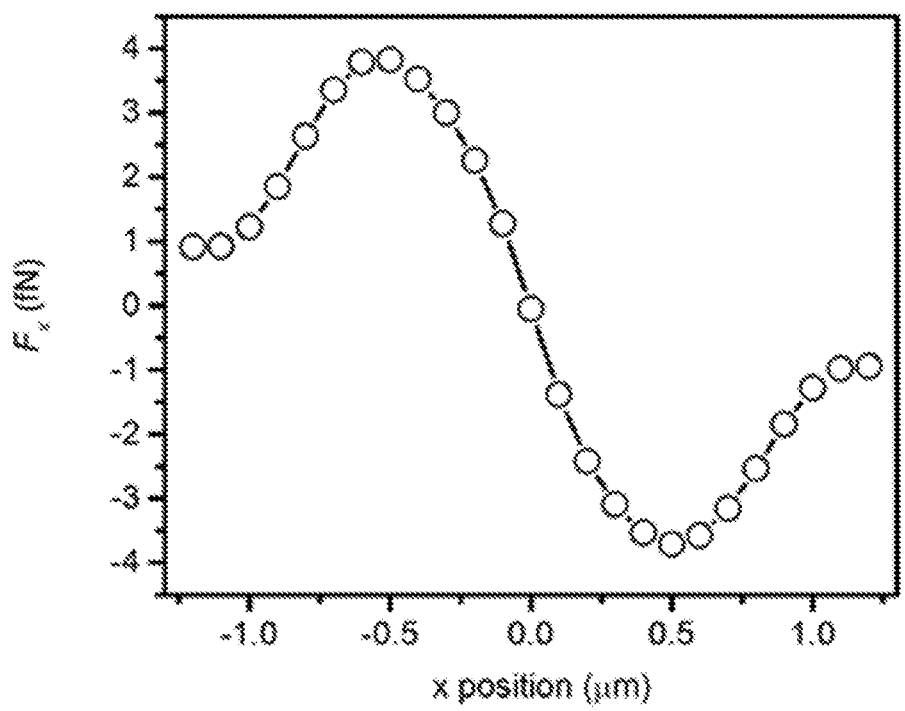
FIG. 21 shows the simulated optical force ($F_O$) as a function of the x-offset between the center of particle and the center of laser beam (i.e., x=0). A focused laser beam with a power intensity of 0.2 mW and a diameter of 2 µm is launched from the glass side. The particle is 4 nm above the substrate (i.e., h=4 nm in FIG. 20) with the offset from x=−1.2 µm to x=1.2 µm (y-offset is zero).

The optical force on a 500 nm polystyrene (PS) particle as a function of the particle position (i.e. at different x-offsets) when the plasmonic substrate is illuminated with a laser beam of a diameter of 2 μm and a power of 0.2 mW was simulated using FDTD methods (Lumerical FDTD). A model for plasmonic substrate was imported from the SEM image. A refractive index of 1.52 was set for the glass substrate. The optical constants of gold were taken from Johnson and Christy (Johnson P and Christy R. *Phys. Rev. B* 1972, 6, 4370-4379). A mesh size of 1 nm was applied to define the plasmonic structure. A Maxwell stress tensor was used to calculate the optical forces on the 500 nm polystyrene bead. The polystyrene bead was placed 4 nm above the plasmonic substrate and defined with a mesh size of 2 nm. The results of the simulated optical force as a function of particle position are shown in FIG. 21. The maximum force of 4 fN is too weak to trap the particle near the substrate. The measured escape velocity of the 500 nm polystyrene bead at the same optical power gives a trapping force of 170 fN, revealing the ignorable contribution of optical force in the tweezers. It is noted that, due to the weak plasmon-enhanced electric field intensity at the substrate (FIG. 10), the optical force from the focused laser beam dominates over that from the plasmonic field. In addition, the transmitted laser light through the substrate exerts a scattering force on the particle, which pushes the particle away from the substrate and further prevents the trapping.

Figure 22:
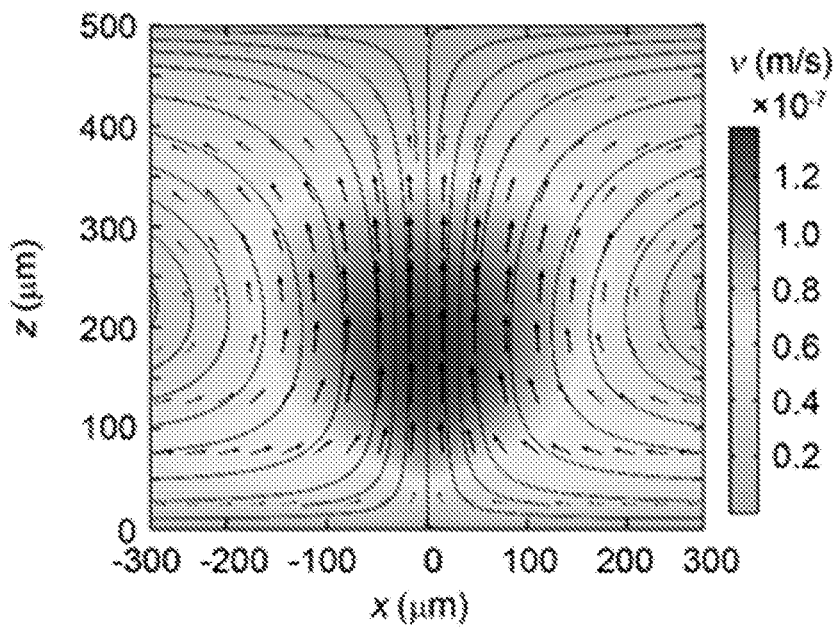
FIG. 22 shows the flow velocity distribution around the trapping site at the same irradiation conditions as FIG. 21.

The convective flow distribution around the trapping site was simulated using computational fluid dynamic (CFD) simulations using finite element method (COMSOL v4.4). In the simulation, Navier-Stokes equation was coupled to continuous equation and energy equation in heat transfer and solved under boundary conditions. An axisymmetric model consisted of glass substrate and fluid domain was established. Both the geometry of the glass substrate and the fluid domain were 500 μm×500 μm. The laser heating was modeled as a Gaussian heat source at the glass-fluid interface. The laser power was 0.2 mW, optothermal conversion coefficient was 0.3, and the diameter of laser beam was 2 μm. Gravity force was applied in the fluid domain to drive the convective flow. The rest of boundaries were set as constant room temperature (293 K) and wall. As shown in FIG. 22, a flow velocity of 120 nm/s was observed under this low-power optical illumination, which induced a drag force of 0.54 fN on a 540 nm polystyrene particle. The convective drag force along the substrate surface provides the in-plane confinement of the particle at the trapping site, which is similar to the optical gradient force from both the incident laser beam and the plasmon-enhanced field (FIG. 20). However, the upward convective flow generates a drag force that moves the particle away from the trapping site, which is similar to the optical scattering force. Therefore, to stably hold the particle at the trapping site, a downward force that can balance the upward forces is expected. This downward force is the thermophoretic force. Two physical phenomena influence the amplitude and direction of thermophoretic force $F_T$ on the particles, as described in more detail below.

Thermophoresis, which describes particle drift due to a temperature gradient in a solvent, is generally given by:

$$v_T = -D_T \nabla T \qquad (2)$$

where $v_T$ is the drift velocity of the particle, $\nabla T$ is the temperature gradient, and $D_T = S_T D$ is the thermophoresis mobility, where $S_T$ is the Soret coefficient and D is the diffusion coefficient. Considering the hydrodynamic boundary conditions between a single particle and fluid imposed by the thermal Marangoni forces (Würger A. *Phys. Rev. Lett.* 2007, 98, 138301; Weinert F M and Braun D. *Phys. Rev. Lett.* 2008, 101, 168301), $$D_T = \frac{\gamma_T \kappa}{3\eta} R \quad (3)$$

where $\kappa$ is thermal conductivity of the solvent, $\eta$ is viscosity of the solvent, R is the radius of the suspended particle, and $\gamma_T$ is proportional to the Marangoni force, which is sensitive to the particle-solvent interfacial properties, as described by the following equation:

$$\gamma_T = \frac{\sigma^2 \lambda}{4\varepsilon T}(1+\tau) - \frac{\gamma_0}{T_0} \quad (4)$$

In Equation 4, the first term, i.e., $\frac{\sigma^2 \lambda}{4\varepsilon T}(1+\tau)$, describes the contribution from surface charge energy where $\sigma$ is the surface charge density, $\lambda$ is the Debye length, $\varepsilon$ is the dielectric constant of the solvent, and $$\tau = -\frac{d\ln\varepsilon}{d\ln T}.$$

The second term, i.e., $\frac{\gamma_0}{T_0}$, comes from me interface tension, with $\gamma_0$ as the interface energy and $T_0 \sim 10^4$ K. The second term is always negative while the first term can be either positive or negative depending on the temperature dependency of the dielectric constant of the solvent.

Figure 23:
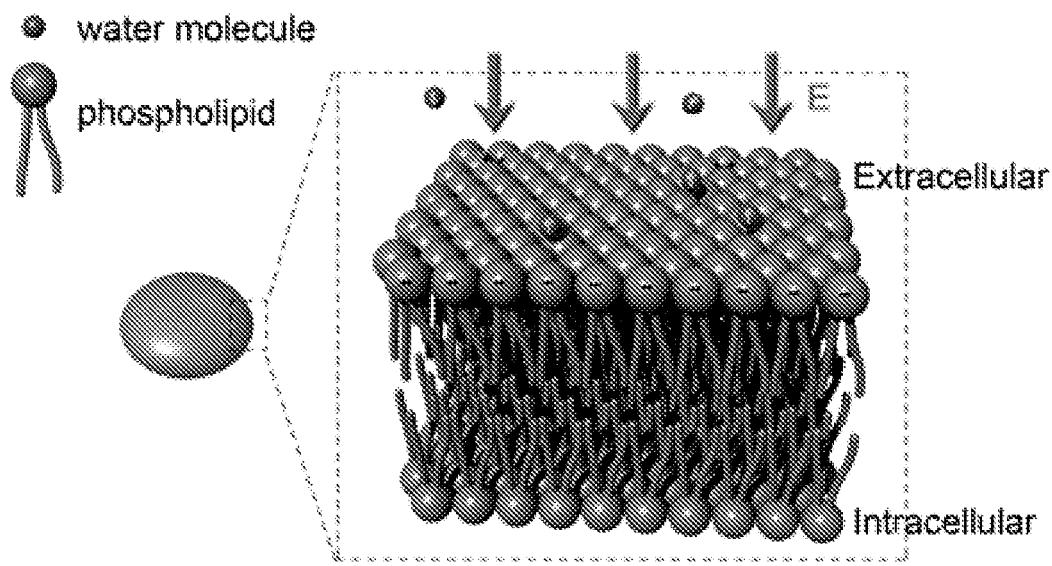
FIG. 23 shows a simplified structure of the lipid bilayer in the membrane of a biological cell. The phosphate groups in the phospholipid provide the negative charges on the cell membrane and induce an electric field E to drive the water molecules towards the membrane.
Figure 24:
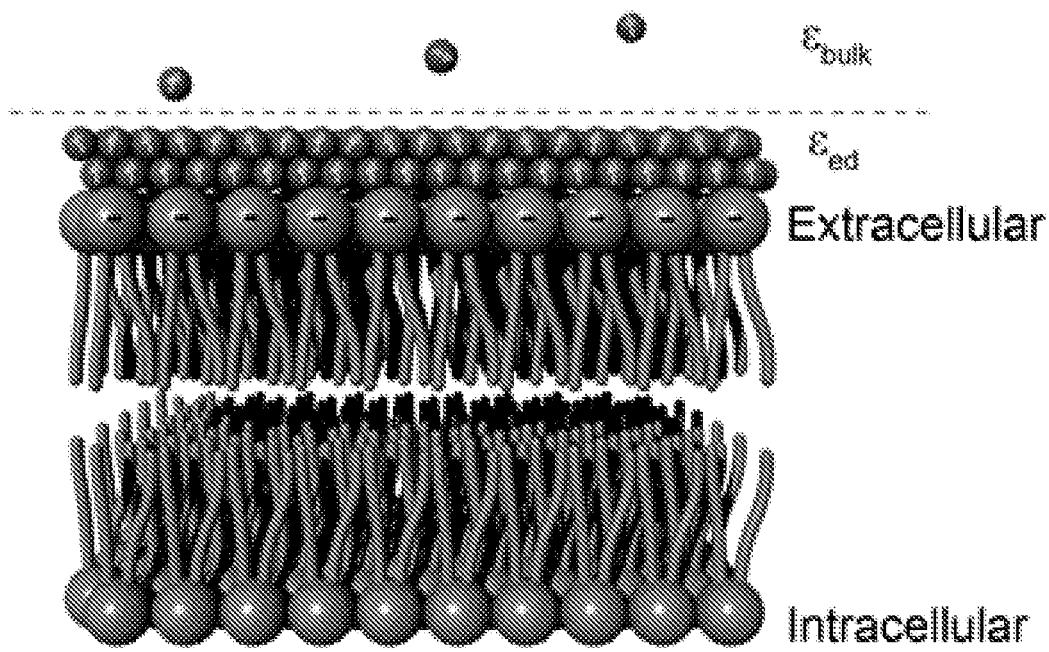
FIG. 24 shows the orientated water molecules form in the electric double layer of the cell membrane under the electric field. The permittivity of the water in the electric double layer ($\varepsilon_{ed}$) strongly depends on the orientation of the molecules, which is different from that of the bulk water ($\varepsilon_{bulk}$).

To achieve the thermophoretic trapping of the biological cells, the interfacial interaction between the cell membrane and the water molecules was explored. Most of the biological cells have negative surface charge due to the phospholipid bilayers in the cell membrane, which is schematically illuminated in FIG. 23. The phospholipid is composed of a negatively charged hydrophilic head group, with the charge contributed by the phosphate group, and two hydrophobic fatty acid tails. The hydrophobic interaction between the tails leads to the creation of the bilayer structure, with the charged head group in contact with the water molecules at extracellular side. The surface charges induce an electric field E pointing to the cell membrane surface. The water molecules can be treated as electric dipoles and they adsorb on the cell membrane to form an orientated layer with a fixed alignment to the membrane surface under the electric field E, as shown in FIG. 24. The water dipoles on the second layer have a loosely orientated structure.

Figure 25:
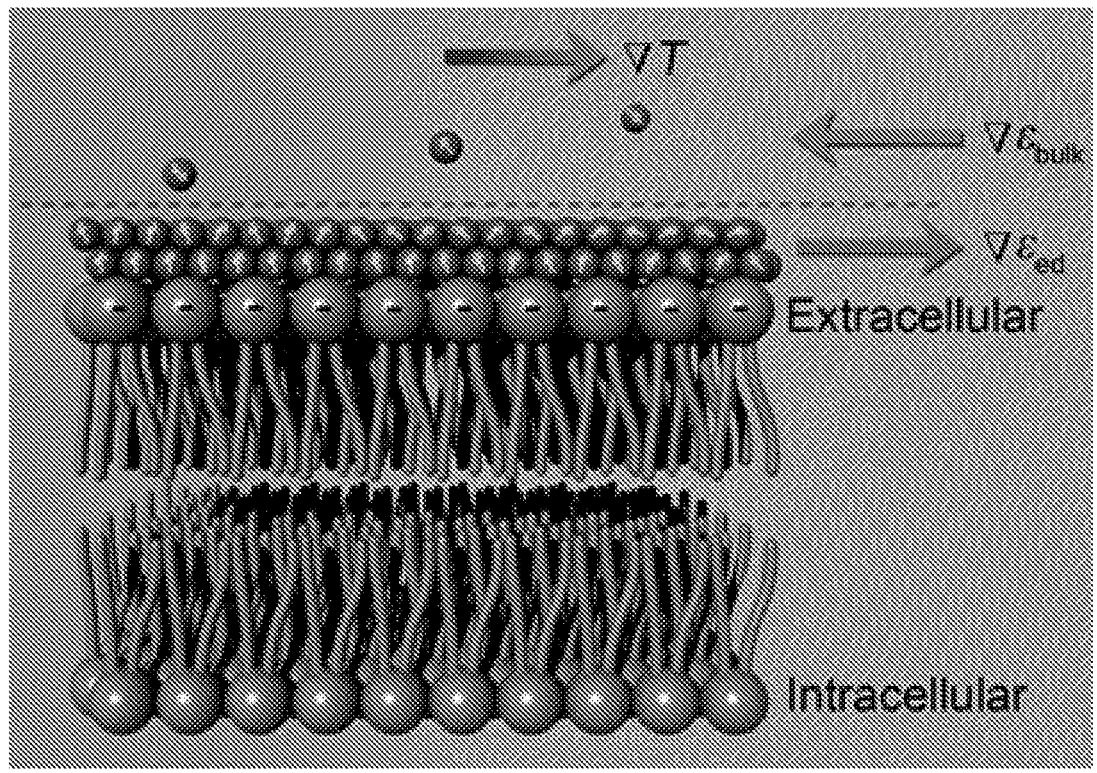
FIG. 25 shows the thermal response of the permittivity in the electric double layer (i.e., permittivity gradient $\nabla \varepsilon_{ed}$) on the cell membrane under a temperature gradient field $\nabla T$, which induces the thermal perturbation and increases the entropy of the water molecules. The sign of $\nabla \varepsilon_{ed}$ is opposite to that of $\nabla \varepsilon_{bulk}$.
Figure 26:
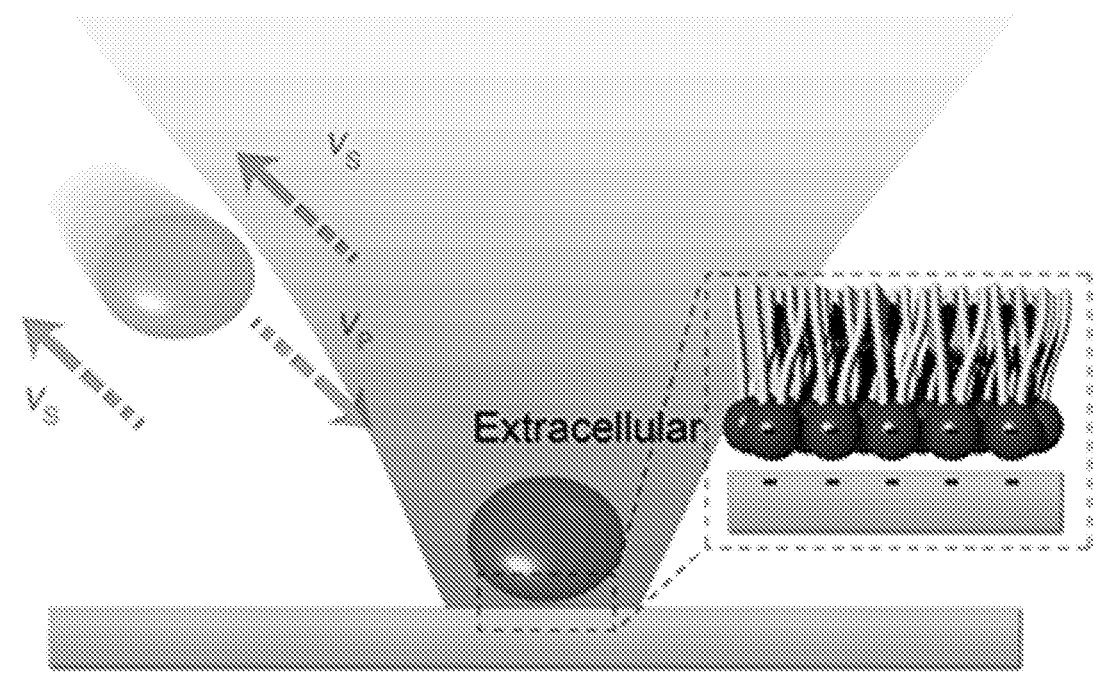
FIG. 26 shows the permittivity gradient $\nabla \varepsilon_{ed}$ generates a slip velocity $v_s$ pointing from hot to cold and the cell migrates in a reverse direction with a velocity $v_p$, which leads to the trapping of the cell at the hot laser spot. The electric static repulsive force between the cell membrane and the substrate, both of which have negative charges, balances the trapping force.

The permittivity of water is dependent on the dipolar orientation according to BMD model (Bockris J O M et al. *Proc. R. Soc. London, A* 1963, 274, 55-79), with the permittivity in the electric double layer ($\varepsilon_{ed}$) significantly lower than that in bulk water ($\varepsilon_{bulk}$). Upon laser irradiation on the plasmonic substrate (FIG. 20), the elevated temperature of solution distorts the dipole layer and increases its dielectric constant. When a temperature gradient field $\nabla T$ is applied, the permittivity in bulk water and the electric double layer will be modified in a reverse sign along the temperature gradient. The permittivity in electric double layer will be increased due to the thermal perturbation, or, the increased entropy, resulting in a positive value of $\partial\varepsilon/\partial T$ (FIG. 25). The entropy change is approximated as:

$$H(z) = \frac{1}{2}\left(\varepsilon + T\left(\frac{\partial\varepsilon}{\partial T}\right)\right)E^2(z)$$

where the electric field E is a function of the Debye length $\kappa^{-1}$ and the surface potential of the cell $\zeta$:

$$E(z) = \kappa\zeta \exp(-\kappa z)$$

where z is the distance from the membrane surface. Therefore, the thermophoretic mobility can be calculated by (Anderson J L. *Annu. Rev. Fluid Mech.* 1989, 21, 61-99; Putnam S A et al. *Langmuir* 2007, 23, 9221-9228):

$$D_T = -\frac{2}{\eta T}\frac{2\Lambda_1}{2\Lambda_1 + \Lambda_p}\int_0^\infty zH(z)dz = -\frac{1}{2\eta T}\frac{2\Lambda_1}{2\Lambda_1 + \Lambda_p}\left(\varepsilon + T\frac{\partial\varepsilon}{\partial T}\right)\zeta^2$$

where $\eta$ is the solvent viscosity, and $\Lambda_l$ and $\Lambda_p$ are the thermal conductivity of the solvent and the cell. Therefore, the cell will migrate to the hot regime with a velocity $v_p = -D_T \nabla T$, leading to the trapping of the cell at the laser spot (FIG. 26).

The use of solid-state substrate induces the hydrodynamic boundary effect, which can dramatically increase the Soret coefficient ($S_T$) when the cell-substrate distance (h in FIG. 20) is much smaller than the radius of the cell (R), with an enhancement factor of (Würger A. *Phys. Rev. Lett.* 2016, 116, 138302):

$$\phi(\hat{h}) = 3(1+\hat{h})\frac{(2+6\hat{h}+3\hat{h}^2)\ln\frac{\hat{h}+1}{\hat{h}} - \frac{3}{2}(3+2\hat{h})}{2+9\hat{h}+6\hat{h}^2 - 6\hat{h}(1+\hat{h})^2\ln\frac{\hat{h}+1}{\hat{h}}}$$

where $\hat{h} = h/R$ and h is the cell-substrate distance. An enhancement factor of ~8 is obtained when $\hat{h} = 0.01$. The hydrodynamic boundary effect leads to a large thermophoretic force even at a moderate temperature gradient.

Figure 27:
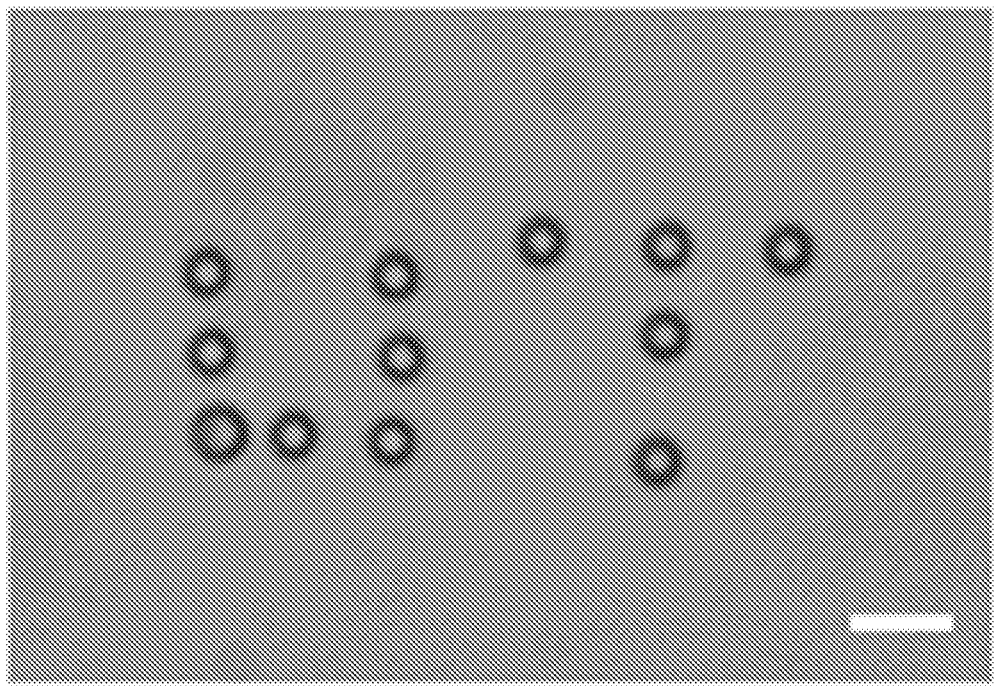
FIG. 27 is an optical image of "UT" pattern created by parallel trapping of polystyrene (PS) beads 2 µm in diameter. Scale bar: 5 µm.
Figure 28:
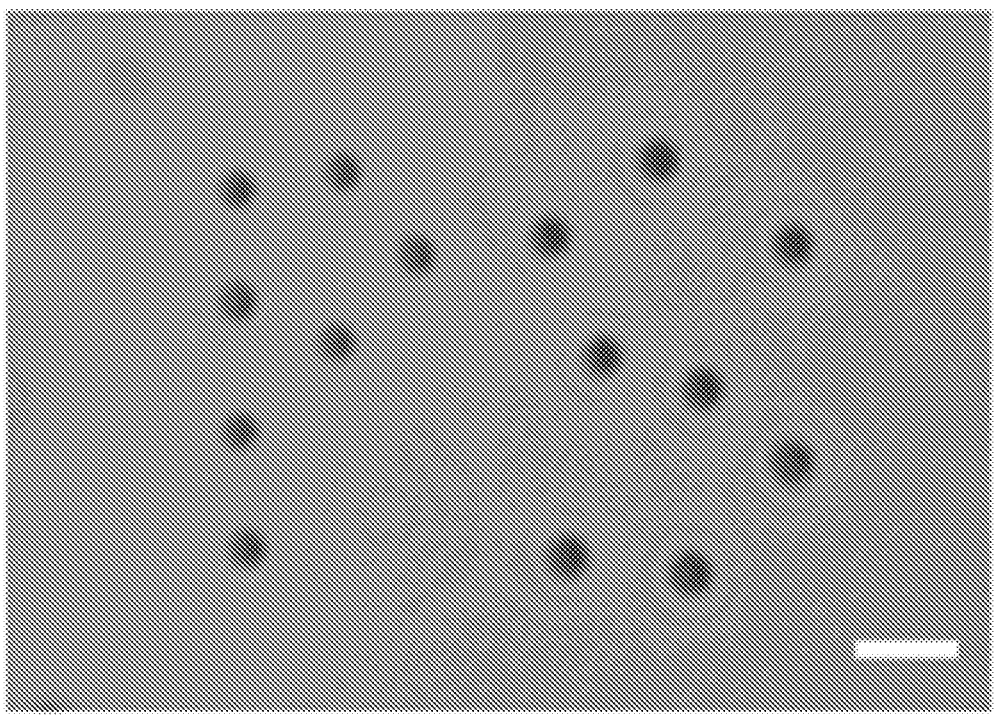
FIG. 28 is an optical image of "PS" pattern created by parallel trapping of polystyrene (PS) beads 0.96 µm in diameter. Scale bar: 5 µm.
Figure 29:
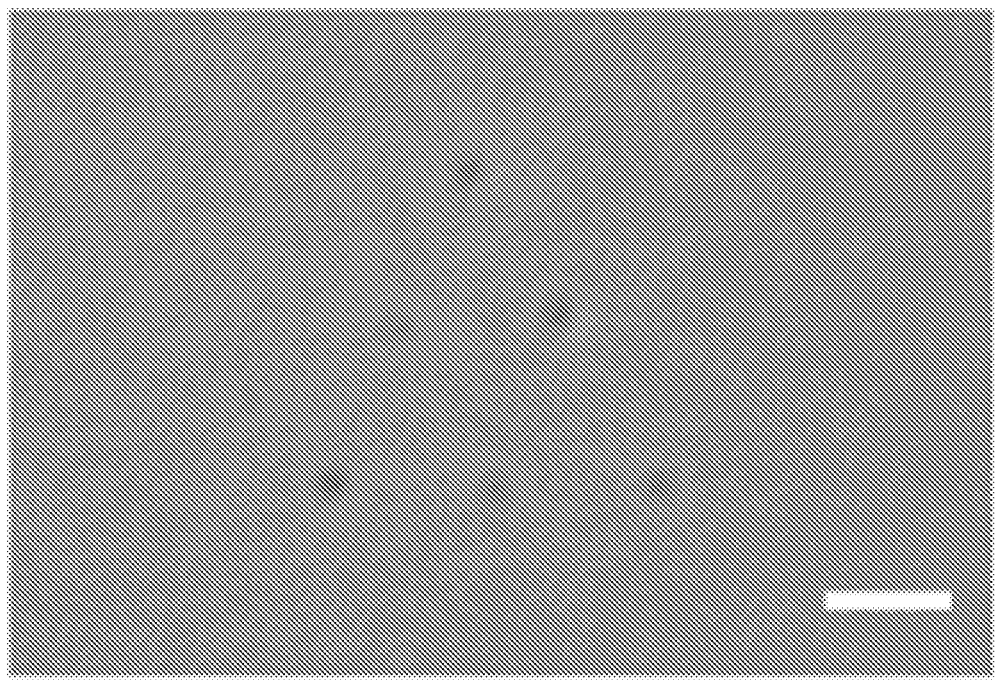
FIG. 29 is an optical image of a triangle pattern created by parallel trapping of polystyrene (PS) beads 540 nm in diameter. Scale bar: 5 µm.

With the plasmon-enhanced optothermal effect and the hydrodynamic boundary effect, the optothermal tweezers can achieve versatile manipulation of biological cells and nanoparticles at moderate temperature gradient and rise based on the low-power laser beam and digital micromirror device control. As the first step, parallel trapping of polystyrene (PS) beads in arbitrary patterns is demonstrated and the trapping stability is estimated. The as-purchased polystyrene beads (Bangs Laboratories, Inc.) were diluted with deionized (DI) water by a volume ratio of 1:20000. The optothermal tweezers were applied using a laser beam with a diameter of 2 µm and a power of 0.2 mW for excitation to create the "UT" pattern shown in FIG. 27 with polystyrene beads 2 µm in diameter, the "PS" shown in FIG. 28 with polystyrene beads 0.96 µm in diameter, and the triangle pattern shown in FIG. 29 with polystyrene beads 540 nm in diameter.

Figure 30:
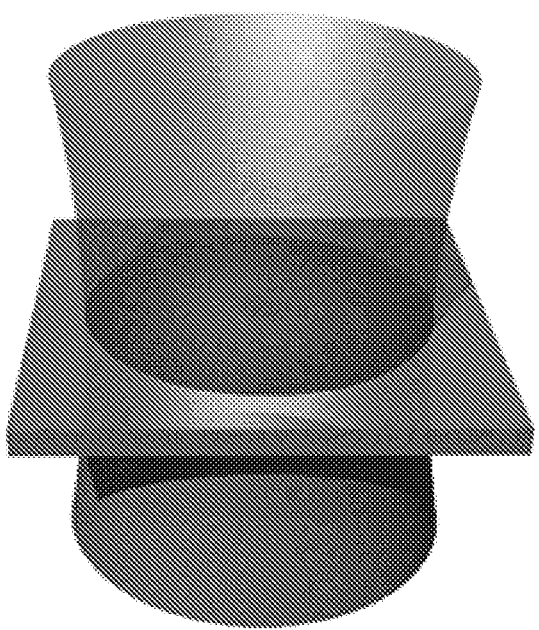
FIG. 30 shows the trajectory of a single trapped polystyrene bead 2 µm in diameter.
Figure 31:
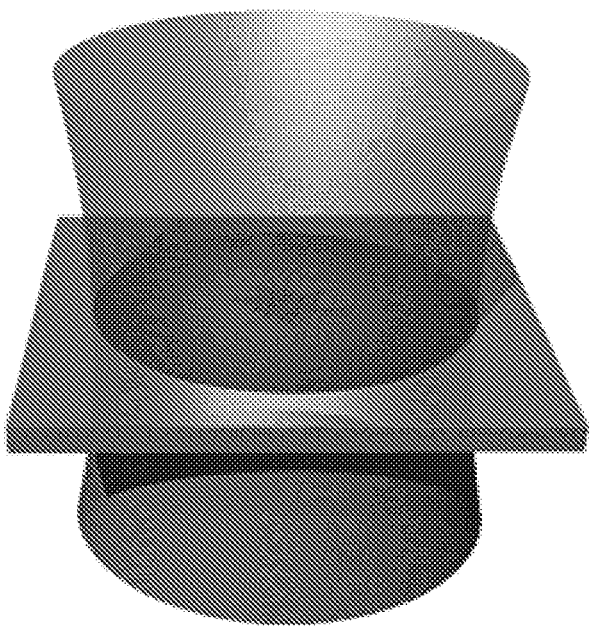
FIG. 31 shows the trajectory of a single trapped polystyrene bead 0.96 µm in diameter.
Figure 32:
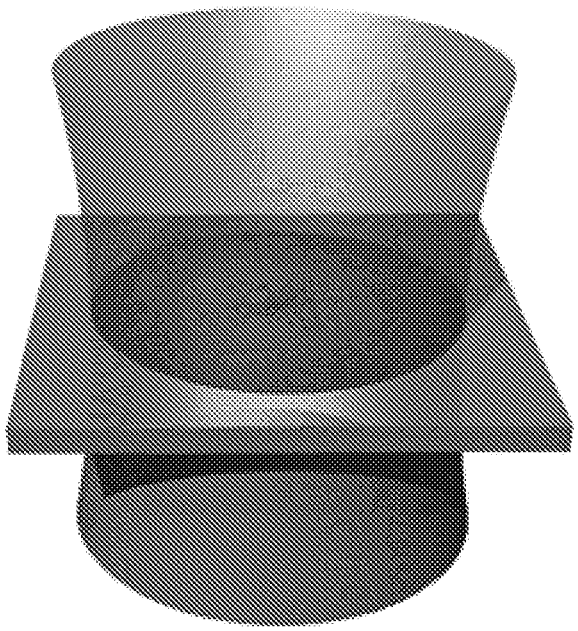
FIG. 32 shows the trajectory of a single trapped polystyrene bead 540 nm in diameter.

The single-particle trajectories were also recorded to estimate the trapping stability. As shown in FIG. 30, stable trapping within the center of the laser beam is obtained for the 2 µm polystyrene beads. A broader distribution of trapping positions is observed for the smaller beads, as shown in FIG. 31 and FIG. 32 for the 0.96 µm and 540 nm polystyrene beads, respectively, due to the increased Brownian motion and the decreased Soret coefficient.

Figure 33:
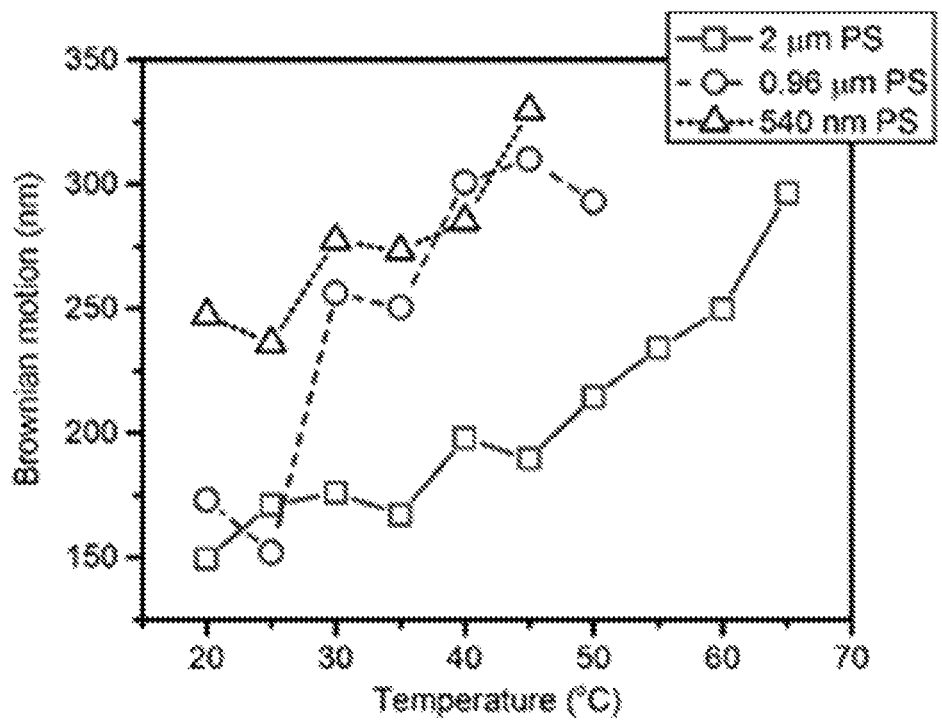
FIG. 33 shows the Brownian motion of single polystyrene beads with various sizes as a function of the working temperature. The laser beam has a diameter of 2 µm and a power of 0.2 mW.
Figure 34:
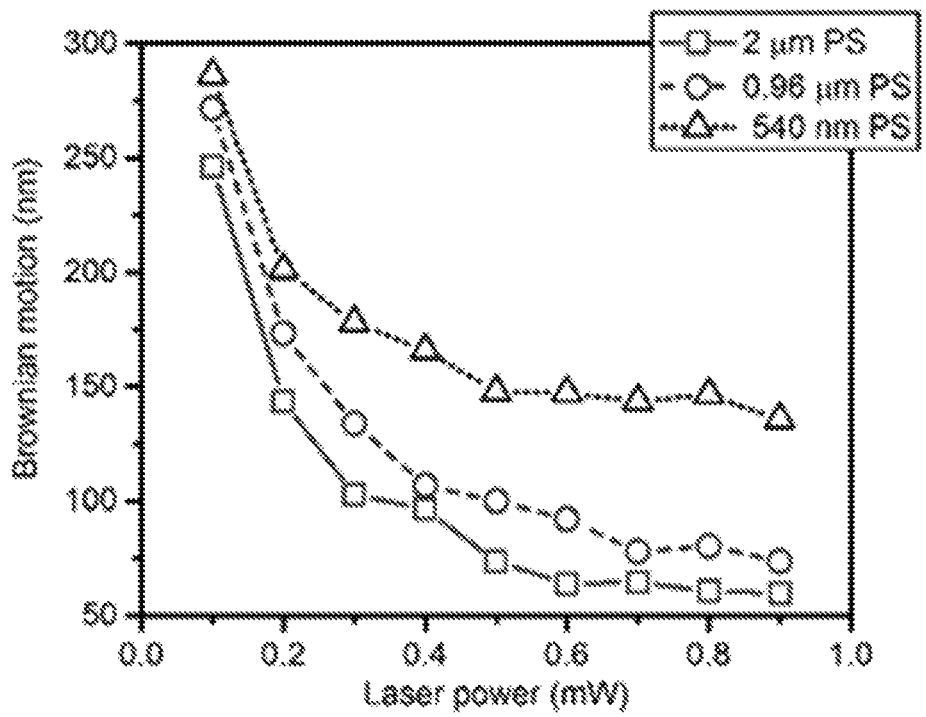
FIG. 34 shows the Brownian motion of single polystyrene beads with various sizes as a function of the laser power. The working temperature is 20° C. and the diameter of the laser beam is 2 µm.

Robust operation within a broad range of environmental working temperature and optical power can give flexibility to the operation of an ideal tweezer. In contrast to previous reported thermophoretic trapping, which worked only below room temperature (Würger A. *Rep. Prog. Phys.* 2010, 73, 126601; Helden L et al. *Soft Matter* 2015, 11, 2379-2386), the optothermal tweezers discussed herein exhibit a broad range of working temperature. As shown in FIG. 33, the trapping of 2 µm polystyrene beads still occurred even when the working temperature was increased to 65° C. The Brownian motion became more significant at the higher temperature. It is noted that the trapping could still be possible at a temperature above 65° C. if the strong Brownian motion did not prevent the beads from approaching the trapping sites near the substrates. The highest trapping temperature or critical temperature decreases for the smaller beads due to the enhanced Brownian motion (FIG. 33). As shown in FIG. 34, the optothermal tweezers can achieve stable trapping of polystyrene beads with different sizes at a power density as low as 0.1 mW/µm$^2$. An increase in the laser power and the associated temperature gradient enhances the optical force, convective drag force and thermophoretic force, leading to the stronger trapping capability with reduced Brownian motion.

Live cell trapping and manipulation has been demonstrated using optical tweezers (Zhong M C et al. *Nat. Commun.* 2013, 4, 1768; Guck J et al. *Biophys. J.* 2001, 81, 767-784; Kreysing M K et al. *Opt. Express* 2008, 16, 16984-16992). However, the optical force depends on the refractive index contrast between cells and solvent, which is known to be small in aqueous solution and limits the optical force. This requires a higher optical power to achieve stable trapping. Because the thermophoretic force does not rely on the refractive-index difference between the particles and solvents they are dispersed in, the optothermal tweezers allow for low-power and noninvasive manipulation of biological cells. The thermophoretic trapping force relies on the temperature gradient $\nabla T$ instead of the temperature increment $\nabla T$ or absolute temperature value T, which allows the achievement of stable trapping without a large temperature rise. Further, the experimental setup can be integrated with a cooling system, which helps to lower the absolute temperature value for cell safety while maintaining the temperature gradient for the cell trapping.

Figure 35:
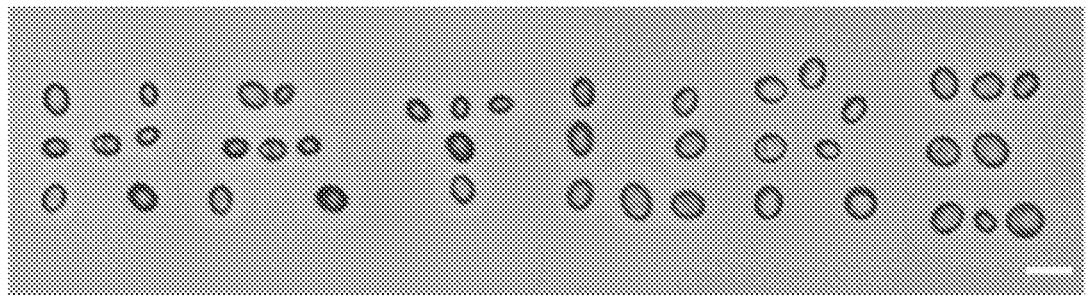
FIG. 35 shows the parallel trapping of yeast cells in "NATURE" pattern. The parallel trapping was achieved for each letter, which was stitched to complete the whole pattern. Scale bar: 10 µm.
Figure 36:
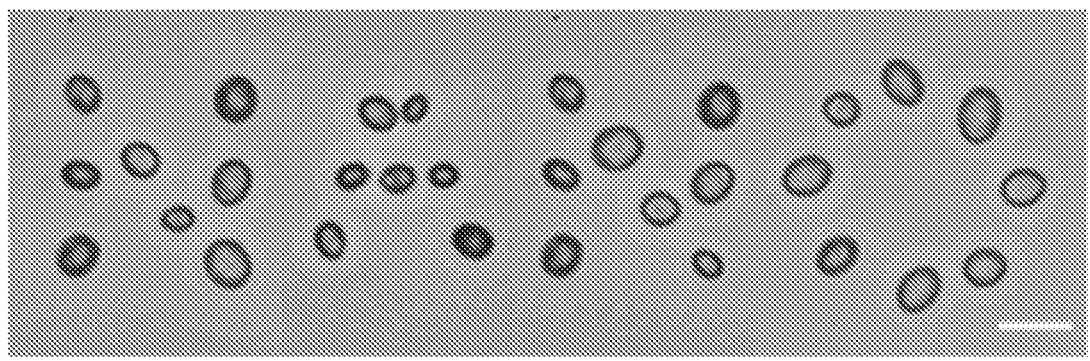
FIG. 36 shows the parallel trapping of yeast cells in "NANO" pattern. The parallel trapping was achieved for each letter, which was stitched to complete the whole pattern. Scale bar: 10 µm.
Figure 37:
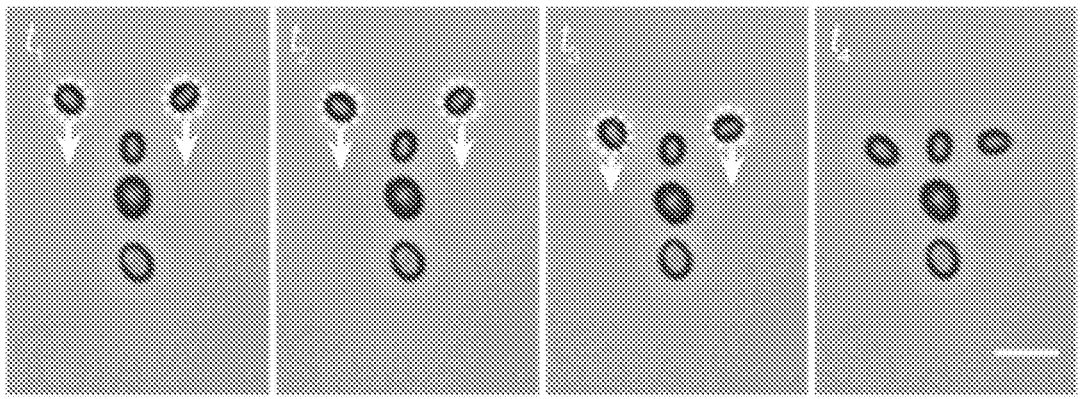
FIG. 37 shows the transformation of trapped yeast cells from "Y" to "T" patterns by moving two cells as indicated by the arrows. Scale bar: 10 µm.
Figure 38:
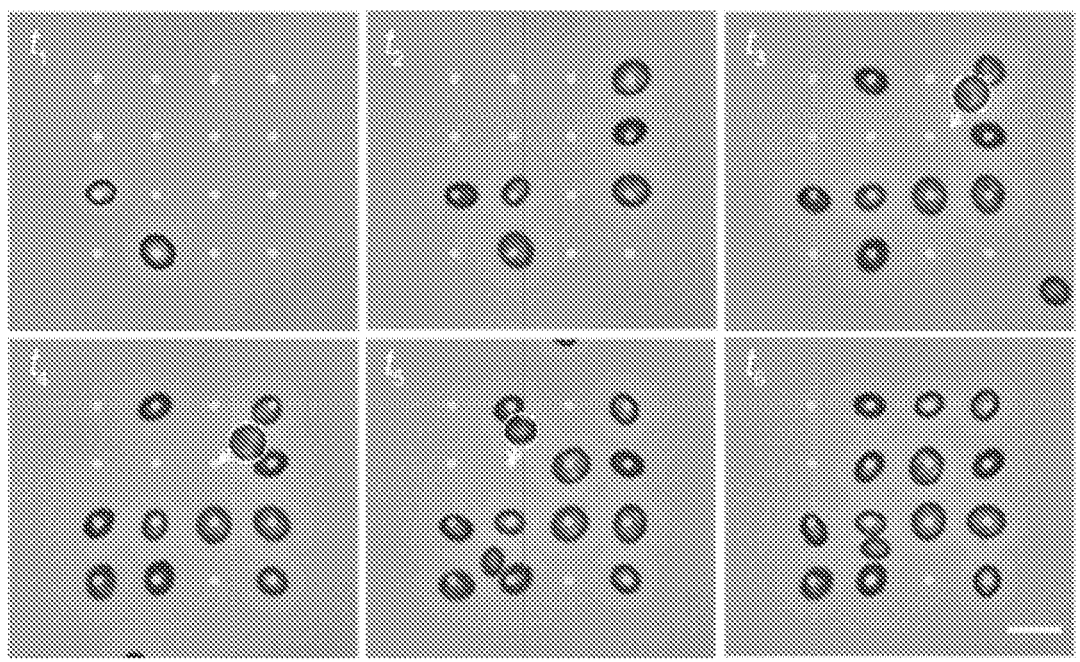
FIG. 38 shows the time-resolved parallel trapping of yeast cells in an array with a 4×4 optical lattice (indicated by white dots). Scale bar: 10 µm.

As an example, the digital micromirror device was used to generate multiple laser beams that simultaneously trapped and arranged yeast cells (yeast cells were dispersed in DI water with the cell concentration of ~1×10$^3$ cells/mm$^3$) in the "NATURE" pattern shown in FIG. 35 and the "NANO" pattern shown in FIG. 36. With the power intensity of 0.2 mW (0.06 mW/µm$^2$) for each beam, all the trapped yeast cells stayed alive. Furthermore, the quasi-continuous distribution of "hot spots" on the plasmonic substrate gives a collective nanoscale heating effect and allows continuous and dynamic manipulation of the temperature gradient field, and therefore trapped yeast cells. For example, the cell pattern was transformed from "Y" to "T" by moving two yeast cells via digital micromirror device control (FIG. 37). From time-resolved parallel trapping of yeast cells into a 4×4 array (FIG. 38), it can be seen that cells occupy 80% of the optical lattice at time $t_6$. The unoccupied sites are caused by the non-uniform intensity distribution of the optical lattice.

Figure 39:
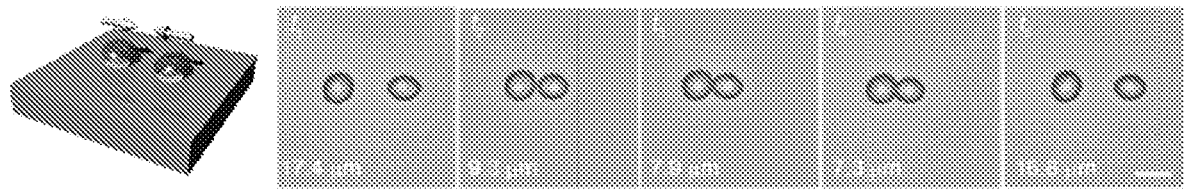
FIG. 39 shows reversible distance control between a pair of yeast cells. The center-to-center inter-cellular distances are indicated.

To meet various requirements for studies in life sciences such as cell-cell communication and single-cell analysis, the capability of the optothermal tweezers in versatile manipulation of cells is further demonstrated. As shown in FIG. 39, the cell-cell distance and thus the inter-cellular interaction between a pair of yeast cells at a resolution of 100 nm was reversibly tuned. From time $t_1$ to $t_3$, the pair underwent from separation to direct contact. Further approaching of the two cells induced pressure and deformation on the cell membranes at the contact point ($t_4$). The pair was separated again at time $t_5$.

Figure 40:
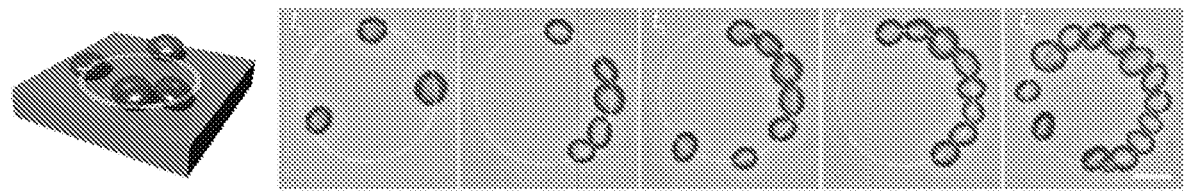
FIG. 40 shows the arrangement of yeast cells in a ring shape.

Geometric design of optothermal potentials in the optothermal tweezers can allow for arbitrary control of cell assemblies. As shown in FIG. 40, a ring-shape potential trapped and arranged yeast cells alike. These cells are tangentially free for interactions and radially confined by the optothermal potential. An increased number of the trapped cells led to their close arrangement with direct contact.

Figure 41:
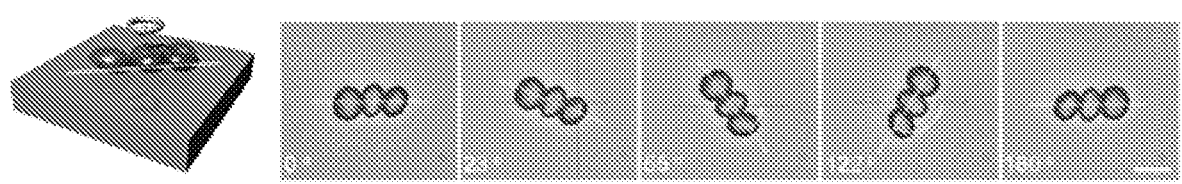
FIG. 41 shows the rotation of 1D assembly of three yeast cells with the rotation angles indicated.

Precise control of cell orientation for advanced applications such as 3D cellular microscopy and heterogeneous cell-cell interactions can be challenging for many existing tweezers. The optothermal tweezers, on the other hand, are capable of aligning and rotating both single and assemblies of cells at an angular resolution of one degree. For example, FIG. 41 shows the rotation of a linear assembly of three yeast cells using a one-dimensional (1D) potential. The working mechanism is detailed below.

Figure 42:
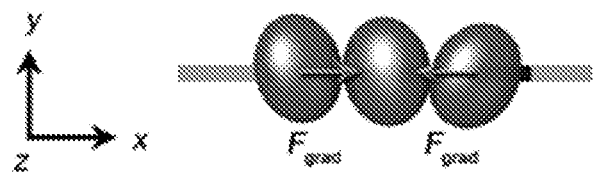
FIG. 42 illustrates the working principle of the alignment of cells into a 1D assembly due to the gradient force created by the 1D optothermal potential.
Figure 43:
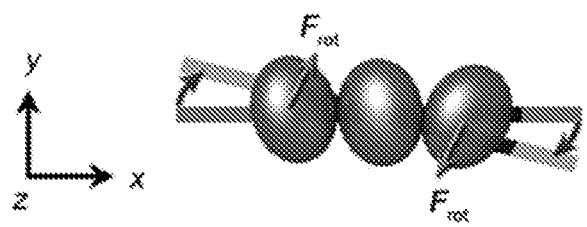
FIG. 43 illustrates the working principle of the rotation of the 1D assembly of cells following the orientation change of the 1D optothermal potential.
Figure 44:
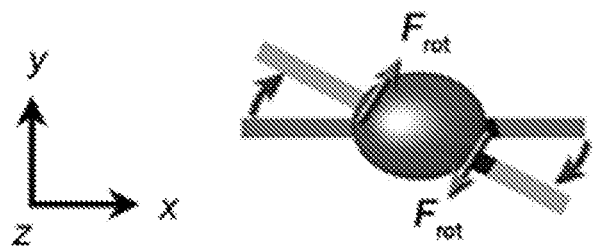
FIG. 44 illustrates the working principle of the rotation of a single cell following the orientation change of the 1D optothermal potential.

A digital micromirror device (DMD) was used to create and dynamically control a one-dimensional (1D) optothermal potential based on a rectangular optical landscape with a length of 30 µm and a width of 500 nm. As illustrated in FIG. 42, when three cells are delivered to the 1D potential, the in-plane trapping force will confine them along y axis. The 1D closely packed cells are aligned along x axis with cell-cell interactions. Due to the intensity gradient of the laser beam along the x axis, a weak gradient force $F_{grad}$ pushes the cells towards the center of the 1D optical landscape where the maximum intensity exists. As illustrated in FIG. 43, the rotation of the 1D assembly of cells can be achieved by rotating the 1D optical landscape. The rotation of optical landscape creates an offset between the cell location and the optothermal potential, which leads to the in-plane trapping force that acts as the rotation force $F_{rot}$. When a cell has an elongated shape (e.g., an anisotropic shape), the in-plane trapping force intends to align the long axis of the cell with the 1D optical landscape, enabling the rotation of a single cell (FIG. 44).

Figure 45:
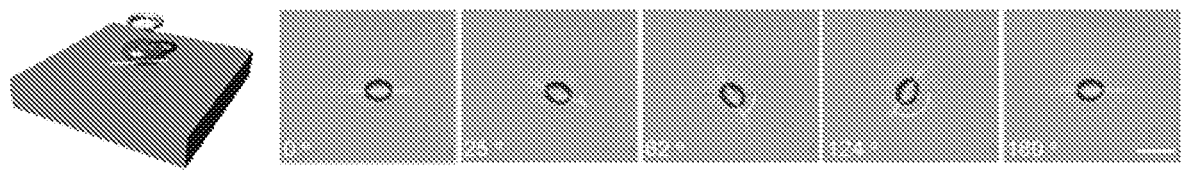
FIG. 45 shows the rotation of a single yeast cell with the rotation angles indicated.
Figure 46:
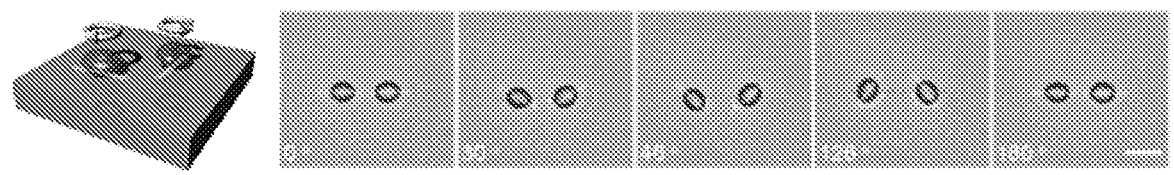
FIG. 46 shows the independent rotation of two yeast cells using a pair of 1D optothermal potentials. The rotation angles between 0 and 180 degree are indicated. Scale bar: 10 µm.

The capability for independent rotation of two and more cells at single-cell resolution can be useful for the study of cellular interactions, in particular, among anisotropic cells, which can depend on the cell orientation. Along this line, the rotation of a single yeast cell is shown in FIG. 45. Furthermore, two yeast cells can be trapped with two 1D potentials and rotated independently along two different directions (i.e., counterclockwise vs. clockwise) at the same angular speed, as shown in FIG. 46. The rotation speed and direction can be precisely controlled with the digital micromirror device.

Figure 47:
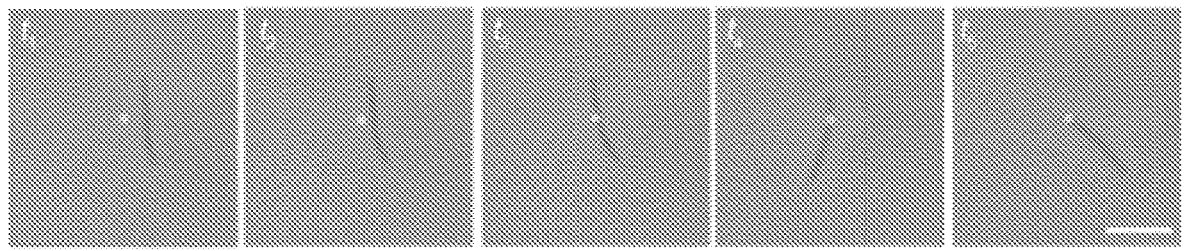
FIG. 47 shows the trapping of a single *Escherichia coli* cell using a disk-like optothermal potential with a diameter of 2 µm: $t_1$-$t_3$ show that the cell approaches the optical disk; $t_4$ and $t_5$ indicate the change of trapping site on the cell. Optical landscape is indicated by a white dot. Scale bar: 10 µm.
Figure 48:
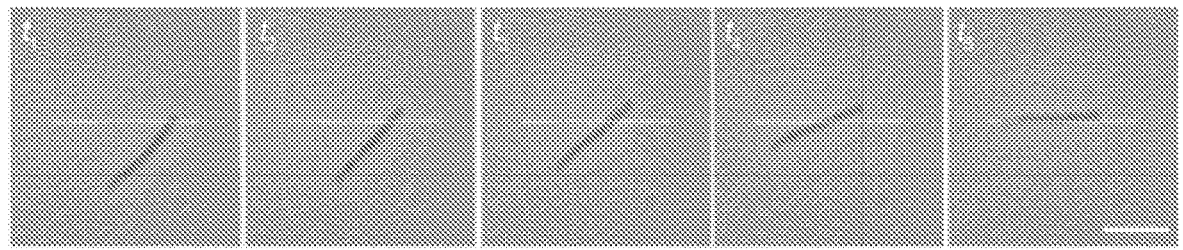
FIG. 48 shows the trapping and orientation control of a single *Escherichia coli* cell using a 1D optothermal potential. $t_1$-$t_5$ show dynamics of the cell trapping and orientation control. Optical landscape is indicated by a dotted line. Scale bar: 10 µm.
Figure 49:
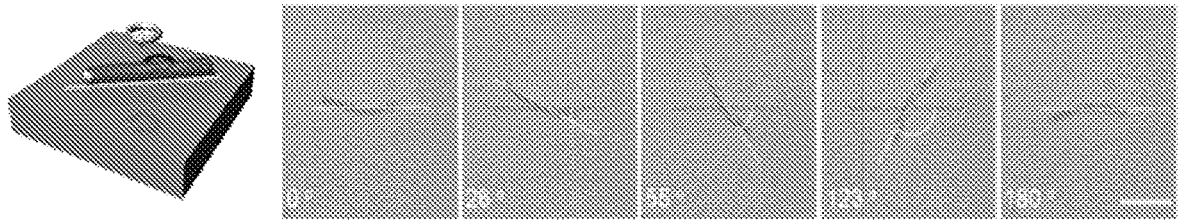
FIG. 49 shows the rotation of a single *Escherichia coli* cell with the rotation angles indicated.

To extend the applicability of optothermal tweezers, the trapping and orientation control of a highly anisotropic *Escherichia coli* cell was also demonstrated. *Escherichia coli* cells were dispersed in DI water with a cell concentration of ~1×10³ cells/mm³. As illustrated in FIG. 47, a disk-like optical landscape with a diameter of 2 μm is capable of trapping an *Escherichia coli* cell. With a fixed location of the optical disk, the trapping site on the cell can change during the dynamic manipulation of the cell (frames $t_4$ and $t_5$ in FIG. 47). In contrast, the 1D optothermal potential traps the *Escherichia coli* cell with the cell body aligned along the optical landscape (FIG. 48). The rotation of the *Escherichia coli* was also achieved by rotating the 1D optothermal potential with the digital micromirror device, as shown in FIG. 49.

In conclusion, optothermal tweezers were developed based on the management of light, heat, and fluids via the plasmon-enhanced optothermal effect and the interfacial permittivity gradient. The optothermal tweezers, which harness the thermophoretic force instead of radiation pressure, could also work with incoherent light sources such as light-emitting diodes and Mercury lamps. Sharing the same plasmonic substrates, surface-enhanced optical spectroscopy can be integrated with the optothermal tweezers to enable simultaneous measurements of the trapped cells and nanoparticles near the substrates. With versatile manipulation, simple optics, low power, and in-situ high-sensitive spectroscopy, the optothermal tweezers can be used in fundamental and applied research in life sciences and colloidal science, as well as disease diagnosis and nanomanufacturing. The cell manipulation methods described herein can enable diverse functionalities for applications in cellular biology and biomedicine, including precise intercellular distance control for studying cell-cell interactions, targeted cell delivery, cell assembly, and orientation control at single-cell level.

Other advantages which are obvious and which are inherent to the invention will be evident to one skilled in the art. It will be understood that certain features and sub-combinations are of utility and may be employed without reference to other features and sub-combinations. This is contemplated by and is within the scope of the claims. Since many possible embodiments may be made of the invention without departing from the scope thereof, it is to be understood that all matter herein set forth or shown in the accompanying drawings is to be interpreted as illustrative and not in a limiting sense.

The methods of the appended claims are not limited in scope by the specific methods described herein, which are intended as illustrations of a few aspects of the claims and any methods that are functionally equivalent are intended to fall within the scope of the claims. Various modifications of the methods in addition to those shown and described herein are intended to fall within the scope of the appended claims. Further, while only certain representative method steps disclosed herein are specifically described, other combinations of the method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

What is claimed is:

1. A method comprising:
    illuminating a first location of a plasmonic substrate with electromagnetic radiation at a power density of 1 mW/μm² or less;
        wherein the electromagnetic radiation comprises a wavelength that overlaps with at least a portion of the plasmon resonance energy of the plasmonic substrate; and
        wherein the plasmonic substrate is in thermal contact with a liquid sample comprising a plurality of particles, the liquid sample having a first temperature;
    thereby:
        generating a first confinement region at a location in the liquid sample proximate to the first location of the plasmonic substrate by plasmon-enhanced photothermal effects, wherein at least a portion of the first confinement region has a second temperature that is greater than the first temperature such that the first confinement region is bound by a temperature gradient; and
        trapping at least a first portion of the plurality of particles within the first confinement region, said first portion of the plurality of particles trapped within the first confinement region being a first trapped portion of the plurality of particles;
    subsequently, illuminating a second location of the plasmonic substrate thereby:
        generating a second confinement region at a location in the liquid sample proximate to the second location of the plasmonic substrate by plasmon-enhanced photothermal effects, wherein at least a portion of the second confinement region has a third temperature that is greater than the first temperature such that the second confinement region is bound by a temperature gradient; and
        translocating at least a portion of the first trapped portion of the plurality of particles from the first confinement region to the second confinement region, trapping at least a second portion of the plurality of particles within the second confinement region to form a second trapped portion of the plurality of particles, or a combination thereof.

2. The method of claim 1, wherein the electromagnetic radiation is provided by a light source and the light source is a laser.

3. The method of claim 2, wherein the light source is configured to illuminate a mirror and the mirror is configured to reflect the electromagnetic radiation from the light source to illuminate the first location and/or the second location of the plasmonic substrate.

4. The method of claim 2, wherein the light source is configured to illuminate a digital micromirror device, the digital micromirror device comprising a plurality of mirrors, and wherein the digital micromirror device is configured to reflect the electromagnetic radiation from the light source to illuminate the first location and/or the second location of the plasmonic substrate.

5. The method of claim 1, wherein the plasmonic substrate comprises a plurality of plasmonic particles and the plurality of plasmonic particles comprise a metal selected from the group consisting of Au, Ag, Pd, Cu, Cr, Al, and combinations thereof.

6. The method of claim 5, wherein the plurality of plasmonic particles have an average particle size of from 10 nm to 500 nm.

7. The method of claim 5, wherein each plasmonic particle within the plurality of plasmonic particles of the plasmonic substrate is separated from its neighboring plasmonic particles by an average distance of from 3 nm to 1500 nm.

8. The method of claim 1, wherein the plurality of particles in the liquid sample comprise a plurality of polymer particles, a plurality of metal particles, a plurality of semiconductor particles, a plurality of biological cells, or a combination thereof.

9. The method of claim 1, wherein the first trapped portion of the plurality of particles, the second trapped portion of the plurality of particles, or a combination thereof are trapped at a trapping speed of from 200 nm/s to 50 µm/s.

10. The method of claim 1, wherein the first trapped portion of the plurality of particles, the second trapped portion of the plurality of particles, or a combination thereof are not damaged during the trapping.

11. The method of claim 1, wherein the first confinement region and/or the second confinement region has a diameter of from 500 nm to 100 µm.

12. The method of claim 1, wherein the first trapped portion of the plurality of particles is one particle, the second trapped portion of the plurality of particles is one particle, or a combination thereof.

13. The method of claim 1, wherein the first temperature is from 273 K to 343 K.

14. The method of claim 1, wherein the second temperature is greater than the first temperature by from 3 K to 20 K.

15. The method of claim 1, wherein the first trapped portion of the plurality of particles, the second trapped portion of the plurality of particles, or a combination thereof are trapped by convection, a thermophoretic force, an optical force, or combinations thereof.

16. The method of claim 1, wherein the plasmonic substrate is translocated to illuminate the second location; wherein the electromagnetic radiation is provided by a light source, and the light source is translocated to illuminate the second location; wherein the electromagnetic radiation is provided by a light source, the light source being configured to illuminate a mirror and the mirror is configured to reflect the electromagnetic radiation from the artificial light source to illuminate the plasmonic substrate, and the mirror is translocated to illuminate the second location; or a combination thereof.

17. A patterned sample made using the methods of claim 1.

18. A method of use of the patterned sample of claim 17, wherein the patterned sample is used for single-particle sensing, single-cell analysis, tissue engineering, functional optical devices, intercellular communication, cell differentiation, immunological interaction, disease diagnosis, or combinations thereof.

19. A system comprising:
a plasmonic substrate in thermal contact with a liquid sample comprising a plurality of particles, the liquid sample having a first temperature;
a light source configured to illuminate the plasmonic substrate at a first location with electromagnetic radiation at a power density of 1 mW/µm$^2$ or less and at a wavelength that overlaps with at least a portion of the plasmon resonance energy of the plasmonic substrate; thereby:
generating a first confinement region at a location in the liquid sample proximate to the first location of the plasmonic substrate by plasmon-enhanced photothermal effects, wherein at least a portion of the first confinement region has a second temperature that is greater than the first temperature such that the first confinement region is bound by a temperature gradient; and
trapping at least a first portion of the plurality of particles within the first confinement region, said first portion of the plurality of particles trapped within the first confinement region being a first trapped portion of the plurality of particles; and
a means for translocating the plasmonic substrate and/or the light source, such that the light source is subsequently configured to illuminate the plasmonic substrate at a second location,
thereby:
generating a second confinement region at a location in the liquid sample proximate to the second location of the plasmonic substrate by plasmon-enhanced photothermal effects, wherein at least a portion of the second confinement region has a third temperature that is greater than the first temperature such that the second confinement region is bound by a temperature gradient; and
translocating at least a portion of the first trapped portion of the plurality of particles from the first confinement region to the second confinement region, trapping at least a second portion of the plurality of particles within the second confinement region to form a second trapped portion of the plurality of particles, or a combination thereof.

* * * * *